United States Patent
Seok et al.

(10) Patent No.: US 11,979,876 B2
(45) Date of Patent: May 7, 2024

(54) METHOD, DEVICE, AND SYSTEM FOR UPLINK TRANSMISSION IN WIRELESS COMMUNICATION SYSTEM

(71) Applicant: WILUS INSTITUTE OF STANDARDS AND TECHNOLOGY INC., Gyeonggi-do (KR)

(72) Inventors: Geunyoung Seok, Seoul (KR); Kyungjun Choi, Gyeonggi-do (KR); Minseok Noh, Seoul (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/135,107

(22) Filed: Apr. 14, 2023

(65) Prior Publication Data
US 2023/0345471 A1  Oct. 26, 2023

Related U.S. Application Data

(63) Continuation of application No. PCT/KR2021/014285, filed on Oct. 14, 2021.

(30) Foreign Application Priority Data

Oct. 14, 2020  (KR) .......................... 10-2020-0133050
Jan. 26, 2021  (KR) .......................... 10-2021-0010908
(Continued)

(51) Int. Cl.
*H04W 72/1268* (2023.01)
*H04L 1/1822* (2023.01)
(Continued)

(52) U.S. Cl.
CPC ....... *H04W 72/1268* (2013.01); *H04L 1/1822* (2013.01); *H04L 1/1854* (2013.01); *H04W 72/21* (2023.01); *H04L 1/1812* (2013.01)

(58) Field of Classification Search
CPC . H04W 72/1268; H04W 88/08; H04W 88/02; H04W 72/14; H04W 72/12;
(Continued)

(56) References Cited

U.S. PATENT DOCUMENTS

2018/0167932 A1\*  6/2018  Papasakellariou .... H04L 5/0055
2019/0109676 A1\*  4/2019  Zhang .................... H04W 72/23
(Continued)

FOREIGN PATENT DOCUMENTS

CN    111953466       11/2020
KR    10-2019-0133284 12/2019
(Continued)

OTHER PUBLICATIONS

International Search Report for PCT/KR2021/014285 dated Feb. 10, 2022 and its English translation from WIPO (now published as WO 2022/080911).
(Continued)

*Primary Examiner* — Hanh N Nguyen
(74) *Attorney, Agent, or Firm* — Ladas & Parry, LLP

(57) ABSTRACT

Disclosed is a method by which a terminal transmits a physical uplink shared channel (PUSCH) to a base station in a wireless communication system. The terminal can receive, from the base station, configuration information for allocating a resource for transmitting a transport block (TB) through the PUSCH, and map the TB to a plurality of slots constituting the resource on the basis of the configuration information. Thereafter, the terminal can transmit the TB on the plurality of slots through the PUSCH.

21 Claims, 30 Drawing Sheets

(30) Foreign Application Priority Data

| Mar. 23, 2021 | (KR) | ................. | 10-2021-0037246 |
| May 6, 2021 | (KR) | ................. | 10-2021-0058804 |
| Aug. 5, 2021 | (KR) | ................. | 10-2021-0103081 |
| Sep. 24, 2021 | (KR) | ................. | 10-2021-0126673 |

(51) Int. Cl.
   *H04L 1/1829* (2023.01)
   *H04W 72/21* (2023.01)
   *H04L 1/1812* (2023.01)

(58) Field of Classification Search
   CPC . H04W 72/21; H04W 72/0446; H04W 72/23; H04W 52/325; H04L 1/1822; H04L 1/1854; H04L 1/1812; H04L 5/00; H04L 1/08; H04L 5/0055; H04L 5/0057; H04L 1/1671; H04L 5/044; H04L 5/0046
   See application file for complete search history.

(56) References Cited

U.S. PATENT DOCUMENTS

| 2019/0253229 | A1* | 8/2019 | Hosseini | ............... H04L 5/0094 |
| 2021/0092762 | A1 | 3/2021 | Choi et al. | |
| 2021/0160855 | A1* | 5/2021 | Gao | ..................... H04L 5/0094 |
| 2022/0045789 | A1 | 2/2022 | Karmoose et al. | |
| 2022/0124757 | A1 | 4/2022 | Yi et al. | |
| 2022/0360404 | A1* | 11/2022 | Chen | ..................... H04L 5/0053 |
| 2022/0386336 | A1* | 12/2022 | Gerami | .................. H04L 1/189 |

FOREIGN PATENT DOCUMENTS

| KR | 10-2124484 | 6/2020 |
| KR | 10-2020-0085481 | 7/2020 |
| KR | 10-2020-0115123 | 10/2020 |
| WO | 2019/216729 | 11/2019 |
| WO | 2022/080911 | 4/2022 |
| WO | 2022/152575 | 7/2022 |
| WO | 2022/154579 | 7/2022 |
| WO | 2022/154962 | 7/2022 |
| WO | 2022/211572 | 10/2022 |

OTHER PUBLICATIONS

Written Opinion of the International Searching Authority for PCT/KR2021/014285 dated Feb. 10, 2022 and its English translation from WIPO (now published as WO 2022/080911).
3GPP TS 38.214 V16.3.0 (Sep. 2020): "3rd Generation Partnership Project; Technical Specification Group Radio Access Network; NR; Physical layer procedures for data (Release 16)", Oct. 2, 2020, pp. 1-166.
Extended European Search Report dated Mar. 7, 2024 for European Patent application No. 21880558.8.
Samsung: "Remaining issues for PUSCH enhancement", 3GPP TSG RAN WG1 #101, R1-2003867, e-Meeting, May 15, 2020, pp. 1-3.
Nokia, Nokia Shanghai Bell: "Maintenance of PUSCH enhancements for Rel-16 NR URLLC", 3GPP TSG RAN WG1 Meeting #100bis-e, R1-2001696, e-Meeting, Apr. 10, 2020, pp. 1-16.
CATT: "Remaining issues on PUSCH enhancements", 3GPP TSG RAN WG1 #100bis, R1-2002084, e-Meeting, Apr. 11, 2020, pp. 1-19.

\* cited by examiner (a) PUSCH scheduling in time (K2)

(b) PUSCH scheduling in time (SLIV)

(a) PUSCH scheduling in frequency (type 0)

(b) PUSCH scheduling in frequency (type 1)

(a) PUSCH repetition type A (b) PUSCH repetition type B (a) First method (b) Second method

FIG. 27

METHOD, DEVICE, AND SYSTEM FOR UPLINK TRANSMISSION IN WIRELESS COMMUNICATION SYSTEM

CROSS-REFERENCE TO RELATED APPLICATIONS

This application is a continuation of pending PCT International Application No. PCT/KR2021/014285, which was filed on Oct. 14, 2021, and which claims priority under 35 U.S.C 119(a) to Korean Patent Application No. 10-2020-0133050 filed with the Korean Intellectual Property Office on Oct. 14, 2020, Korean Patent Application No. 10-2021-0010908 filed with the Korean Intellectual Property Office on Jan. 26, 2021, Korean Patent Application No. 10-2021-0037246 filed with the Korean Intellectual Property Office on Mar. 23, 2021, Korean Patent Application No. 10-2021-0058804 filed with the Korean Intellectual Property Office on May 6, 2021, Korean Patent Application No. 10-2021-0103081 filed with the Korean Intellectual Property Office on Aug. 5, 2021, and Korean Patent Application No. 10-2021-0126673 filed with the Korean Intellectual Property Office on Sep. 24, 2021. The disclosures of the above patent applications are incorporated herein by reference in their entirety.

TECHNICAL FIELD

The disclosure relates to a wireless communication system. Specifically, the disclosure relates to a method, a device, and a system for determining and transmitting a resource of an uplink shared channel.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

An aspect of the disclosure to provide a method for determining and transmitting a resource for data and control information transmitted via an uplink shared channel in a wireless communication system, particularly, a cellular wireless communication system, and a device therefor.

Solution to Problem

In a method of transmitting, by a user equipment (UE), a physical uplink shared channel (PUSCH) to a base station in a wireless communication system, the method may include an operation of receiving, from the base station, configuration information for allocation of a resource for transmitting a transport block (TB) via the PUSCH, an operation of mapping, based on the configuration information, the TB to a plurality of slots included in the resource, and an operation of transmitting the TB via the PUSCH in the plurality of slots, wherein the PUSCH is multiplexed (multiplexing) with uplink control information (UCI) different in each of the plurality of slots, and the number of modulation symbols in each of a plurality of pieces of information included in different UCIs is determined based on a size of the TB scaled based on the plurality of slots or the resource scaled based on the plurality of slots.

In addition, in the disclosure, for the plurality of pieces of information, the number of modulation symbols is determined based on the size of the scaled TB sequentially in order of the earliest slot of the plurality of slots in the time domain, or determined based on the resource scaled based on the plurality of slots.

In addition, in the disclosure, the plurality of pieces of information may include a hybrid automatic repeat request (HARQ)-acknowledgement(ACK)/negative-acknowledgement (NACK), channel state information (CSI) part 1, and CSI part 2, and the number of modulation symbols is determined based on the size of the scaled TB in order of the HARQ-ACK/NACK, CSI part 1, and CSI part 2 as a first order, a second order, and a third order, or determined based on the resource scaled based on the plurality of slots.

In addition, in the disclosure, in case that the TB includes one or more code blocks, the number of modulation symbols in each of the plurality of pieces of information included in the different UCIs is determined based on a value scaled based on the plurality of slots, or determined based on the resource scaled based on the plurality of slots.

In addition, in the disclosure, based on a value obtained by scaling a whole size of one or more code blocks included in the TB based on the plurality of slots, or the resource scaled based on the plurality of slots, transmission power of the PUSCH is determined in a unit of a slot.

In addition, in the disclosure, the PUSCH is repeatedly transmitted based on the resource allocated based on a configured grant (CG) of the configuration information.

In addition, in the disclosure, the PUSCH is repeatedly transmitted using a predetermined redundancy version (RV) sequence configured by the base station for repetitive transmission of the PUSCH.

In addition, in the disclosure, the predetermined RV sequence is {0,0,0,0}, and the repetitive transmission of the PUSCH starts from a slot in which a value of '0' of the predetermined RV sequence is configured.

In addition, the disclosure includes a communication module and a processor configured to control the communication module, and the processor is configured to receive, from a base station, configuration information for allocation of a resource for transmitting a transport block (TB) via a physical uplink shared channel (PUSCH), to map, based on the configuration information, the TB to a plurality of slots included in the resource, and to transmit the TB via the PUSCH in the plurality of slots, wherein the PUSCH is multiplexed (multiplexing) with uplink control information (UCI) different in each of the plurality of slots, and the number of modulation symbols in each of a plurality of pieces of information included in the different UCIs is determined based on a size of the TB scaled based on the plurality of slots, or determined based on the resource scaled based on the plurality of slots.

Advantageous Effects of Invention

According to an embodiment of the disclosure, a user equipment (UE) may efficiently determine a resource for data and control information desired to be transmitted via an uplink shared channel, and may efficiently transmit data and uplink control information to a base station via the uplink shared channel.

In addition, in case that a transport block (TB) of a PUSCH is transmitted via a plurality of slots, the number of symbols (or bits) of each of the parameters of a UCI of a PUCCH multiplexed with a PUSCH is determined based on the size of a TB scaled based on a single slot in which the UCI is transmitted, whereby the PUSCH and the PUCCH may be efficiently multiplexed.

In addition, in case that a TB of a PUSCH is transmitted via a plurality of slots, a redundancy version (RV) sequence for repetitive transmission of the PUSCH is configured to have a predetermined sequence, whereby, although a slot for a first transmission of the PUSCH that is repetitively transmitted is invalid, repetitive transmission of the PUSCH may immediately begin in a next slot for PUSCH transmission and the repetitive PUSCH transmission may be efficiently performed.

Effects that could be obtained based on the disclosure are not limited to the above-described effects, and based on the descriptions provided below, those skilled in the art would be clearly understand other effects which are not mentioned.

BRIEF DESCRIPTION OF DRAWINGS

FIG. 27 is a diagram illustrating a method of determining a transmission occasion of a PUSCH of which a TBS is determined based on a plurality of slots or a plurality of nominal PUSCHs according to an embodiment of the disclosure.

BEST MODE FOR CARRYING OUT THE INVENTION

Figure 1:
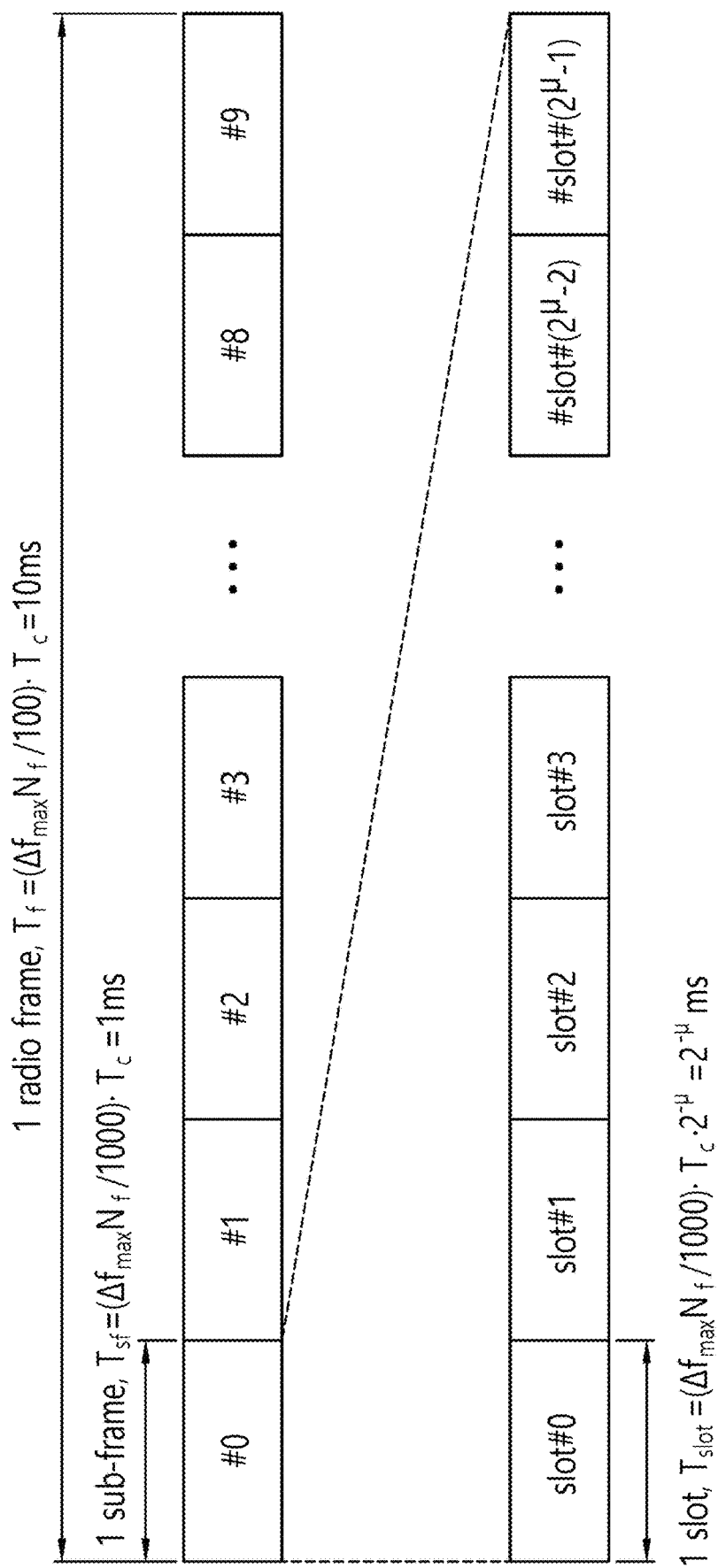
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and can have a value of $\mu=0$, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
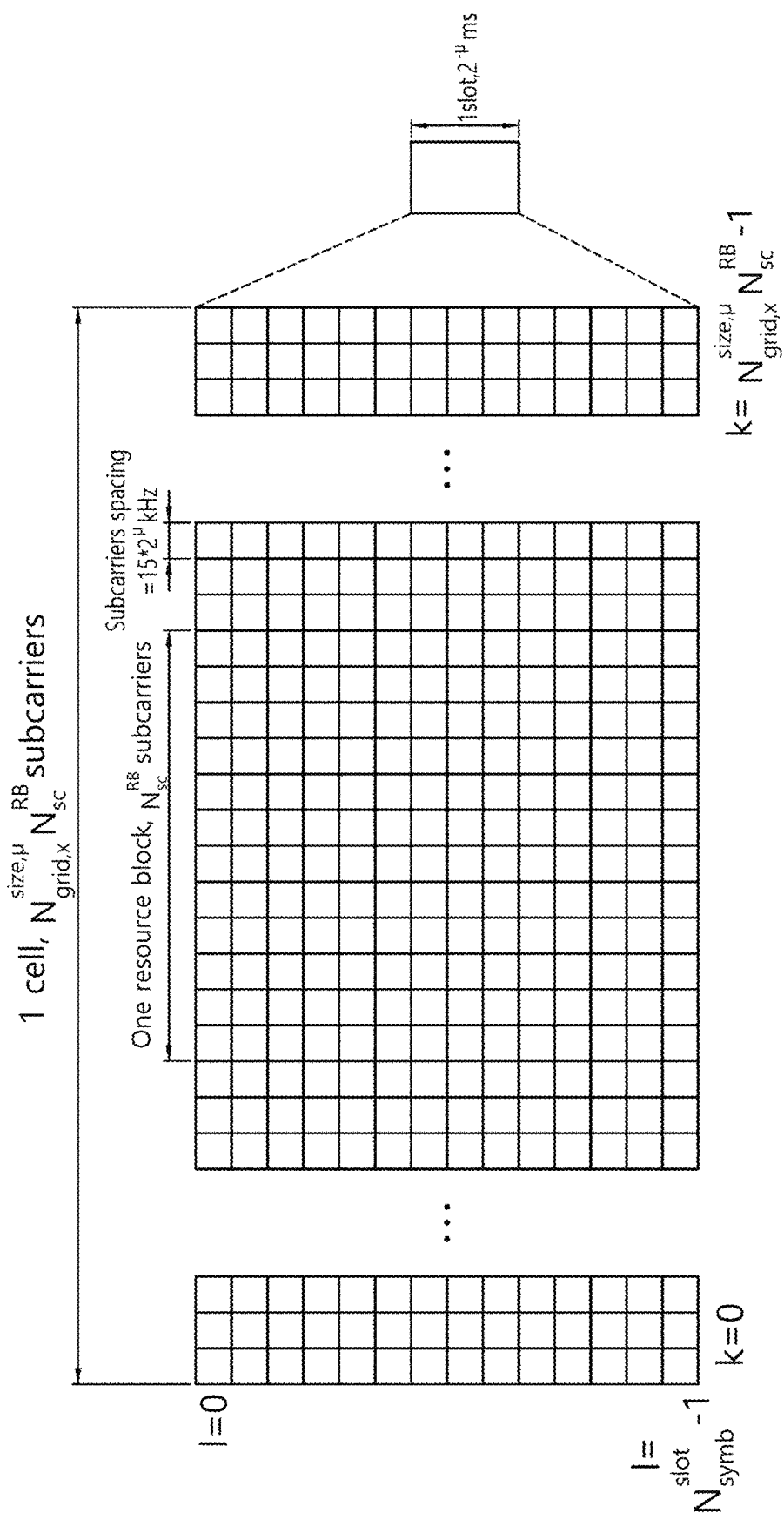
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, 1) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a random access response (RAR) message for the preamble from the base station through the PDCCH and the

TABLE 1

| index | \multicolumn{14}{c|}{Symbol number in a slot} | index | \multicolumn{14}{c|}{Symbol number in a slot} |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | X | X | X | X | U | U |
| 16 | D | X | X | X | X | X | X | X | X | X | X | X | X | X | 44 | D | D | D | D | D | X | X | X | X | X | X | X | U | U |
| 17 | D | D | X | X | X | X | X | X | X | X | X | X | X | X | 45 | D | D | D | D | D | X | X | U | U | U | U | U | U | U |
| 18 | D | D | D | X | X | X | X | X | X | X | X | X | X | X | 46 | D | D | D | D | X | U | D | D | D | D | D | D | X | U |
| 19 | D | X | X | X | X | X | X | X | X | X | X | X | X | U | 47 | D | D | X | U | U | U | D | D | X | U | U | U | U | U |
| 20 | D | D | X | X | X | X | X | X | X | X | X | X | X | U | 48 | D | X | U | U | U | U | D | X | U | U | U | U | U | U |
| 21 | D | D | D | X | X | X | X | X | X | X | X | X | X | U | 49 | D | D | D | X | X | U | D | D | D | X | X | U | U | U |
| 22 | D | X | X | X | X | X | X | X | X | X | X | X | U | U | 50 | D | D | X | X | U | U | D | D | X | X | U | U | U | U |
| 23 | D | D | X | X | X | X | X | X | X | X | X | X | U | U | 51 | D | X | X | U | U | U | D | X | X | U | U | U | U | U |
| 24 | D | D | D | X | X | X | X | X | X | X | X | X | U | U | 52 | D | X | X | X | X | U | D | X | X | X | X | X | X | U |
| 25 | D | X | X | X | X | X | X | X | X | X | U | U | U | U | 53 | D | D | X | X | X | U | D | D | X | X | X | X | U | U |
| 26 | D | D | X | X | X | X | X | X | X | X | U | U | U | U | 54 | X | X | X | X | X | X | D | D | D | D | D | D | D | D |
| 27 | D | D | D | X | X | X | X | X | X | X | U | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
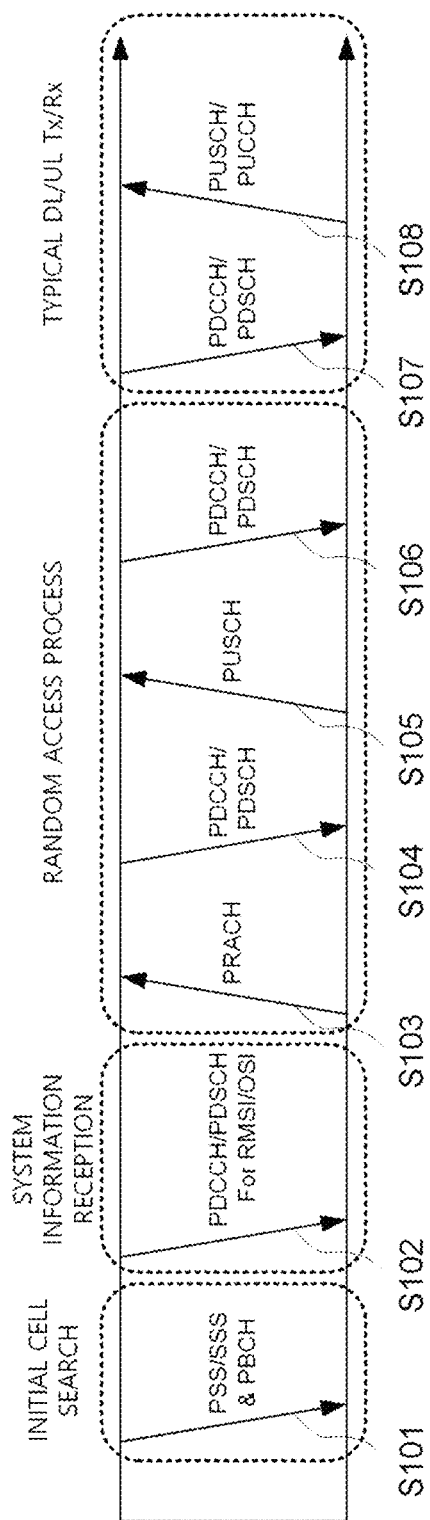
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more corresponding PDSCH (S104). In this case, the preamble in steps S103 and S104 may be described as message 1 (Msg1), and the random access response may be described as a response message or message 2 (Msg2). When a valid random access response is received by the UE, the UE transmits data including the identifier of the UE and the like to the base station through a physical uplink shared channel (PUSCH) indicated by the UL grant transmitted through the PDCCH from the base station (S105). In this case, the data including the own identifier of step S105 and the PUSCH including the data may be described as message 3 (Msg3). Also, the PUSCH including the data may be described as Message 3 PUSCH (Msg3 PUSCH). Next, the UE waits for reception of the PDCCH as an indication of the base station for collision resolution. When the UE successfully receives the PDCCH through its own identifier and receives the corresponding PDSCH (S106), the random access process ends. In this case, the PDCCH and PDSCH of step S106 may be described as message 4 (Msg 4). During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
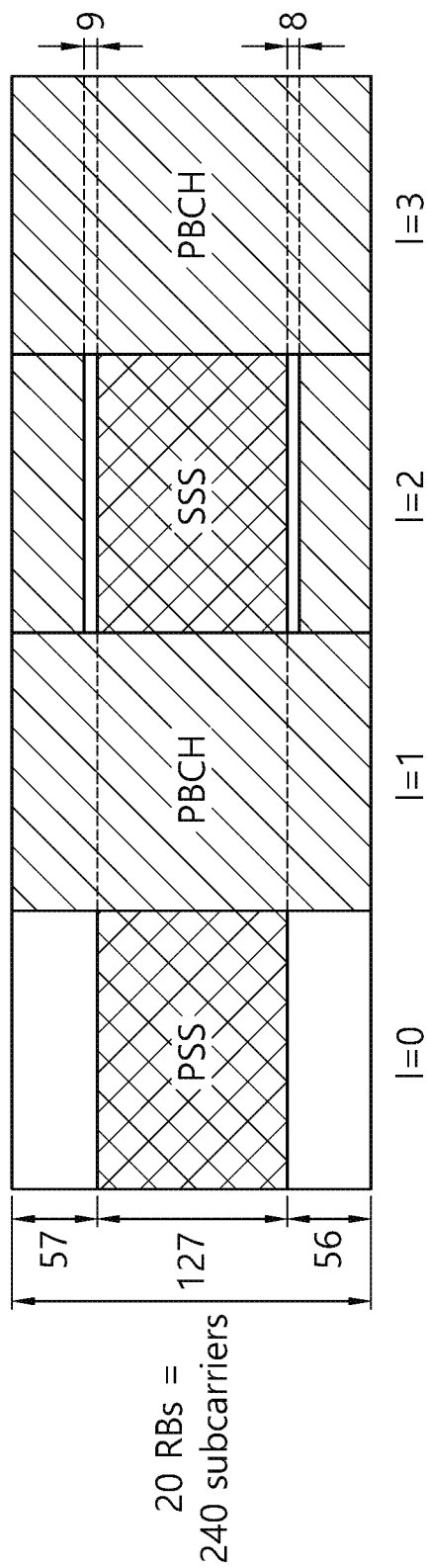
FIGS. 4a and 4b illustrate an SS/PBCH block for initial cell access in a 3GPP NR system.
Figure 4B:
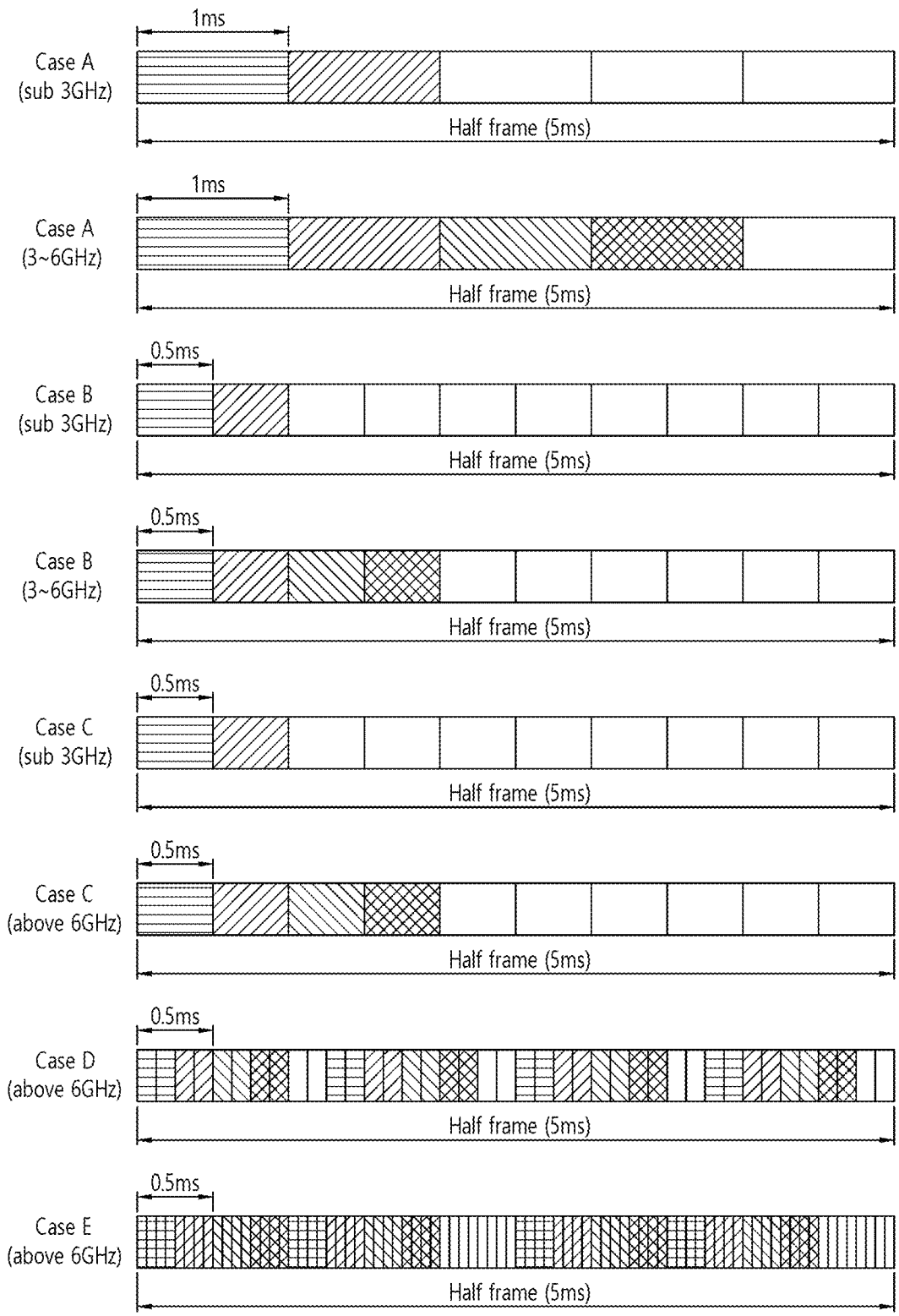

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v, 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID}) \bmod 127$$

$$0 \leq n < 127$$

Here, $x(i+7)=(x(i+4)+x(i)) \bmod 2$ and is given as, $$[x(6)x(5)x(4)x(3)x(2)x(1)x(0)]=[1\ 1\ 1\ 0\ 1\ 1\ 0]$$

Further, the sequence $d_{SSS}(n)$ of the SSS is as follows.

$$d_{SSS}(n)=[1-2x_0((n+m_0) \bmod 127)][1-2x_1((n+m_1) \bmod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \leq n < 127$$

$$x_0(i+7)=(x_0(i+4)+x_0(i)) \bmod 2$$

Here, $x_1(i+7)=(x_1(i+1)+x_1(i)) \bmod 2$ and is given as, $$[x_0(6)x_0(5)x_0(4)x_0(3)x_0(2)x_0(1)x_0(0)]=[0\ 0\ 0\ 0\ 0\ 0\ 1]$$

$$[x_1(6)x_1(5)x_1(4)x_1(3)x_1(2)x_1(1)x_1(0)]=[0\ 0\ 0\ 0\ 0\ 0\ 1]$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is $\{4, 8, 16, 20\}+28*n$. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ($\{4, 8, 16, 20\}+28*n$)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ($\{8, 12, 16, 20, 32, 36, 40, 44\}+56*n$)-th symbol. In this case, at a carrier frequency of 6 GHz or more, n=0, 1, 2, 3, 5, 6, 7, 8.

Figure 5A:
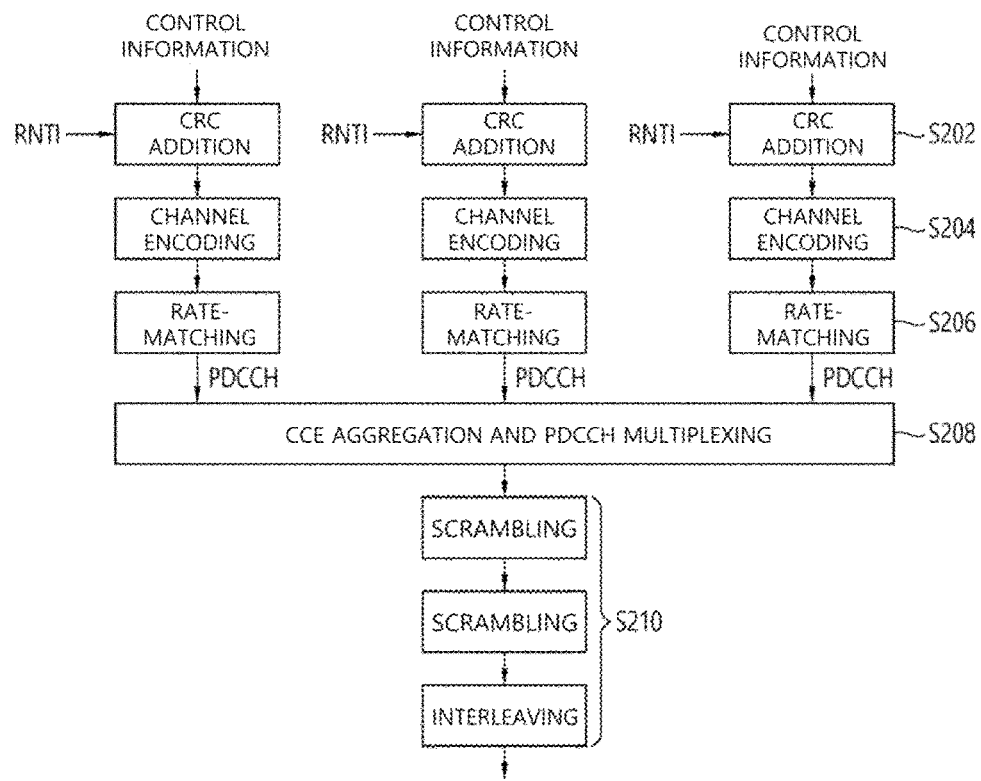
FIG. 5a and FIG. 5b illustrate a procedure for transmitting control information and a control channel in a 3GPP NR system.
Figure 5B:
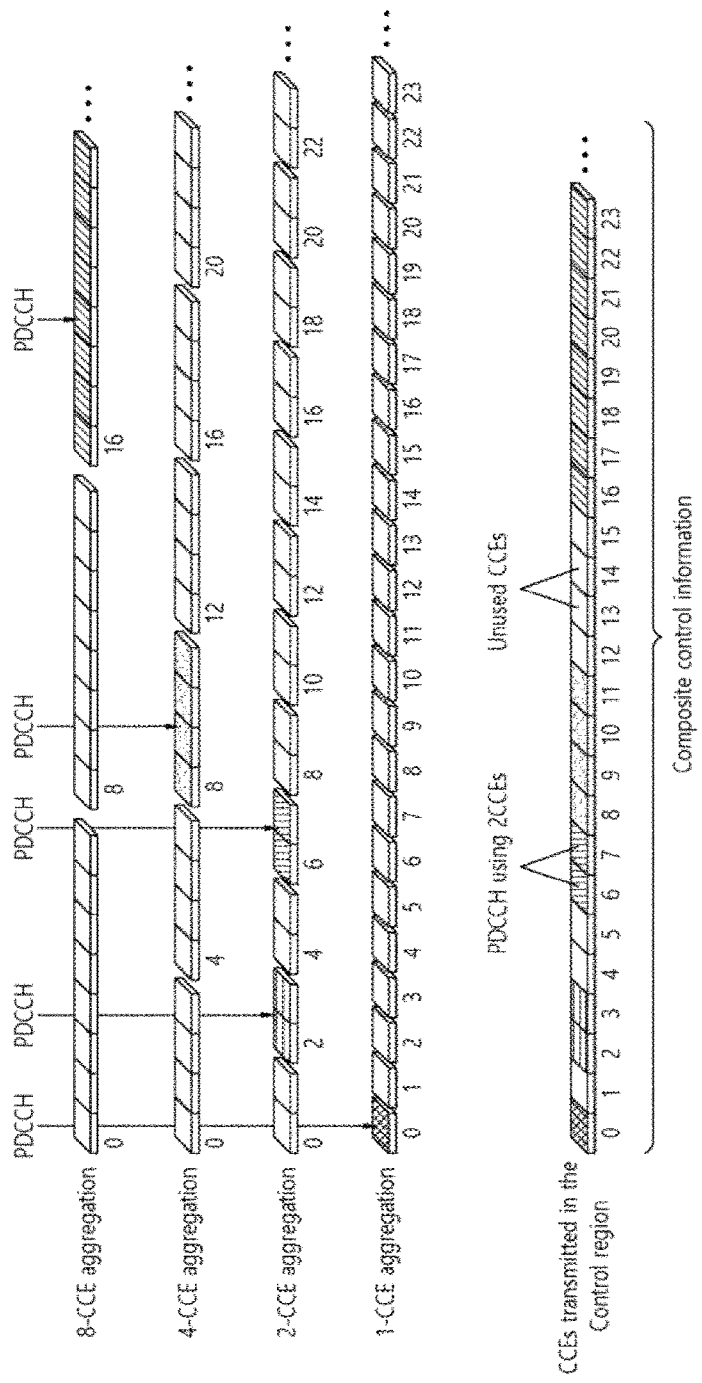

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
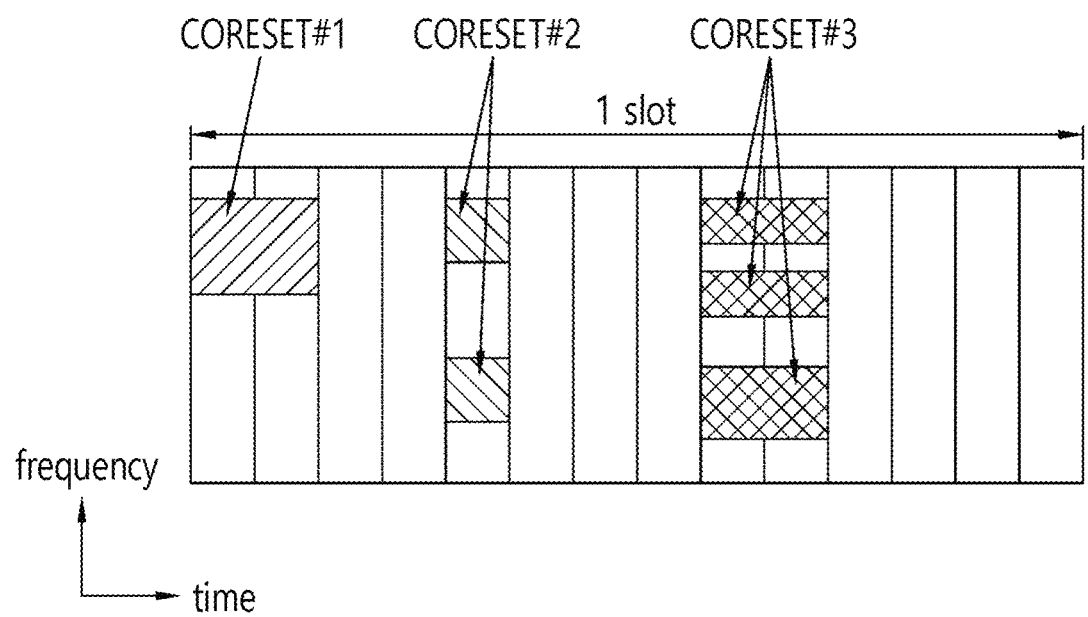
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
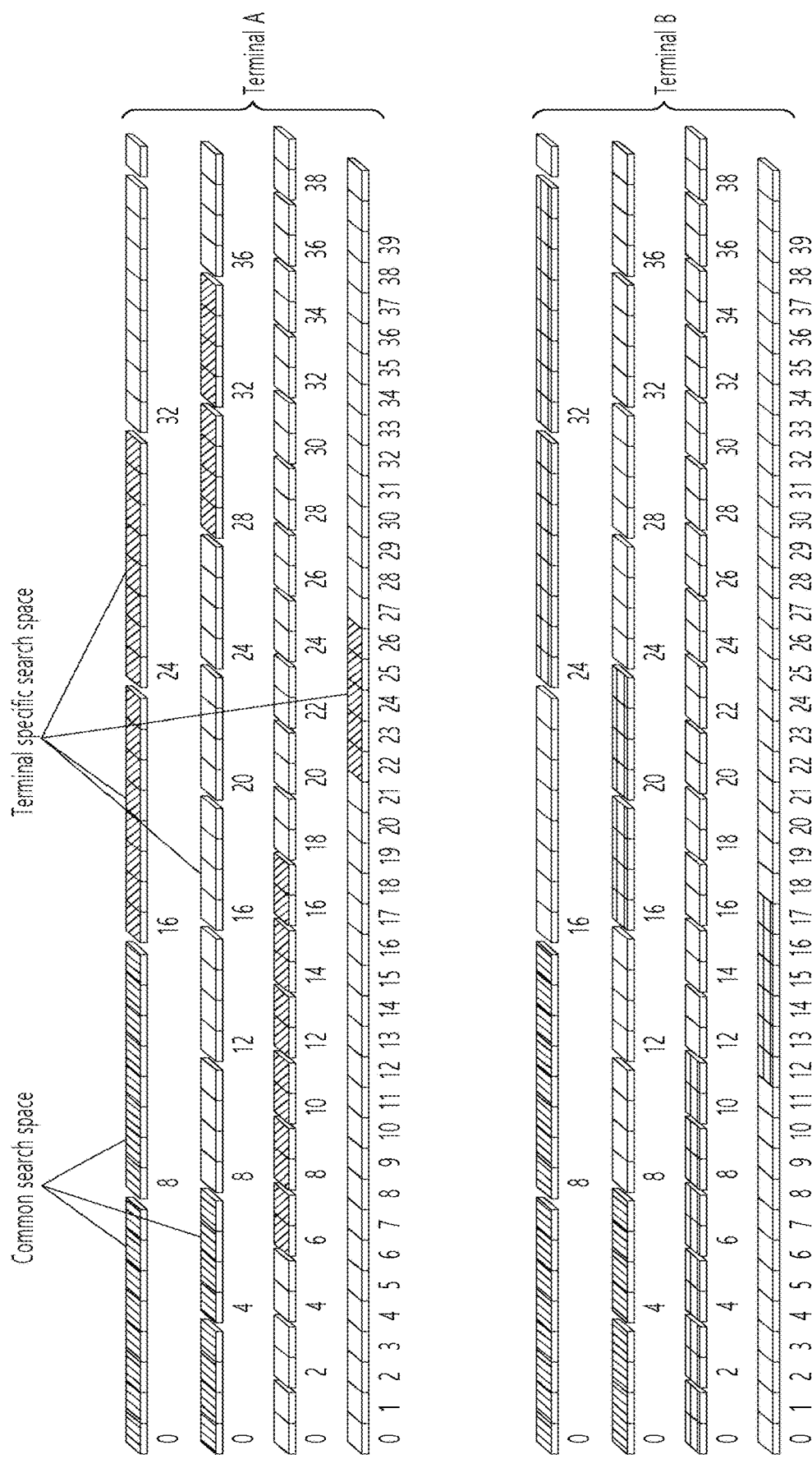
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.
  Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
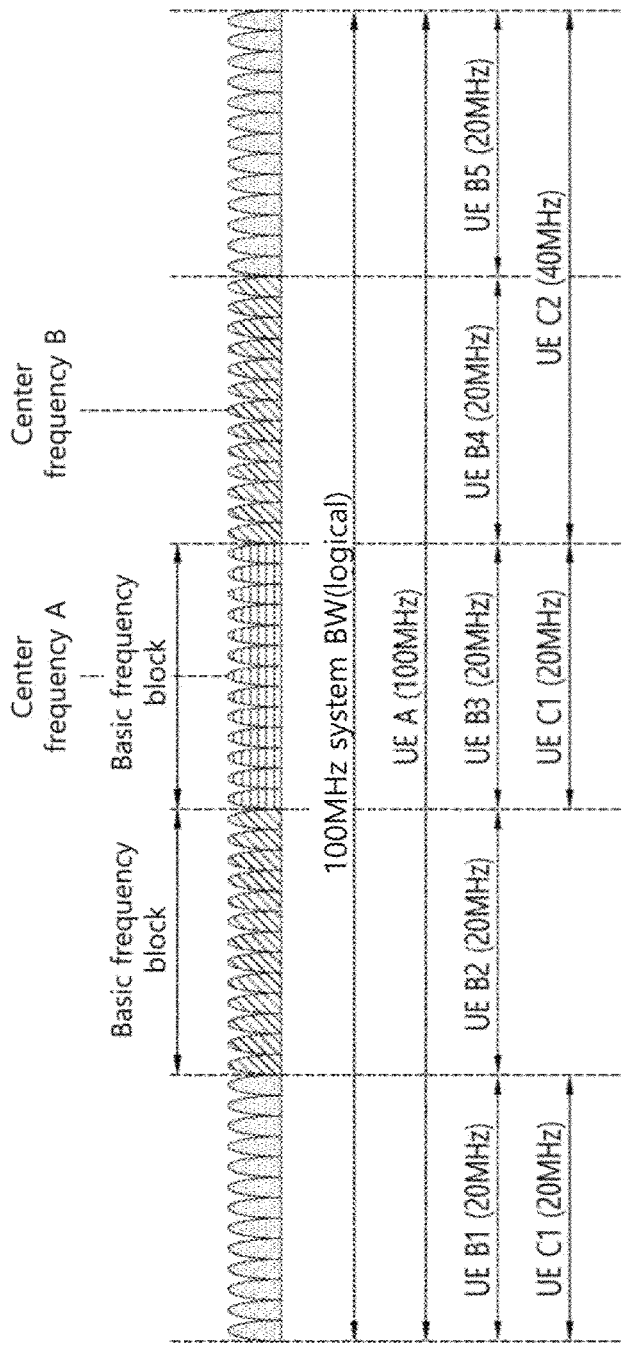
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/ or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
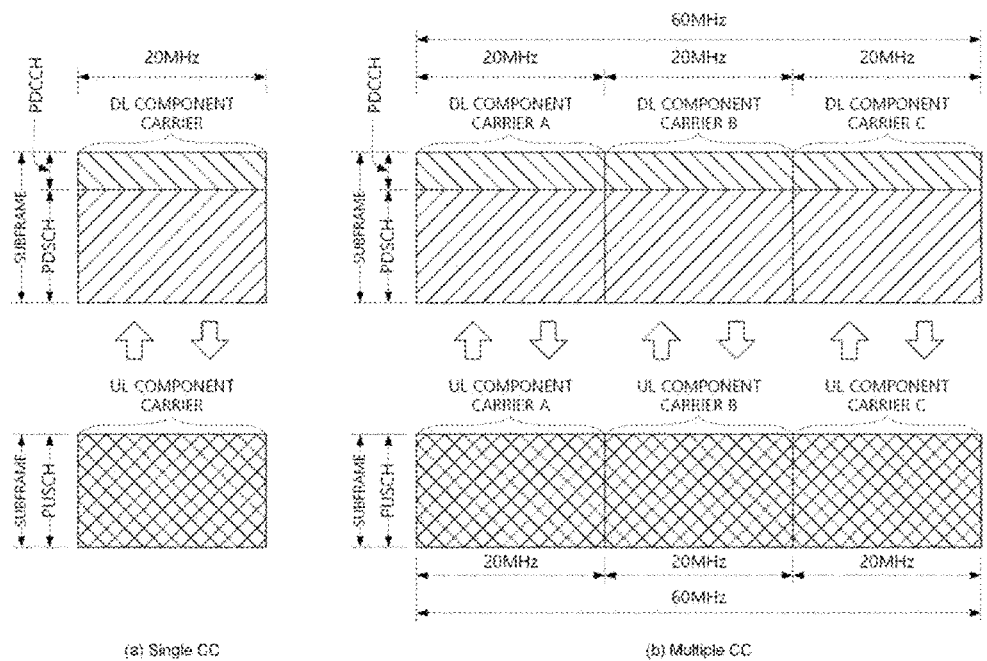
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
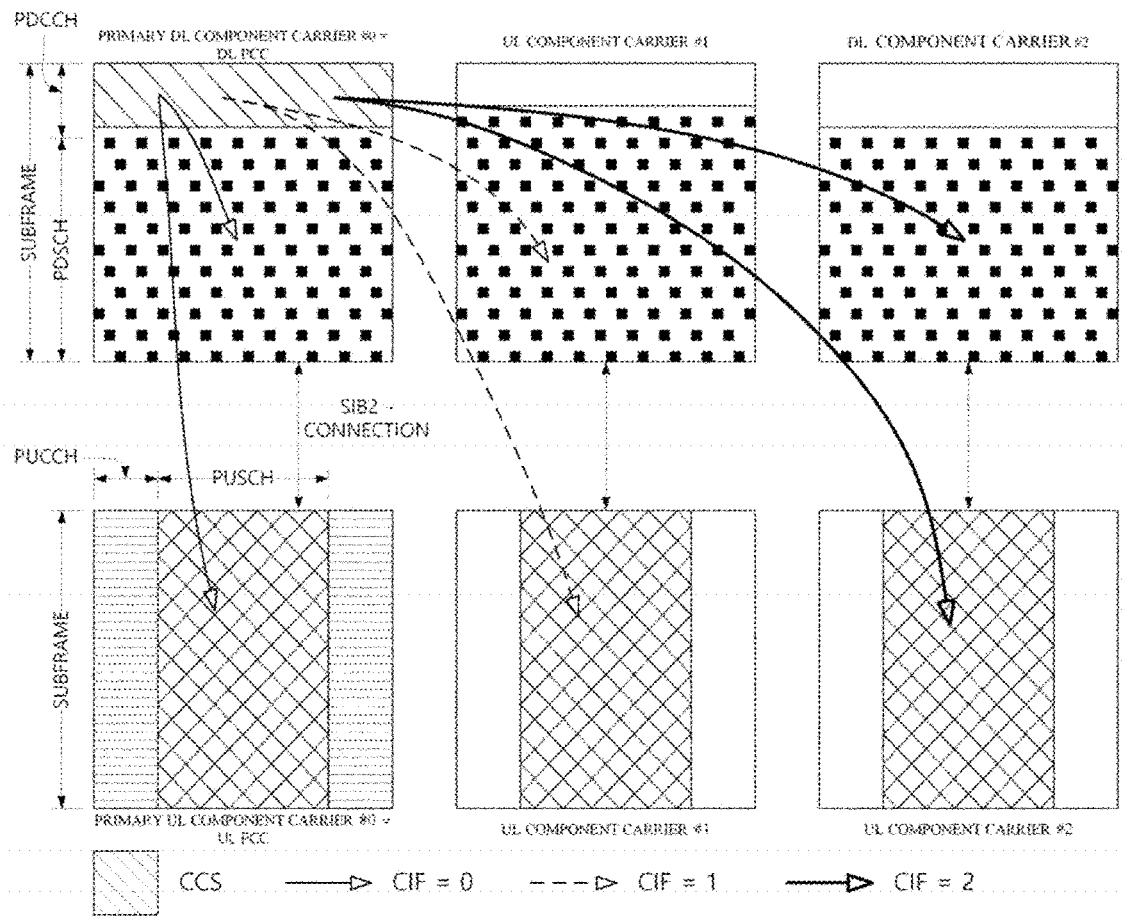
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
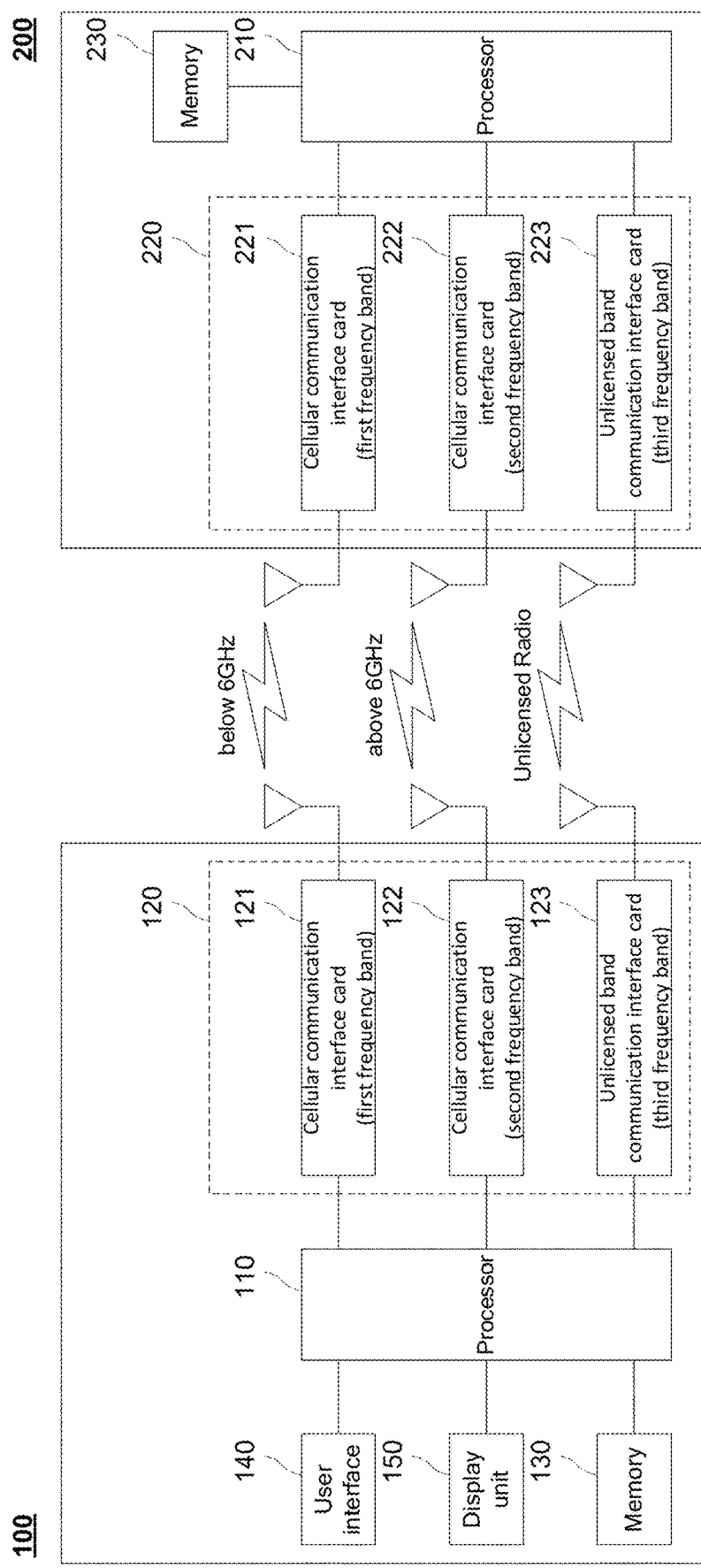
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
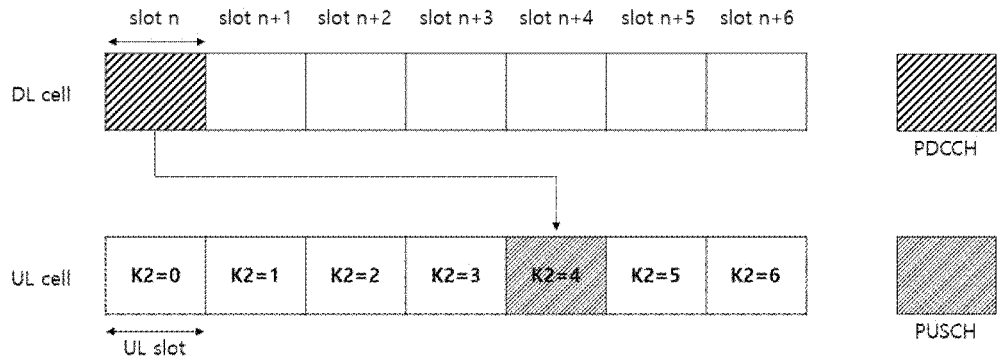
FIG. 12 illustrates a method of scheduling a physical uplink shared channel in a time domain according to an embodiment of the present disclosure.
Figure 12:
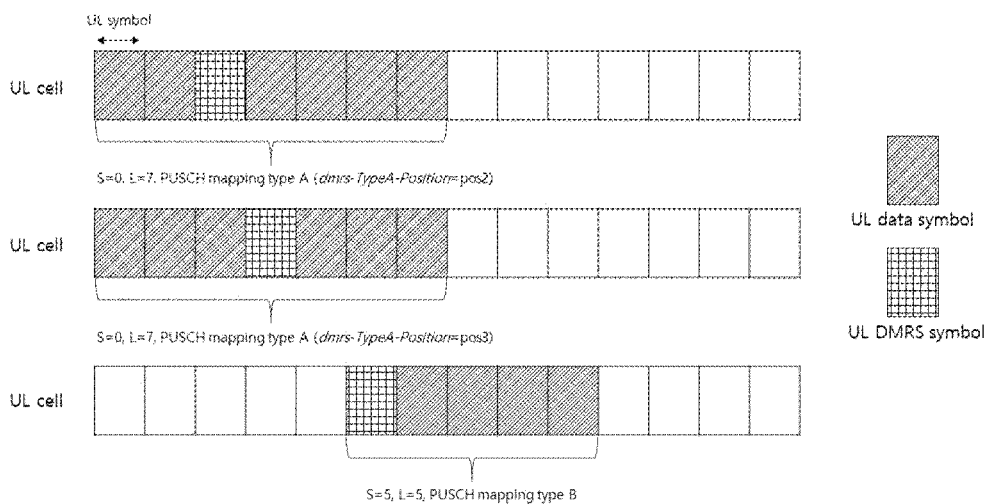

FIG. 12 illustrates a method of scheduling a physical uplink shared channel in a time domain according to an embodiment of the present disclosure.

A terminal may transmit uplink data to a base station through a PUSCH. The base station may schedule (PUSCH scheduling), for the terminal, to transmit uplink data through the PUSCH. i) In a dynamic grant (DG) method, the base station may perform PUSCH scheduling via DCI included in a PDCCH. Alternatively, ii) in a configured grant (CG) method, the terminal may transmit uplink data to the base station through a PUSCH according to a resource and a transmission method preconfigured for the terminal by the base station.

In this case, DCI included in a PDCCH may include PUSCH scheduling information. For example, the DCI may include time domain information (time-domain resource assignment (TDRA)) and frequency domain information (frequency-domain resource assignment (FDRA)). The terminal may receive DCI transmitted in a control resource set and a search space, and may perform operations (e.g., uplink data transmission through the PUSCH) indicated via the DCI. In this case, a DCI format for PUSCH scheduling may be DCI formats 0_0, 0_1, and 0_2. DCI of DCI formats 0_0, 0_1, and 0_2 may include a TDRA field including time domain information of the PUSCH. In this case, the time domain information may include K2, which is an offset value between a slot in which the PDCCH is transmitted from the base station and a slot in which the terminal transmits the PUSCH. In addition, the DCI may include a start and length indication value (SLIV) which is a jointcoded value of a starting symbol index (S) of the PUSCH and a symbol length (L, number) of the PUSCH in a slot indicated by K2. If the terminal receives the DCI in slot n, a slot in which the PUSCH is scheduled may be a floor $(n*2^{\mu PUSCH}/n*2^{\mu PDCCH})$+K2 slot. µPUSCH and µPDCCH may refer to a subcarrier spacing (SCS) of a cell in which the PUSCH is scheduled and a cell in which the terminal receives the PDCCH, respectively. floor(x) is a function that returns a largest integer among integers equal to or smaller than x. In the present specification, slot n may refer to a slot indexed with index n.

Referring to FIG. 12(a), a subcarrier spacing of a cell in which the terminal receives a PDCCH and a cell in which a PUSCH is scheduled may be the same. In this case, if the terminal receives the PDCCH in slot n and is indicated that K2 is 4, a slot in which the PUSCH is scheduled may be slot n+K2, that is, slot n+4.

As for a PUSCH scheduling type, there may be two mapping types of PUSCH mapping type A and PUSCH mapping type B. Depending on a PUSCH mapping type, the range of possible values for an SLIV of the PUSCH may vary. In PUSCH mapping type A, only resource allocation including a DMRS symbol is possible, and the DMRS symbol may be located in a third or fourth symbol of a slot according to a value indicated by a higher layer. That is, in the case of PUSCH mapping type A, an index (S) of a starting symbol of the PUSCH may be 0, and a length (L) of the PUSCH may have one of values from 4 to 14 (12 for an extended CP) according to a DMRS symbol position. In PUSCH mapping type B, a first symbol of the PUSCH may be a DMRS symbol. Accordingly, S may have a value from 0 to 13 (11 for an extended CP), and L may have one of values from 1 to 14 (12 for an extended CP). In addition, since one PUSCH cannot cross a slot boundary, the sum of S and L should be smaller than or equal to 14 (12 for an extended CP).

Referring to FIG. 12(b), the base station may schedule PUSCH mapping type A in which a third symbol is a DMRS symbol, an index (S) of a starting symbol is 0, and a length (L) is 7, may schedule PUSCH mapping type A in which a fourth symbol is a DMRS symbol, an index (S) of a starting symbol is 0, and a length (L) is 7, and may schedule PUSCH mapping type B in which a first symbol is a DMRS symbol, an index (S) of a starting symbol is 5, and a length (L) is 5. In this case, frequency domain information of the PUSCH indicated in the FDRA field of DCI format 0_0, 0_1, or 0_2 may be divided into two types according to frequency resource allocation types.

Figure 13:
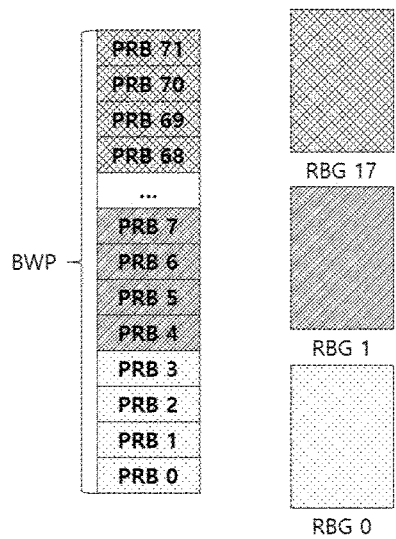
FIG. 13 illustrates a method of scheduling a physical uplink shared channel in a frequency domain according to an embodiment of the present disclosure.
Figure 13:
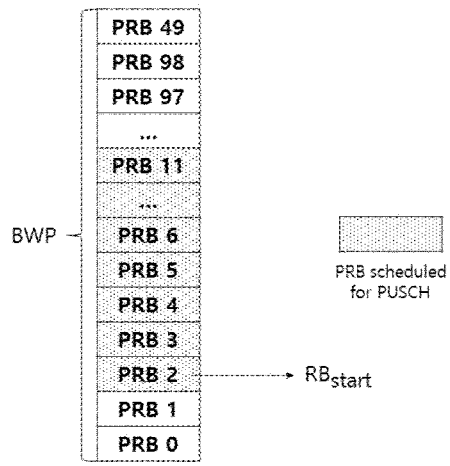

FIG. 13 illustrates a method of scheduling a physical uplink shared channel in a frequency domain according to an embodiment of the present disclosure.

Hereinafter, a frequency resource allocation type will be described with reference to FIG. 13.

i) Frequency resource allocation type 0 which is a first type may be a type in which an RBG is configured by bundling a certain number of PRBs according to the number of RBs included in a BWP configured (set) for a terminal, and whether to use the RBG is indicated via a bitmap in units of RBGs. That is, the terminal may determine whether to use a corresponding RBG via a bitmap transmitted from a base station. The number of PRBs included in one RBG may be set (configured) from a higher layer, and as the larger the number of RBs included in a BWP are set (configured) for the terminal, the more PRBs may be set (configured). Referring to FIG. 13(a), a BWP size set (configured) for the terminal may be 72 PRBs, and one RBG may include 4 PRBs. In this case, the terminal may determine four PRBs as one RBG in ascending order from PRB 0, and each RBG may be indexed from 0. That is, an RBG including PRBs 0 to PRB 3 may be indexed as RBG 0, and an RBG including PRBs 4 through PRB 7 may be indexed as RBG 1. Up to RBG 17 may be indexed in the same manner, wherein the base station may transmit 1 bit (value of 0 or 1) per RBG, i.e., a total of 18 bits, to the terminal, and the terminal may determine, based on the received 18 bits, whether to use PRBs constituting a corresponding RBG. In this case, if a bit value is 0, the terminal may determine that a PUSCH is not scheduled for any PRB among the PRBs constituting the corresponding RBG. If the bit value is 1, the terminal may determine that a PUSCH is scheduled for all PRBs in the corresponding RBG. In this case, the bit value may be applied in reverse. ii) Frequency resource allocation type 1 which is a second type may be a type indicating information on consecutive PRBs allocated according to a size of an active BWP or an initial BWP of the terminal. The information on consecutive PRBs may be a resource indication value (RIV) value in which a start index (S) and a length (L) of the consecutive PRBs are jointly coded. Referring to FIG. 13(b), when a BWP size is 50 PRBs, and a PUSCH is scheduled for the terminal from PRB 2 to PRB 11 among the 50 PRBs, a start index of consecutive PRBs may be 2 and a length may be 10. That is, the terminal may determine the start index and the length of consecutive PRBs in which the PUSCH is scheduled, based on an RIV value received from the base station. Specifically, the RIV may be calculated by $N^{size}_{BWP}*(L-1)+S$. $N^{size}_{BWP}$ may be the size of BWP configured for the terminal. For example, if the RIV value received by the terminal is 452, calculation of 452 is based on 452=50*(10−1)+2, and therefore the terminal may determine that the start index of consecutive PRBs in which the PUSCH is scheduled is 2 and the length is 10.

Via DCI of DCI format 0_1 or 0_2 for scheduling of the PUSCH, the terminal may be configured, from a higher layer, to use only one of the aforementioned two frequency resource allocation types or dynamically use both the two types. If the terminal is configured to dynamically use the two types, the terminal may determine a frequency resource allocation type to be used, via 1 bit of a most significant bit (MSB) of an FDRA field of the DCI.

There may be an uplink shared channel transmission method based on a configured grant for URLLC transmission, etc. The uplink shared channel transmission method based on a configured grant may be described as grant-free transmission. The uplink shared channel transmission method based on a configured grant may be a method in which, if the base station configures, for the terminal, available resources for uplink transmission via a higher layer (i.e., RRC signaling), the terminal may transmit an uplink shared channel by using the configured resources. The uplink shared channel transmission method based on a configured grant may be classified into two types depending on whether DCI indicates activation and release. i) Type 1 of the uplink shared channel transmission method based on a configured grant may be a method of configuring a transmission method and resources in advance via a higher layer. ii) Type 2 of the uplink shared channel transmission method based on a configured grant may be a method of configuring configured grant-based transmission via a higher layer, and indicating DCI, a method and resources for actual transmission.

The uplink transmission method based on a configured grant may support URLLC transmission. Accordingly, uplink transmission may be repeatedly performed on multiple slots to ensure high reliability. In this case, a redundancy version (RV) sequence may be one of $\{0, 0, 0, 0\}$, $\{0, 2, 3, 1\}$, and $\{0, 3, 0, 3\}$, and an RV corresponding to a (mod(n−1, 4)+1)th value may be used in an nth repeated transmission. That is, an RV corresponding to a value obtained by adding 1 to a remainder of dividing n−1 by 4 may be used. In addition, the terminal configured to repeatedly transmit an uplink channel may start repeated transmission only in a slot having an RV value of 0. However, if an RV sequence is $\{0, 0, 0, 0\}$ and an uplink channel is configured to be repeatedly transmitted in 8 slots or more, the terminal may not start repeated transmission in the last slot in which repetition transmission is configured. The terminal may terminate repeated transmission when a UL grant having the same HARQ process ID is received or when the number of repeated transmissions configured via a higher layer is reached or a periodicity is exceeded. The UL grant may refer to DCI for PUSCH scheduling.

As described above, in order to improve PUSCH transmission/reception reliability between a base station and a terminal in a wireless communication system, the base station may configure for the terminal to repeatedly transmit a PUSCH.

Figure 14:
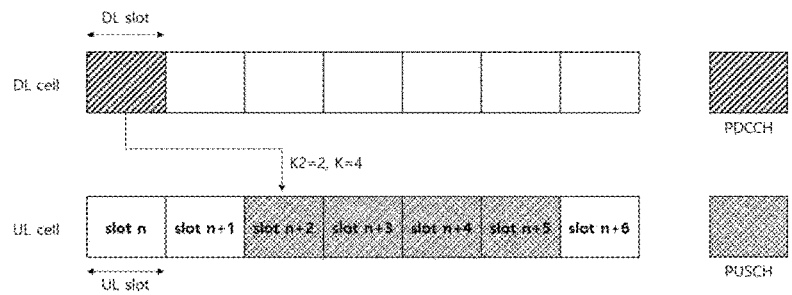
FIG. 14 illustrates repeated transmission of a physical uplink shared channel according to an embodiment of the present disclosure.
Figure 14:
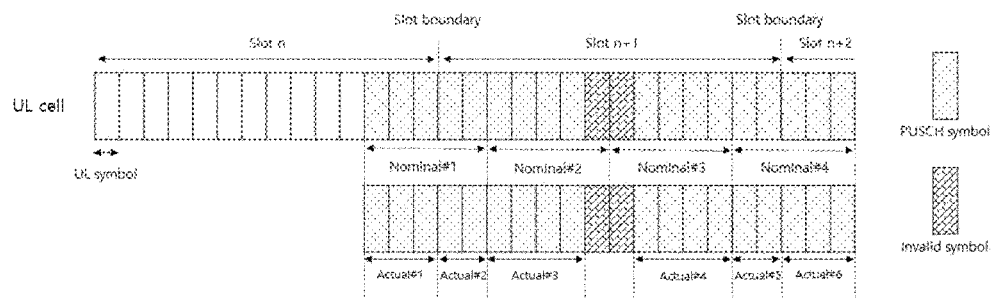

FIG. 14 illustrates repeated transmission of a physical uplink shared channel according to an embodiment of the present disclosure.

Repeated PUSCH transmission performed by a terminal may be of two types. i) First, repeated PUSCH transmission type A will be described. When a terminal receives DCI of DCI format 0_1 or 0_2 included in a PDCCH for PUSCH scheduling from a base station, the terminal may repeatedly transmit a PUSCH on K consecutive slots. A K value may be configured from a higher layer or may be a value included in a TDRA field of the DCI so as to be configured for the terminal. For example, referring to FIG. 14A, the terminal may receive the PDCCH for PUSCH scheduling in slot n, and a K2 value may be configured from DCI included in the received PDCCH. In this case, if the K2 value is 2 and the K value is 4, the terminal may start repeated PUSCH transmission in slot n+K2, and may repeatedly transmit a PUSCH until slot n+K2+K−1. That is, the terminal starts repeated PUSCH transmission in slot n+2 and repeatedly transmits a PUSCH until slot n+5. In this case, time and frequency domain resources in which the PUSCH is transmitted in each slot may be the same as those indicated in the DCI. That is, the PUSCH may be transmitted in the same symbol and PRB(s) within a slot. ii) Next, repeated PUSCH transmission type B will be described. Repeated PUSCH transmission type B may be a type used for the terminal to perform low-latency repeated PUSCH transmission in order to satisfy URLLC requirements, etc. The terminal may be configured with a symbol (S) in which repeated PUSCH transmission starts and a length (L) of the repeated PUSCH transmission, via the TDRA field of the DCI transmitted by the base station. In this case, the starting symbol (S) and the length (L) may be for a temporarily obtained nominal PUSCH rather than an actual PUSCH actually transmitted by the terminal. A separate symbol may not exist between nominal PUSCHs configured to be repeatedly transmitted. That is, nominal PUSCHs may be consecutive in the time domain. The terminal may determine an actual PUSCH from the nominal PUSCHs. One nominal PUSCH may be determined to be one or multiple actual PUSCHs. The base station may configure, for the terminal, symbols unavailable for repeated PUSCH transmission type B. Symbols unavailable for repeated PUSCH transmission type B may be described as invalid symbols. The terminal may exclude invalid symbols from among resources configured to transmit nominal PUSCHs. As described above, nominal PUSCHs are configured to be repeatedly transmitted on consecutive symbols, but if invalid symbols are excluded, resources for nominal PUSCH transmission become inconsecutive. An actual PUSCH may be configured to be transmitted on consecutive symbols configured for one nominal PUSCH transmission except for invalid symbols. In this case, if consecutive symbols cross a slot boundary, an actual PUSCH actually transmitted based on the slot boundary may be divided. Invalid symbols may include downlink symbols configured for the terminal by the base station. Referring to FIG. 14B, the terminal may be scheduled with PUSCH transmission having a length of 5 symbols starting from a 12th symbol of a first slot (slot n), and may be configured with 4 times of type B repeated transmission. In this case, resources scheduled for a first nominal PUSCH (nominal #1) may include symbol (n,11), symbol (n,12), symbol (n,13), symbol (n+1,0), and symbol (n+1,1). Resources scheduled for a second nominal PUSCH (nominal #2) may include symbol (n+1,2), symbol (n+1,3), symbol (n+1,4), symbol (n+1,5), and symbol (n+1,6). Resources scheduled for a third nominal PUSCH (nominal #3) may include symbol (n+1,7), symbol (n+1,8), symbol (n+1,9), symbol (n+1,10), and symbol (n+1,11). Resources scheduled for a fourth nominal PUSCH (nominal #4) may include symbol (n+1, 12), symbol (n+1,13), symbol (n+2,0), symbol (n+2,1), and symbol (n+2,2). In this case, symbol (n,k) represents symbol k of slot n. That is, k may be a value starting from 0 to 13 for a normal CP, and may be a value from 0 to 11 for an extended CP. Invalid symbols may be configured to be symbols 6 and 7 of slot n+1. In this case, in order to determine an actual PUSCH, a last symbol of the second nominal PUSCH (nominal #2) may be excluded, and a first symbol of the third nominal PUSCH (nominal #3) may be excluded. The first nominal PUSCH (nominal #1) may be divided into two actually transmitted actual PUSCHs (actual

1 and actual #2) by a slot boundary. Each of the second nominal PUSCH (nominal #2) and the third nominal PUSCH (nominal #3) may be distinguished into one actual PUSCH (actual #3 and actual #4) by combining consecutive symbols except for an invalid symbol. Finally, the fourth nominal PUSCH (nominal #4) is divided into two actually transmitted (actual) PUSCHs (actual #5 and actual #6) by a slot boundary. The terminal finally transmits actually transmitted (actual) PUSCHs. One actual PUSCH should include at least one DMRS symbol. Accordingly, when repeated PUSCH transmission type B is configure, if a total length of the actual PUSCH is one symbol, the actual PUSCH may be omitted without being transmitted. This is because the actual PUSCH with one symbol may not include information other than a DMRS.

In order to obtain diversity gain in the frequency domain, frequency hopping may be configured for uplink channel transmission.

For repeated PUSCH transmission type A, one of intra-slot frequency hopping, in which frequency hopping is performed within a slot, and inter-slot frequency hopping, in which frequency hopping is performed in each slot, may be configured for the terminal. If intra-slot frequency hopping is configured for the terminal, the terminal may divide the PUSCH in half in the time domain in a slot for transmitting the PUSCH and transmit one half of the PUSCH in a scheduled PRB, and may transmit the other half in a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

For repeated PUSCH transmission type B, one of inter-repetition frequency hopping, in which frequency hopping is performed at a nominal PUSCH boundary, and inter-slot frequency hopping, in which frequency hopping is performed in every slot, may be configured for the terminal. If inter-repetition frequency hopping is configured for the terminal, the terminal may transmit actual PUSCH(s) corresponding to an odd-numbered nominal PUSCH on a scheduled PRB, and the terminal may transmit actual PUSCH(s) corresponding to an even-numbered nominal PUSCH on a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

When the terminal performs repeated PUSCH transmission, if a symbol scheduled for PUSCH transmission in a specific slot overlaps with a semi-statically configured DL symbol or a symbol configured for reception of an SS/PBCH block, the terminal may not transmit an overlapping PUSCH on a slot including the overlapping symbol. In addition, the overlapping PUSCH may be delayed and may not be transmitted even on a subsequent slot.

If the terminal receives DCI of DCI format 1_0, 1_1, or 1_2 for PUCCH scheduling, the terminal needs to transmit a PUCCH to the base station. In this case, the PUCCH may include uplink control information (UCI), and UCI may include at least one of HARQ-ACK, a scheduling request (SR), and channel state information (CSI). HARQ-ACK may be HARQ-ACK indicating whether the terminal has successfully received two types of channels. A first type may be HARQ-ACK for a PDSCH when the terminal is scheduled with the PDSCH via DCI of DCI format 1_0, 1_1, or 1_2. A second type may be HARQ-ACK for PDCCH including the DCI when the DCI of DCI format 1_0, 1_1, or 1_2 is DCI indicating release of a semi-persistently scheduled (SPS) PDSCH. For PUCCH transmission including HARQ-ACK, a "PDSCH-to-HARQ_feedback timing indicator" field of DCI may indicate K1 which is information (value) for a slot in which the scheduled PUCCH is transmitted. Here, K1 may be a non-negative integer value. DCI of DCI format 1_0 may indicate one of $\{1, 2, 3, 4, 5, 6, 7, 8\}$ as a K1 value. The K1 value that can be indicated in DCI of DCI format 1_1 or 1_2 may be set (configured) from a higher layer.

A method of determining a slot in which a PUCCH including a first type HARQ-ACK is transmitted will be described. An uplink slot overlapping with a last symbol in which a PDSCH corresponding to HARQ-ACK is transmitted may exist. In this case, if an index of the overlapping uplink slot is m, the terminal may transmit a PUCCH including HARQ-ACK on slot m+K1. The index of the uplink slot may be a value determined based on a subcarrier spacing of a BWP in which the PUCCH is transmitted. If the terminal is configured with slot aggregation of the PDSCH, a last symbol in which a PDSCH is transmitted may refer to a last scheduled symbol within a last slot among slots in which the PDSCH is transmitted.

<A Method of Determining a Transport Block Size (TBS) for Transmission of a PUSCH>

Figure 15:
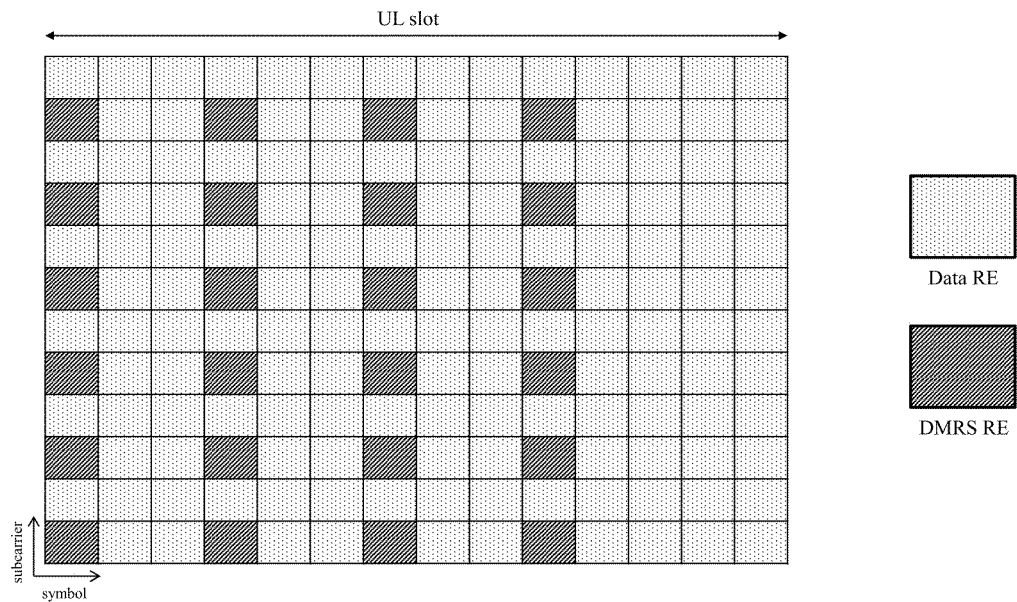
FIGS. 15 and 16 illustrate RE mapping of a physical uplink shared channel according to an embodiment of the disclosure.
Figure 16:
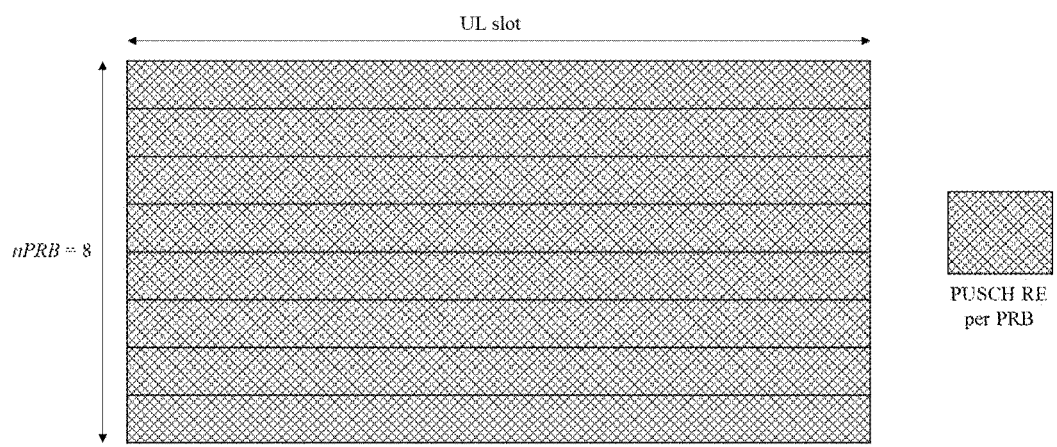

FIGS. 15 and 16 illustrate RE mapping of a physical uplink shared channel according to an embodiment of the disclosure.

PUSCH transmission by a UE may be scheduled by a base station via one of the methods as follows.
- a PUSCH scheduled via random access response (RAR) UL grant of a UE
- a PUSCH scheduled via fall-back RAR UL grant
- a PUSCH scheduled via DCI format 0_0 having a CRC scrambled with a C-RNTI, an MCS-C-RNTI-, a TC-RNTI, or a CS-RNTI
- a PUSCH scheduled via DCI format 0_1/DCI format 02 having a CRC scrambled with a C-RNTI, an MCS-C-RNTI, or a CS-RNTI
- a PUSCH via configured grant
- MsgA PUSCH For such a PUSCH, one value among modulation and coding scheme (MCS) table indices may be configured as an $I_{MCS}$ for the UE by the base station.

In the following cases, the UE may obtain a TBS via a method described below.
- the case in which a configured or indicated MCS table index value satisfies $0<=I_{MCS}<=27$, a transform precoding corresponds to 'disable', and MCS table 5.1.3.1-2 of 3GPP TS38.214 v16.3.0 (2020-09) is used.
- the case in which $0<=I_{MCS}<=28$ is satisfied, a transform precoding corresponds to 'disable', and an MCS table other than table 5.1.3.1-2 of 3GPP TS38.214 v16.3.0 (2020-09) is used.
- the case in which $0<=I_{MCS}<=27$ is satisfied, and a transform precoding corresponds to 'enable'.

According to the following process, the UE may determine the number of resource elements (REs) in a single slot for a PUSCH in case that repetitive transmission type for repetitive PUSCH transmission is configured as type A or repetitive PUSCH transmission is not configured, and may determine the number of REs in a single nominal PUSCH in case that repetitive PUSCH transmission type B is configured.

First, the UE may calculate the number of REs (N'RE) per PRB of an allocated PUSCH based on the following equation.

$$N'_{RE} = N^{RB}_{SC} * N^{sh}_{symb} - N^{PRB}_{DMRS} - N^{PRB}_{oh},$$

Here, $N^{RB}_{SC}(=12)$ denotes the number of subcarriers per physical resource block (PRB) in the frequency domain, $N^{sh}_{symb}$ denotes the number (L) of PUSCH symbols allocated in the time domain, $N^{PRB}_{DMRS}$ denotes the number of DMRS REs per PRB, and $N^{PRB}_{oh}$ denotes the number of overhead REs configured by a higher layer, which is identical to a value (xOverhead) configured by the base station. Here, the value (xOverhead) configured by the base station may be embodied as one of the numbers, that is, 0, 6, 12, and 18, for each of an uplink or downlink.

For example, as illustrated in FIG. 15, in case that configuration performed for the UE such as the number (L) of symbols is 14, a PUSCH mapping type is type B, a single symbol DMRS is used, the number of additional DMRS symbols is 3, and a DMRS configuration type is type 1 (delta shift=0), and repetitive transmission and frequency hopping are not configured, the UE may calculate, via an RE mapping pattern of FIG. 15, the number of DMRS REs and PUSCH data per PRB as $N'_{RE}=12*14-24-N^{PRB}_{oh}$. Here, in case that the number of overhead REs configured by a higher layer is assumed to be $N^{PRB}_{oh}=12$, the number of PUSCH REs per PRB may be calculated as $N'_{RE}=12*14-24-12=132$.

In case that the base station configures, for a UE, a value (xOverhead) indicating the number of overhead REs, a unit to which the value is applied may be at least one of the followings.

1) overhead per RE or symbol: considered as overhead per predetermined RE or symbol. Here, a predetermined RE or symbol may be a resource in a unit smaller than a single slot or a single nominal PUSCH. That is, the UE may determine that a value (xOverhead) indicating the number of overhead REs configured per predetermined RE or symbol in a time domain resource to which a single TB is allocated is applied.
2) overhead per symbol set: considered as overhead per single symbol set. Here, in case of repetitive PUSCH transmission type A, a single symbol set may be a single slot. In case of repetitive PUSCH transmission type B, a single symbol set may be a single nominal PUSCH. That is, the UE determines that a value (xOverhead) indicating the number of overhead REs configured per a time domain resource to which a single TB is allocated is applied.
3) overhead per slot: considered as overhead per single slot The UE determines that a value (xOverhead) indicating the number of overhead REs configured per a single slot in a time domain resource to which a single TB is allocated is applied.
4) overhead per PUSCH that transmits a TB: considered as overhead per PUSCH that transmits a single TB The UE may determine that a value (xOverhead) indicating the number of overhead REs configured for the entire time domain resource of a PUSCH to which a single TB is allocated is applied.
5) overhead of the maximum PUSCH that transmits a TB: considered as overhead of the maximum PUSCH that transmits a single TB. Here, the maximum PUSCH that transmits a single TB may be scheduling of the largest PUSCH used when the UE transmits a single TB in the time domain. That is, the UE may determine that a value (xOverhead) indicating the number of overhead REs is applied as overhead for the maximum PUSCH scheduling that is capable of being configured.

Subsequently, the UE may calculate the number of REs for transmitting the whole PUSCH in the frequency domain by using the following equation. $N_{RE}=\min(156, N'_{RE})*n_{PRB}$, Here, $n_{PRB}$ denotes the number of PRBs allocated from the base station to the UE in the frequency domain, and to be used for transmitting a PUSCH. For example, as illustrated in FIG. 16, in case that the number of PUSCH PRBs allocated to the UE in the frequency domain is $n_{PRB}=8$, the UE may calculate the total PUSCH REs in the frequency domain may be calculated as $N_{RE}=\min(156, 132)*8=1056$.

Subsequently, based on the following equation, the UE may calculate number $N_{info}$ of information bits that are not quantized.

$N_{info}=N_{RE}*R*Q_m*v$. Here, R denotes a code rate, $Q_m$ denotes a modulation order, and v denotes the number of layers. The UE may determine a TBS according to a method different depending on the condition of the calculated $N_{info}$.

In case of $N_{info}<=3824$, the UE may calculate the number of quantized information bits as $N'_{info}=\max(24, 2^n*\text{floor}(N_{info}/2^n))$. Here, $n=\max(3, \text{floor}(\log_2(N_{info}))-6)$. Subsequently, based on Table 4 provided below, the UE may determine a TBS value that is closest to but not less than $N'_{info}$ as the TBS of the PUSCH.

TABLE 4

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |

TABLE 4-continued

| Index | TBS |
|---|---|
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Table 4 is an example of a TBS in case of $N_{info}<=3824$.

In case of $N_{info}>3824$, the UE may calculate the number of quantized information bits as $N'_{info}=\max(3840, 2^n*\text{round}((N_{info}-24)/2^n))$. Here, $n=\text{floor}(\log_2(N_{info}-24))-5$.

In case that the configured or indicated code rate R of the PUSCH is less than or equal to ¼, the UE may determine a PUSCH TBS based on the following equation.

$$TBS=8*C*\text{ceil}((N'_{info}+24)/8*C)-24,$$

Here, $C=\text{ceil}((N'_{info}+24)/3816)$. ceil(x) denote the smallest integer among the numbers greater than or equal to x. In case that a code rate R of the configured or indicated PUSCH is greater than ¼, the UE may determine a PUSCH TBS based on the following equation.

In case of $N'_{info}>8424$, $TBS=8*C*\text{ceil}((N'_{info}+24)/8*C)-24$. Here, $C=\text{ceil}((N'_{info}+24)/8424)$. In case of $N'_{info}<=8424$, $TBS=8*\text{ceil}((N'_{info}+24)/8)-24$.

In case that an MCS table index configured or indicated for the UE by the base station is $28<=I_{MCS}<=31$, a transform precoding corresponds to 'disable', and MCS table 5.1.3.1-2 of 3GPP TS38.214 v16.3.0 (2020-09) is used, or in case that $28<=I_{MCS}<=31$ is used and a transform precoding corresponds to 'enable', a method of determining a TBS is as follows.

The UE may regard that a TBS is determined in DCI received via the latest PDCCH for the same TB in a condition of $0<=I_{MCS}<=27$.

In case that a PDCCH for the same TB in a condition of $0<=I_{MCS}<=27$ is not received, and initial PUSCH transmission for the same TB is based on configured grant, a TBS may be determined based on the following conditions. In case of a configured grant Type-1 PUSCH, the UE may determine a value configured by a higher layer as a TBS. In case of a configured grant Type-2 PUSCH, the UE may determine a TBS based on information in a PDCCH that schedules a configured grant Type-2 PUSCH received last.

In case that an $I_{MCS}$ that is a configured or indicated MCS table index value, information indicating whether a transform precoding corresponds to 'enable', and an applied MCS table are not included in the above-described conditions, a TBS may be determined according to the following method.

The UE may regard that a TBS is determined in DCI received via the latest PDCCH for the same TB in a condition of $0<=I_{MCS}<=28$.

In case that a PDCCH for the same TB in a condition of $0<=I_{MCS}<=28$ is not received, and initial PUSCH transmission for the same TB is based on configured grant, a TBS may be determined based on each condition as follows.

In case of a configured grant Type-1 PUSCH, the UE may determine a value configured by a higher layer as a TBS.

In case of a configured grant Type-2 PUSCH, the UE may determine a TBS based on information in a PDCCH that schedules a configured grant Type-2 PUSCH received last.

As described above, in case of repetitive PUSCH transmission type A, the UE may determine a TBS based on the number of symbols in which transmission is indicated or configured in each slot, the number of REs used for a DMRS, and the amount of configured overhead. In each slot, the UE may repeatedly transmit a single TB determined by the TBS. Here, the TB transmitted in each slot may have the same redundancy version (RV) value or different RV values.

In addition, in case of repetitive PUSCH transmission type B, the UE may determine a TBS based on the number of symbols that each nominal repetition occupies, the number of REs used for a DMRS based on the number of symbols for the nominal repetition, or the amount of overhead configured. The UE may repeatedly transmit a single TB determined based on the TBS in each symbol (s) considered as actual repetition. Here, the TB transmitted in each symbol (s) considered as actual repetition may have the same redundancy version (RV) value or different RV values. Here, the nominal repetition may be divided as single actual repetition or multiple actual repetitions, which has been described with reference to FIG. 14B.

The problem that the disclosure desires to solve is about overcoming a problem that occurs in a TBS determination method and a repetitive TB transmission scheme. More specifically, in case of the repetitive PUSCH transmission type A or the repetitive PUSCH transmission type B, a TBS may be determined based on a single slot or single nominal repetition, and a TB based on the TBS is repetitively transmitted in a plurality of slots and/or symbol(s) considered as multiple actual repetitions. In this instance, the UE may repetitively transmit a TB that is in a small size and has a small TBS for a PUSCH. However, in some cases, a problem may occur in the scheme. For example, due to an insufficient uplink coverage area, the base station may allocate a small number of PRBs to the UE so that the UE transmits a PUSCH at high power per RE. In this instance, a TBS of the UE is significantly small, and thus it is difficult to obtain a sufficient coding gain. Therefore, repetitive transmission of the significantly small TBS may be inefficient.

Figure 17:
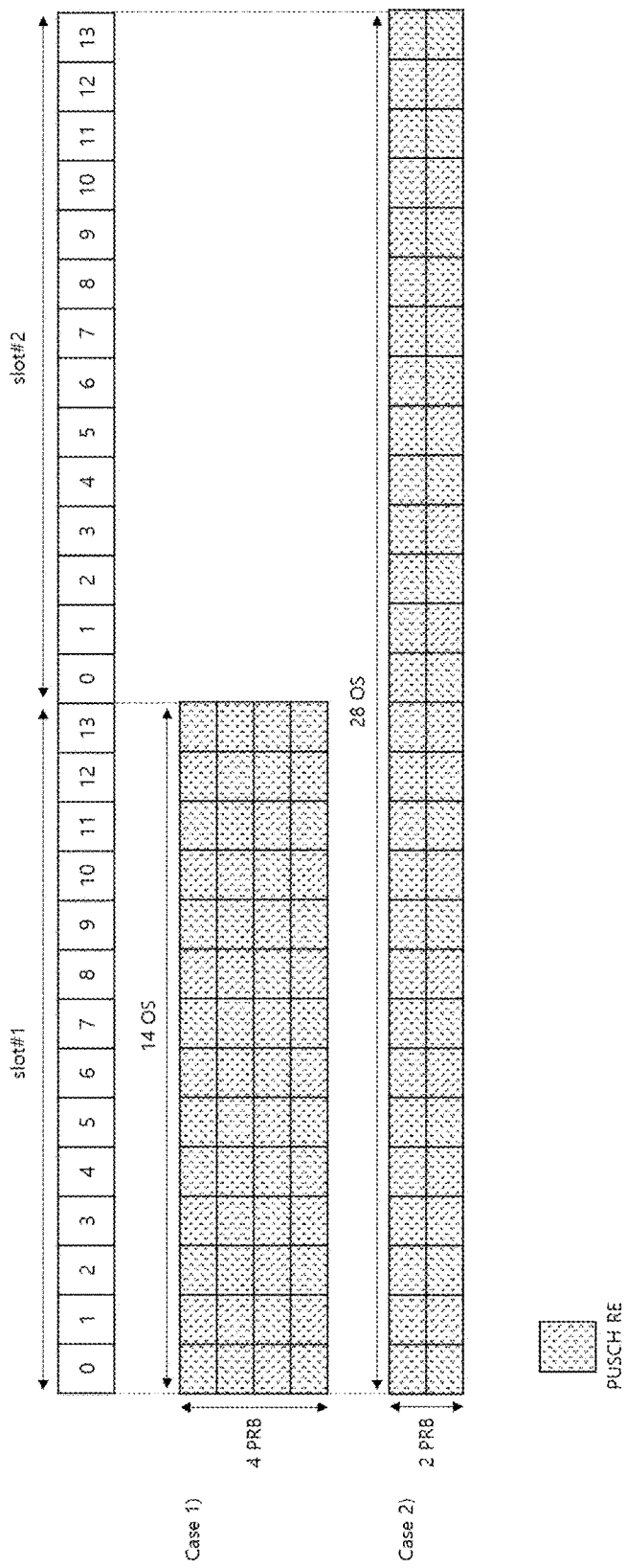
FIG. 17 is a method for determining, by a user equipment (UE), a transmission block size (TBS) based on a single slot or a single nominal PUSCH.

FIG. 17 is a method for determining, by a UE, a transport block size (TBS) based on a single slot or a single nominal PUSCH.

FIG. 17 illustrates resource allocation for transmission of a PUSCH. Referring to Case 1 in FIG. 17, a single slot (14 symbols) in the time domain and 4 PRBs in the frequency domain are allocated to a UE for transmission of a PUSCH. In case 2, two slots (28 symbols) in the time domain and 2 PRBs in the frequency domain are allocated to the UE for transmission of a PUSCH. The number of REs in case 1 and the number of REs in case 2 (disregarding the number of REs used for a DM-RS and the number of REs used for overhead) are the same, which corresponds 12*14*4=12*28*2=12*56=672. However, in case of case 1, a larger number of PRBs are allocated in the frequency domain, and thus the maximum power per RE of case 2 may be higher than that of case 1. That is, case 2 may have higher coverage than that of case 1.

However, as described above, a TBS is produced based on a single slot or a single nominal repetition. In case 1 of FIG. 17, a single slot (14 symbols) is used for PUSCH transmission. In case 2, two slots (14*2 symbols) are used for PUSCH transmission. Therefore, the number of REs that determines a TBS (disregarding the number of REs used for a DMRS and the number of REs used for overhead) may be 12*14*4 in case 1, and may be 12*14*2 in case 2. Accordingly, in case of case 2, a TBS may be lower than that of case 1. Therefore, it is incapable of obtaining higher coverage while maintaining the same TBS.

Hereinafter, a method of calculating a TBS to overcome the drawback is described. In this instance, in case of the repetitive PUSCH transmission type A or repetitive PUSCH transmission type B, the UE may determine a TBS based on multiple slots or multiple nominal repetitions, may produce a TB based on the TBS, may map the same to the multiple slots or multiple nominal repetitions, and may perform transmission. Here, the produced TB may be additionally repeated and transmitted. Hereinafter, unless otherwise mentioned, a description of repetitive transmission is omitted in the disclosure.

Hereinafter, a repetitive PUSCH transmission method is described.

Figure 18:
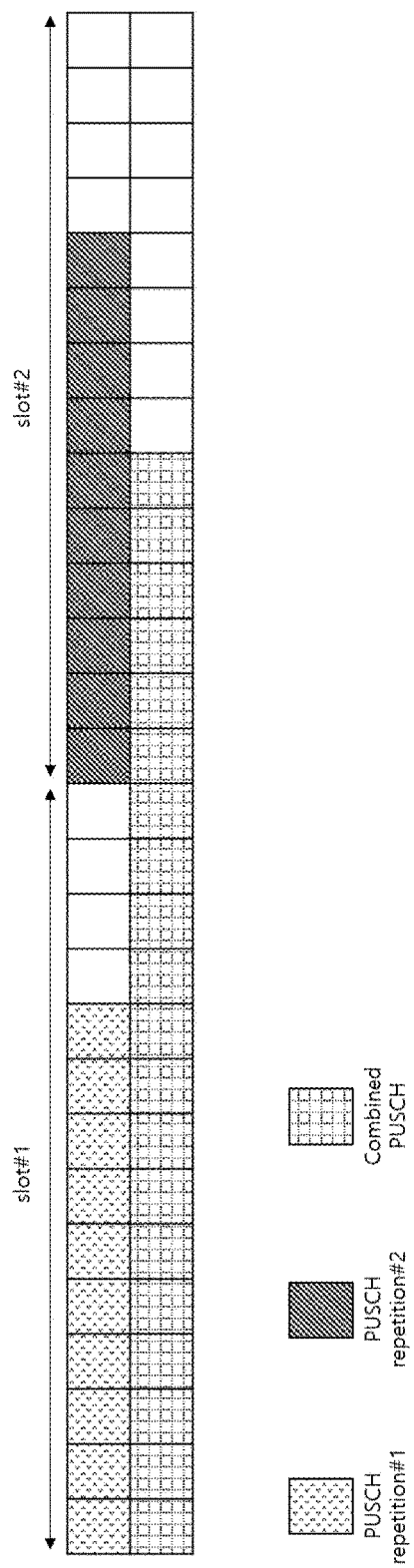
FIG. 18 is a diagram illustrating resource allocation to a plurality of slots based on repetitive PUSCH transmission type A according to an embodiment of the disclosure.

FIG. 18 is a diagram illustrating resource allocation to a plurality of slots based on repetitive PUSCH transmission type A according to an embodiment of the disclosure.

Referring to FIG. 18, a UE may repetitively transmit a PUSCH to a base station via a slot configured based on repetitive PUSCH transmission type A.

Specifically, the index of a start symbol and the length of symbols to be used for transmission of a PUSCH in each slot may be configured or indicated for the UE. In addition, the number of slots to be used for transmission of a PUSCH may be configured or indicated for the UE. For example, as illustrated in FIG. 18, it is configured or indicated, for the UE, that a start symbol to be used for transmission of a PUSCH in each slot is 0, the length of symbols is 10, and the number of slots to be used for transmission of the PUSCH is 2.

For reference, the number of slots to be used for PUSCH transmission may be the same as or different from the number of repetition slots in repetitive PUSCH transmission type A. In case that the number of repetition slots of repetitive PUSCH transmission type A is identical to the number of slots to be used for the PUSCH transmission, the UE may transmit a PUSCH according to the number of slots to be used for transmission of the PUSCH. In case that the number of repetition slots of repetitive PUSCH transmission type A is greater than the number of slots to be used for transmission of the PUSCH, the UE may repeatedly transmit the PUSCH according to the number of slots to be used for the PUSCH transmission. In this instance, the number of slots used for repetitive transmission may be identical to the number of repetition slots of repetitive PUSCH transmission type A.

Based on an indication or configuration, the UE may determine a symbol set to be used for each slot. That is, based on the number of slots for PUSCH transmission and the start symbol and the length of symbols in each slot, which are configured by the base station, the UE may recognize a set of symbols to be used in each symbol for PUSCH transmission.

For example, as illustrated in FIG. 18, in case that the number of slots for PUSCH transmission is '2', the index of a start symbol is '0', and a symbol length is '10', the UE may determine that 10 symbols from the first symbol in a first slot is a first symbol set for PUSCH transmission, and 10 symbols from the first symbol in a second slot is a second symbol set.

The UE may perform PUSCH transmission based on the symbol sets determined in respective slots. That is, the UE may repetitively transmit a PUSCH using symbols allocated in the first slot and the second slot.

Detailed PUSCH transmission steps may include at least the following steps.

In step 1, the UE determines a TBS based on symbols sets of the slots.

In step 2, the UE may produce a TB based on the determined TBS.

In step 3, the UE may arrange (map), on the symbol sets, modulation symbols produced by encoding the TB.

In step 4, the UE may transmit the arranged (mapped) modulation symbols according to a CP-OFDM or DFT-s-OFDM scheme.

Here, in case of each symbol set in each slot, a DM-RS symbol may be selected based on the length of the corresponding symbol set. A DM-RS may be arranged (mapped) on REs of the DM-RS symbol.

Figure 19:
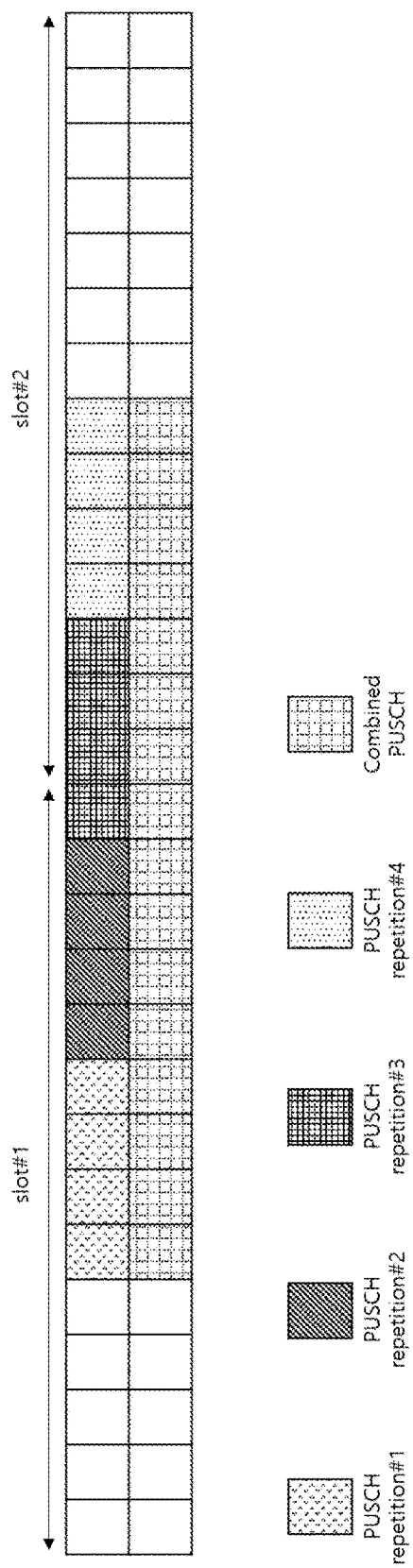
FIG. 19 is a diagram illustrating resource allocation to a plurality of nominal PUSCHs based on repetitive PUSCH transmission type B according to an embodiment of the disclosure.

FIG. 19 is a diagram illustrating resource allocation to multiple nominal PUSCHs based on repetitive PUSCH transmission type B according to an embodiment of the disclosure.

Referring to FIG. 19, a UE may repetitively transmit a PUSCH to a base station via a slot configured based on repetitive PUSCH transmission type B.

The UE may receive, from a base station, a configuration or an indication associated with the index of a start symbol of a first nominal repetition and the length of symbols. In addition, the number of nominal repetitions to be used for PUSCH transmission may be configured or indicated for the UE. For example, as illustrated in FIG. 19, the UE may receive a configuration associated with a start symbol for repetitive PUSCH transmission, the length of symbols, and the number of repetitive transmissions (and/or the number of slots for repetitive transmission or the like), from a base station via RRC configuration information and/or downlink control information (DCI) of a PDCCH. FIG. 19 illustrates symbols that each nominal repetition occupies in case that it is configured or indicated that a first nominal repetition starts at a sixth symbol, the length of symbols is 4, and the number of nominal repetitions is 4.

For reference, the number of nominal repetitions to be used for PUSCH transmission may be the same as or different from the number of nominal repetitions in repetitive PUSCH transmission type B. In case that the number of nominal repetitions of repetitive PUSCH transmission type B is identical to the number of nominal repetitions to be used for the PUSCH transmission, the UE may perform PUSCH transmission according to the number of nominal repetitions to be used for PUSCH transmission. In case that the number of nominal repetitions of repetitive PUSCH transmission type B is greater than the number of nominal repetitions to be used for PUSCH transmission, the UE may repeatedly transmit a PUSCH according to the number of nominal repetitions to be used for PUSCH transmission. In this instance, the number of nominal repetitions used for repetitive transmission may be identical to the number of repetitions of repetitive PUSCH transmission type B.

Based on the indication or configuration, the UE may determine a symbol set to be used for each nominal repetition. For example, as illustrated in FIG. 19, 4 symbols from a sixth symbol in a first slot (slot #1) is a first symbol set, 4 symbols from a tenth symbol is a second symbol set, 4 symbols from a fourteenth symbol is a third symbol set, and 4 symbols from a fourth symbol in a second slot (slot #2) is a fourth symbol set. Here, in case that a symbol that a nominal repetition occupies is an invalid symbol, the symbol(s) may be excluded from a valid symbol set.

The UE may perform PUSCH transmission based on the symbol sets of the nominal repetitions. Detailed PUSCH transmission steps may include at least the following steps.

In step 1, the UE determines a TBS based on symbols sets of the nominal repetitions.

In step 2, the UE may produce a TB based on the determined TBS.

In step 3, the UE may arrange (map), on each symbol set, modulation symbols produced by encoding the TB.

In step 4, the UE may transmit the arranged (mapped) modulation symbols according to a CP-OFDM or DFT-s-OFDM scheme.

Here, in case of each symbol set in each nominal repetition, a DM-RS symbol may be selected based on the length of the corresponding symbol set. Alternatively, each symbol set in each nominal repetition may be divided again into symbol sets including consecutive symbols, and based on the length of the corresponding symbol set, a DM-RS symbol may be selected. Here, the process of dividing a symbol set again into symbol sets including consecutive symbols, may be the same as the process of dividing a nominal repetition into actual repetitions that has been described with reference to FIG. 14B. A DM-RS may be arranged (mapped) on REs of the DM-RS symbol.

Subsequently, there is provided a description of a detailed embodiment in which a UE determines a TBS in PUSCH transmission based on repetitive PUSCH transmission type A and in PUSCH transmission based on repetitive PUSCH transmission type B. This may correspond to step 1 described above.

A first embodiment of the disclosure is provided as follows.

In case of repetitive PUSCH transmission type A, the UE may determine a TBS based on symbol sets of slots in which a PUSCH is transmitted when calculating the number of REs per PRB ($N'_{RE}=N^{RB}_{SC}*N^{sh}_{symb}-N^{PRB}_{DMRS}-N^{PRB}_{oh}$). In case of repetitive PUSCH transmission type B, the UE may determine a TBS based on symbol sets of nominal repetitions in which a PUSCH is transmitted, when calculating the number of REs per PRB ($N'_{RE}=N^{RB}_{SC}*N^{sh}_{symb}-N^{PRB}_{DMRS}-N^{PRB}_{oh}$). Hereinafter, the number of REs per PRB that is used for determining a TBS based on symbol sets is referred to as $N'_{RE,total}$. Methods used when the UE calculates $N'_{RE,total}$ may include as follows.

According to method 0, the UE may obtain the number of REs per PRB obtained based a first symbol set among a plurality of symbol sets. More specifically, $N'_{RE,total}=N^{RB}_{SC}*N^{sh}_{symb}-N^{PRB}_{DMRS}-N^{PRB}_{oh}$. Here, $N^{RB}_{SC}=12$, $N^{sh}_{symb}$ denotes the number of symbols included in the first symbol set, $N^{PRB}_{DMRS}$ denotes the number of DMRS REs included in the first symbol set, and $N^{PRB}_{oh}$ denotes an overhead value.

Here, the first symbol set may be the foremost symbol set among the plurality of symbol sets. For reference, according to method 1, although any one of the plurality of symbol sets is considered as the first symbol set, $N'_{RE,total}$ has the same value.

For reference, in case that the first symbol set is the foremost symbol set among the plurality of symbol sets, $N'_{RE,total}$ may be the same as $N'_{RE}$ that has been described above.

According to method 1, the UE may obtain $N'_{RE,total}$ by scaling the number of REs per PRB obtained based on the first symbol set among the plurality of symbol sets. Here, in case of scaling, an overhead value may be included. More specifically, $N'_{RE,total}=N'_{RE}*K=(N^{RB}_{SC}*N^{sh}_{symb}(1)-N^{PRB}_{DMRS}(1)-N^{PRB}_{oh}(1))*K$.

Here, $N^{RB}_{SC}=12$, $N^{sh}_{symb}(1)$ denotes the number of symbols included in the first symbol set, $N^{PRB}_{DMRS}(1)$ denotes the number of DMRS REs included in the first symbol set, and $N^{PRB}_{oh}(1)$ denotes an overhead value of the first symbol set.

Here, the number of symbols included in the first symbol set is identical to the number of symbols allocated in a single slot for PUSCH transmission in case of repetitive PUSCH transmission type A, and the number of symbols included in the first symbol set is identical to the number of symbols allocated in a single nominal repetition in case of repetitive PUSCH transmission type B.

Here, the first symbol set may be the foremost symbol set among the plurality of symbol sets. For reference, according to method 1, although any one of the plurality of symbol sets is considered as the first symbol set, $N'_{RE,total}$ has the same value.

Here, K denotes the number of slots to be used for PUSCH transmission in case of repetitive PUSCH transmission type A, and K denotes the number of nominal repetitions to be used for PUSCH transmission in case of repetitive PUSCH transmission type B.

Figure 20:
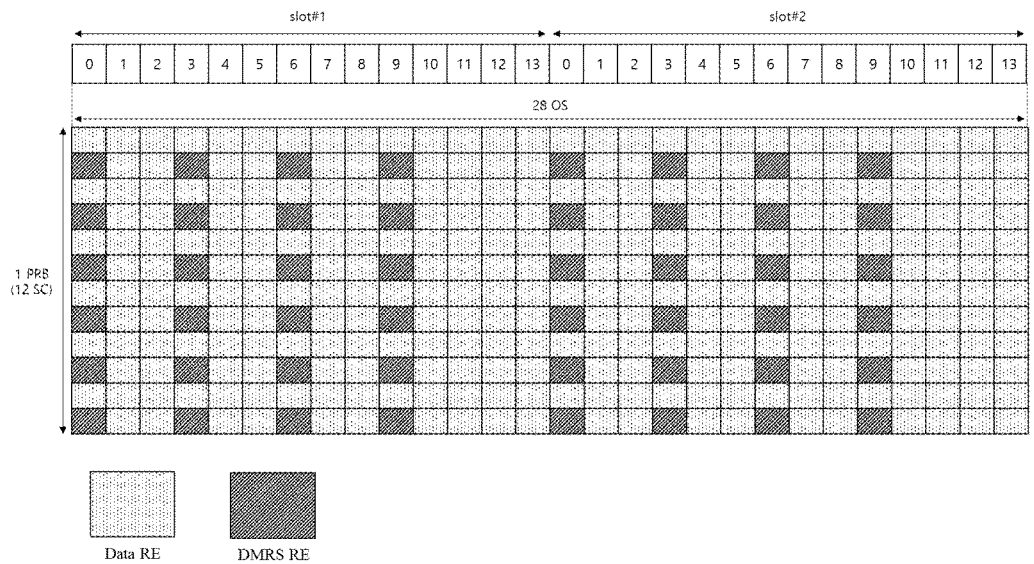
FIGS. 20 and 21 are diagrams illustrating a method of determining a TBS for a plurality of slots or a plurality of nominal PUSCHs according to an embodiment of the disclosure.
Figure 21:
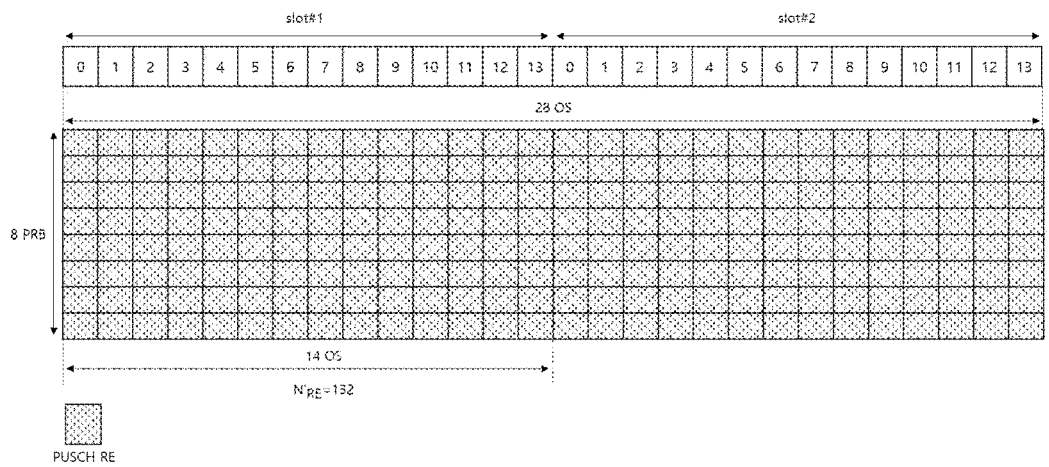

FIGS. 20 and 21 are diagrams illustrating a method of determining a TBS for a plurality of slots or a plurality of nominal PUSCHs according to an embodiment of the disclosure.

FIGS. 20 and 21 illustrate a method of determining a TBS for a nominal PUSCH in case of repetitive PUSCH transmission type A. In FIGS. 20 and 21, K is '2', a first symbol set is 14 symbols in a first slot (slot #1), and a second symbol set is 14 symbol sets in a second slot (slot #2). On the assumption that the first symbol set is used as a symbol set to be used first and $N^{PRB}_{oh}(1)=12$, $N'_{RE,total}=(N^{RB}_{SC}*N^{sh}_{symb}(1)-N^{PRB}_{DMRS}(1)-N^{PRB}_{oh}(1))*K=(12*14-24-12)*2=264$.

In this instance, $N^{PRB}_{oh}(1)$ may be obtained via the following methods.

According to method 1-0, $N^{PRB}_{oh}(1)$ may be a value that a base station configures for a UE. For example, the base station may configure, for the UE, a single value among 6, 12, 18, and the like, and the UE may consider the value as $N^{PRB}_{oh}(1)$.

According to method 1-1, an overhead value ($N^{PRB}_{oh}(1)$) of the first symbol set may be obtained by separately scaling a value (xOverhead) that the base station configures for the UE. A scaling method may differ depending on a unit to which the value (xOverhead) that the base station configures for the UE is applied. The unit may be at least one of an overhead per predetermined RE or symbol, an overhead per symbol set, an overhead per slot, an overhead per TB, and an overhead of the maximum PUSCH scheduling per TB.

1) Overhead per RE or symbol: The UE may consider a value (xOverhead) that the base station configures for the UE as an overhead value per RE or symbol.

In case that it is considered as an overhead value per symbol, $N^{PRB}_{oh}(1)=f(xOverhead*N^{sh}_{symb}(1))$ may be determined. This may be obtained by scaling the xOverhead by using the number of symbols ($N^{sh}_{symb}(1)$) in the first symbol set.

In case that it is considered as an overhead value per RE, $N^{PRB}_{oh}(1)=f(xOverhead*(N^{RB}_{SC}*N^{sh}_{symb}(1)))$ may be determined. This may be obtained by scaling the xOverhead by using the number of REs ($N^{RB}_{SC}*N^{sh}_{symb}(1)$) in the first symbol set.

In case that it is considered as an overhead value per RE excluding a DMRS, $N^{PRB}_{oh}(1)=f(xOverhead*(N^{RB}SC*N^{sh}_{symb}(1)-N^{PRB}_{DMRS}(1)))$ may be determined. This may be obtained by scaling the xOverhead by using the number of REs excluding a DMRS ($N^{RB}_{sc}*N^{sh}_{symb}(1)-N^{PRB}_{DMRS}(1)$) in the first symbol set.

2) Overhead per symbol set: The UE may consider a value (xOverhead) that the base station configures for the UE as an overhead value of a symbol set in which a PUSCH is transmitted.

In this instance, as $N^{PRB}_{oh}(1)$, the overhead value of the symbol set may be used. That is, $N^{PRB}_{oh}(1)=xOverhead$.

In this instance, $N_{PRB}^{oh}(1)$ may be used by converting the overhead value of the symbol set into an overhead value of a slot. That is, in case that the first symbol set includes $N^{sh}_{symb}(1)$ symbols, $N^{PRB}_{oh}(1)=f(xOverhead*N^{slot}_{symb}/N^{sh}_{symb}(1))$ may be determined. Here, $N^{slot}_{symb}$ denotes the number of symbols included in a single slot.

3) Overhead per slot: The UE may consider a value (xOverhead) that the base station configures for the UE as an overhead value of a slot.

In this instance, as $N^{PRB}_{oh}(1)$, an overhead value of a symbol set may be used. That is, $N^{PRB}_{oh}(1)=xOverhead$.

In this instance, $N^{PRB}_{oh}(1)$ may be used by converting the overhead value of the slot into an overhead value of a symbol set. That is, in case that the first symbol set includes $N^{sh}_{symb}(1)$ symbols, $N^{PRB}_{oh}(1)=f(xOverhead*N^{sh}_{symb}(1)/N^{slot}_{symb})$ may be determined.

4) Overhead per PUSCH that transmits a TB: The UE may consider a value (xOverhead) that the base station configures for the UE as an overhead value of a PUSCH that transmits a TB.

On the assumption that all symbol sets include the same number of symbols, an overhead value ($N^{PRB}_{oh}(1)$) of the first symbol set may be obtained by dividing the value that the base station configures for the UE by the number of symbol sets. In case that the total number of symbol sets is K, $N^{PRB}_{oh}(1)=f(xOverhead/K)$ may be determined.

On the assumption that each symbol set has a different number of symbols, the overhead value ($N^{PRB}_{oh}(1)$) of the first symbol set may be determined based on the value (xOverhead) that the base station configures for the UE and the ratio of the number of symbols included in the first symbol set to the total number of symbols. Here, in case that $N_{symb}^{sh}(i)$ is the number of symbols included in symbol set i, the total number of symbols may be $\Sigma_{i=1}^{K} N_{symb}^{sh}(i)$. Therefore, $N^{PRB}_{oh}(1)$ may be calculated based on Equation 1 given below.

$$N^{PRB}_{oh}(l)=f(xOverhead*(N^{sh}_{symb}(1))/(\Sigma_{i=1}^{K} N_{symb}^{sh}(i))) \quad \text{[Equation 1]}$$

The UE may consider a value (xOverhead) that the base station configures for the UE as an overhead value of REs excluding a DMRS of a PUSCH that transmits a TB. The overhead value ($N^{PRB}_{oh}(1)$) of the first symbol set may be determined based on the value (xOverhead) that the base station configures for the UE and the ratio of the number of REs included in the first symbol set excluding a DMRS to the total number of REs of all symbol sets excluding a DMRS. The number of REs included in the first symbol set excluding a DMRS is $N^{RB}_{SC}*N^{sh}_{symb}(1)-N^{PRB}_{DMRS}(1)$, and the total number of REs of all symbol sets excluding a DMRS is $\Sigma_{i=1}^{K}(N_{SC}^{RB}*N_{symb}^{sh}(i)-N_{DMRS}^{PRB}(i))$. Therefore, $N^{PRB}_{oh}(1)$ may be calculated based on Equation 2 given below.

$$N^{PRB}_{oh}(1)=((xOverhead*(N_{SC}^{RB}*N_{symb}^{sh}(1)-N_{DMRS}^{PRB}(1))/\Sigma_{i=1}^{K}(N_{SC}^{RB}*N_{symb}^{sh}(i)-N_{DMRS}^{PRB}(i))) \quad \text{[Equation 2]}$$

5) Overhead of the maximum PUSCH that transmits a TB: The UE may consider a value (xOverhead) that the base station configures for the UE as an overhead value of the maximum PUSCH that transmits a TB.

On the assumption that all symbol sets include the same number of symbols, an overhead value ($N^{PRB}_{oh}(1)$) of the first symbol set may be obtained by dividing the value (xOverhead) that the base station configures for the UE by the maximum number of symbol sets. Here, the maximum number of symbol sets may be the number of symbol sets capable of being maximally scheduled when a PUSCH is scheduled. In case that the maximum number of symbol sets is $K_{max}$, $N^{PRB}_{oh}(1)$ may be calculated based on Equation 3 given below.

$$N^{PRB}_{oh}(1)=f(xOverhead/K_{max}) \quad \text{[Equation 3]}$$

On the assumption that each symbol set has a different number of symbols, the overhead value ($N^{PRB}_{oh}(1)$) of the first symbol set may be determined based on the value (xOverhead) that the base station configures for the UE and the ratio of the number of symbols included in the first symbol set to the maximum number of symbols. Here, the maximum number of symbols may be the number of symbols included in a symbol set capable of being maximally scheduled when a PUSCH is scheduled. In case that the maximum number of symbols is $N^{sh}_{symb,max}$, $N^{PRB}_{oh}(1)$ may be calculated based on Equation 4 given below.

$$N^{PRB}_{oh}(1)=f(xOverhead*N^{sh}_{symb}(1)/N^{sh}_{symb,max}) \quad \text{[Equation 4]}$$

The UE may consider a value (xOverhead) that the base station configures for the UE as an overhead value of REs excluding a DMRS of a PUSCH that transmits a TB. The overhead value ($N^{PRB}_{oh}(1)$) of the first symbol set may be determined based on the value (xOverhead) that the base station configures for the UE and the ratio of the number of REs included in the first symbol set excluding a DMRS to the maximum number of REs of all symbol sets excluding a DMRS. The number of REs included in the first symbol set, excluding a DMRS, may be $N^{RB}_{SC}*N^{sh}_{symb}(1)-N^{PRB}_{DMRS}(1)$. Here, the maximum number of REs of all symbol sets excluding a DMRS may be the number of REs included in a symbol set capable of being maximally scheduled, excluding a DMRS, when a PUSCH is scheduled. In case that the maximum number of REs is $N_{RE,max}$, $N^{PRB}_{oh}(1)$ may be calculated based on Equation 5 given below.

$$N^{PRB}_{oh}(1)=f(xOverhead*(N^{RB}_{SC}*N^{sh}_{symb}(1)-N^{PRB}_{DMRS}(1)/N_{RE,max}) \quad \text{[Equation 5]}$$

In the disclosure, f(x) is at least one of ceil(x), floor(x), or round(x). ceil(x) denotes the smallest integer among the numbers greater than or equal to x. floor(x) denotes the highest integer among the numbers less than or equal to x. round(x) denotes an integer obtained by rounding off x to the nearest whole number.

According to method 1, in case that the overhead value configured for the UE is a constant value of 0, xOverhead may not be separately configured. In this instance, $N^{PRB}_{oh}(1)=0$ may be determined.

According to method 2, the UE may obtain $N'_{RE,total}$ by scaling the number of REs per PRB obtained based on the first symbol set among the plurality of symbol sets. Here, the overhead value ($N^{PRB}_{oh}$) may be excluded in case of scaling. More specifically, it is calculated that $N'_{RE,total}=(N^{RB}_{SC}*N^{sh}_{symb}(1)-N^{PRB}_{DMRS}(1))*K-N^{PRB}_{oh}$. Here, $N^{RB}_{SC}=12$, $N^{sh}_{symb}(1)$ denotes the number of symbols included in the first symbol set, $N^{PRB}_{DMRS}(1)$ denotes the number of DMRS REs included in the first symbol set, and $N^{PRB}_{oh}(1)$ denotes an overhead value of the first symbol set. For example, as illustrated in FIG. 20, in case of $N^{PRB}_{oh}=12$, $N'_{RE,total}$ may be calculated based on Equation 6 given below.

$$N'_{RE,total}=(N^{RB}_{SC}*N^{sh}_{symb}(1)-N^{PRB}_{DMRS}(1))*K-N^{PRB}_{oh}=(12*14-24)*2-12-276 \quad \text{[Equation 6]}$$

A method of obtaining $N^{PRB}_{oh}$ is as follows.

According to 2-0 method, $N^{PRB}_{oh}$ may be a value (xOverhead) that the base station configures for the UE. For example, the base station may configure a single value among 6, 12, 18, and the like for the UE, and the UE may consider the value as $N^{PRB}_{oh}$. For reference, the range of the value (xOverhead) configured by the base station may differ according to the number of slots that the base station schedules, the number of symbol sets, the number of symbols included in a symbol set, or the like. For example, the value (xOverhead) that the base station configures may include values such as 24, 30, 36, and the like, in addition to 6, 12, and 18.

According to method 2-1, an overhead value ($N^{PRB}_{oh}$) may be obtained by separately scaling a value (xOverhead) that the base station configures for the UE. Although method 2 excludes an overhead value ($N^{PRB}_{oh}$) in case of scaling, this may indicate not scaling of the overhead value of the first symbol set. That is, the overhead value that is $N^{PRB}_{oh}$ may be obtained by performing scaling according to another method different from scaling of the first symbol set. A scaling method may differ depending on a unit to which the value (xOverhead) that the base station configures for the UE is applied. The unit may be at least one of an overhead per predetermined RE or symbol, an overhead per symbol set, an overhead per slot, an overhead per TB, or an overhead of the maximum PUSCH scheduling per TB.

1) Overhead per RE or symbol: The UE may consider a value (xOverhead) that the base station configures for the UE as an overhead value per RE or symbol.

In case that the value is considered as an overhead value per symbol, $$N^{PRB}_{oh}=\Sigma_{i=1}^{K}f(xOverhead*N^{sh}_{symb}(i))$$

or $$f*\Sigma_{i=1}^{K}xOverhead*N^{sh}_{symb}(i)).$$

may be determined. Here, K denotes the total number of symbol sets.

In case that the value is considered as an overhead value per RE, $$N^{PRB}_{oh}=\Sigma_{i=1}^{K}f(xOverhead*N^{RB}_{SC}*N^{sh}_{symb}(i)) \text{ or } f(\Sigma_{i=1}^{K}xOverhead*N^{RB}_{SC}*N^{sh}_{symb}(i)).$$

may be determined.

In case that the value is considered as an overhead value per RE excluding a DMRS, $N^{PRB}_{oh}=\Sigma_{i=1}^{K}f(xOverhead*(N^{RB}_{SC}*N^{sh}_{symb}(i)-N^{PRB}_{DMRS}(i)))$ or $f(\Sigma_{i=1}^{K}xOverhead*N^{RB}_{SC}*N^{sh}_{symb}-N^{PRB}_{DMRS}(i))$ may be determined.

2) Overhead per symbol set: The UE may consider a value (xOverhead) that the base station configures for the UE as an overhead value of a symbol set in which a PUSCH is transmitted.

In this instance, the overhead value ($N^{PRB}_{oh}$) may be obtained by multiplying the value (xOverhead) that the base station configures for the UE by the number of symbol sets. In case that the total number of symbol sets is K, $N^{PRB}_{oh}$ f(xOverhead*K) may be determined.

In this instance, the overhead value ($N^{PRB}_{oh}$) may be used by converting an overhead value of a symbol set into an overhead value of a slot. That is, $$N^{PRB}_{oh}=\Sigma_{i=1}^{K}f(xOverhead*N^{slot}_{symb}/N^{sh}_{symb}(i))$$

or $f(\Sigma_{i=1}^{K}xOverhead*N^{slot}_{symb}/N^{sh}_{symb}(i))$ may be determined. Here, $N^{slot}_{symb}$ denotes the number of symbols included in a single slot.

3) Overhead per slot: The UE may consider a value (xOverhead) that the base station configures for the UE as an overhead value per slot.

In this instance, the overhead value ($N^{PRB}_{oh}$) may be obtained by multiplying the value (xOverhead) that the base station configures for the UE by the number of slots occupied by a PUSCH that transmits the corresponding TB in the time domain. In case that the number of slots that occupies in the time domain is K, $N^{PRB}_{oh}$=f(xOverhead*K) may be determined.

In this instance, the overhead value ($N^{PRB}_{oh}$) may be used by converting an overhead value of a slot into an overhead value of a symbol set. That is, $$N^{PRB}_{oh}=\Sigma_{i=1}^{K}f(xOverhead*N^{sh}_{symb}(i)/N^{slot}_{symb})$$

or $f(\Sigma_{i=1}^{K}xOverhead*N^{sh}_{symb}(i)/N^{slot}_{symb})$ may be determined. Here, $N^{slot}_{symb}$ denotes the number of symbols included in a single slot.

4) Overhead per PUSCH that transmits a TB: The UE may consider a value (xOverhead) that the base station configures for the UE as an overhead value of a PUSCH that transmits a TB.

In this instance, an overhead value of a PUSCH that transmits a TB may be used as $N^{PRB}_{oh}$. That is, $N^{PRB}_{oh}$=xOverhead.

5) Overhead of the maximum PUSCH that transmits a TB: The UE may consider a value (xOverhead) that the base station configures for the UE as an overhead value of the maximum PUSCH that transmits a TB.

On the assumption that all symbol sets have the same number of symbols, the overhead value ($N^{PRB}_{oh}$) may be obtained by dividing the value (xOverhead) that the base station configures for the UE by the maximum number of symbol sets. Here, the maximum number of symbol sets may be the number of symbol sets capable of being maximally scheduled when a PUSCH is scheduled. In case that the maximum number of symbol sets is $K_{max}$, $N^{PRB}_{oh}$=f(xOverhead/$K_{max}$) may be determined.

On the assumption that each symbol set has a different number of symbols, an overhead value ($N^{PRB}_{oh}$) may be determined based on the value (xOverhead) that the base station configures for the UE and the ratio of the average number of symbols $$\Sigma_{i=1}^{K} N_{symb}^{sh}(i)/K$$

of respective symbol sets to the maximum number of symbols. Here, the maximum number of symbols may be the number of symbols included in a symbol set and capable of being maximally scheduled when a PUSCH is scheduled. In case that the maximum number of symbols is $N^{sh}_{symb,max}$, $N^{PRB}_{oh}$=f(xOverhead*($\Sigma_{i=1}^{K} N_{symb}^{sh}(i)$)/(K*$N_{symb,max}$)) may be determined.

The UE may consider a value (xOverhead) that the base station configures for the UE as an overhead value of REs excluding a DMRS of a PUSCH that transmits a TB. The overhead value ($N^{PRB}_{oh}$) may be determined based on the value (xOverhead) that the base station configures for the UE and the ratio of the average number of REs of the respective symbol sets excluding a DMRS to the maximum number of REs of all symbol sets excluding a DMRS. The average number of REs of the respective symbol sets, excluding a DMRS, may be $$\Sigma_{i=1}^{K}(N_{SC}^{RB}*N_{symb}^{sh}(i)-N_{DMRS}^{PRB}(i))/(N_{SC}^{RB}*K)$$

Here, the maximum number of REs of all symbol sets excluding a DMRS may be the number of REs included in a symbol set capable of being maximally scheduled, excluding a DMRS, when a PUSCH is scheduled. In case that the maximum number of REs is $N_{RE,max}$, it is determined as $$N^{PRB}_{oh}=f(xOverhead*\Sigma_{i=1}^{K}(N_{SC}^{RB}*N_{symb}^{sh}(i)-N_{DMRS}^{PRB}(i)))/(N_{SC}^{RB}*K*N_{RE,max}).$$

According to method 2-2, an overhead value based on the number of symbol sets used for PUSCH transmission may be configured for the UE by the base station. In case that the number of symbol sets is K and the configured overhead value is $N_{oh,K}^{PRB}$, $N'_{RE}(N_{SC}^{RB}*N_{symb}^{sh}(1)-N^{DMRS}_{PRB}(1))$*K-$N_{oh,K}^{PRB}$ K-$N_{oh,k}^{PRB}$ may be given. That is, here, each of $N_{oh,1}^{PRB}$, $N_{oh,2}^{PRB}$, ..., $N_{oh,K}^{PRB}$ may be configured as a separate value by the base station.

According to method 2-3, an overhead value based on the number of symbols per symbol set used for PUSCH transmission may be configured for the UE by the base station.

In case that the number of symbol sets is K, and the number of symbols per symbol set is L, and a configured overhead value based on the number of symbols $N^{PRB}_{oh,K,L}$ per symbol set is, $$N'_{RE}=N_{SC}^{RB}*N_{symb}^{sh}(1)-N_{DMRS}^{PRB}*K-N^{PRB}_{oh,K,L}$$

may be given. That is, here, each of $N_{oh,1,1}^{PRB}$, $N_{oh,1,2}^{PRB}$, ..., $N_{oh,K,L}^{PRB}$ may be configured as a separate value by the base station.

According to method 2, in case that the overhead value configured for the UE is a constant value of 0, xOverhead may not be separately configured. In this instance, $N^{PRB}_{oh}$=0 may be determined.

According to method 3, as $N'_{RE,total}$, the number of REs per PRB obtained based on a plurality of symbol sets may be obtained. More specifically, in case that the number of symbols included in an $i^{th}$ symbol set is $N^{sh}_{symb}(i)$, the number of DMRS REs of the $i^{th}$ symbol set is $N^{PRB}_{DMRS}(i)$, and an overhead value of the $i^{th}$ symbol set is $N^{PRB}_{oh}(i)$, $N'_{RE,total}=\Sigma_{i=1}^{K}(N_{SC}^{RB}*N_{symb}^{sh}(1)-N_{DMRS}^{PRB}(i)-N^{PRB}_{oh}(i))$. may be calculated. Here, the overhead value, $N^{PRB}_{oh}(i)$, may be the same in all symbol sets or may be different for each symbol set.

Here, K denotes the number of slots to be used for PUSCH transmission in case of repetitive PUSCH transmission type A, and K denotes the number of nominal repetitions to be used for PUSCH transmission in case of repetitive PUSCH transmission type B.

For reference, in method 3, in case that the number of symbols included in each symbol set is the same, that is, $N^{sh}_{symb}(i)=N^{sh}_{symb}$, the number of DMRS REs included in each symbol set is the same, that is, $N^{PRB}_{DMRS}(i)=N^{PRB}_{DMRS}$, and an overhead value of each symbol set is the same, that is, $N^{PRB}_{oh}(i)=N^{PRB}_{oh}$, this may be expressed as $N'_{RE,total}=(N_{SC}^{RB}*N_{symb}^{sh}-N^{PRB}_{DMRS}-N^{PRB}_{oh})*K$, which is the same as method 1. Therefore, method 3 may be applicable in case that the number of symbols included in each symbol set is different, the number of DMRS REs included in each symbol set is different, or an overhead value of each symbol set is different.

For reference, in method 3, each symbol set may have a different overhead value from one another. A method of determining a different overhead value, $N^{PRB}_{oh}(i)$, of the $i^{th}$ symbol set is as follows.

According to method 3-0, an overhead value independent for each symbol set may be configured or indicated. In order to determine an overhead value $N^{PRB}_{oh}(i)$ of each symbol set for a single PUSCH, an overhead value of each symbol set may be separately configured or indicated for the UE by the base station. That is, with respect to K symbol sets, $N^{PRB}_{oh}(1)$, $N^{PRB}_{oh}(2)$, ..., $N^{PRB}_{oh}(K)$ may be configured or indicated for the UE by the base station.

According to method 3-1, an overhead value ($N^{PRB}_{oh}(i)$) of the $i^{th}$ symbol set may be obtained by separately scaling a value (xOverhead) that the base station configures for the UE. A scaling method may differ depending on a unit to which the value (xOverhead) that the base station configures for the UE is applied. The unit may be at least one of an overhead per predetermined RE or symbol, an overhead per symbol set, an overhead per slot, an overhead per TB, and an overhead of the maximum PUSCH scheduling per TB.

1) Overhead per RE or symbol: The UE may consider a value (xOverhead) that the base station configures for the UE as an overhead value per RE or symbol.

In case that it is considered as an overhead value per symbol, $N^{PRB}_{oh}(i)$=f(xOverhead*$N^{sh}_{symb}(i)$) may be determined. This may be obtained by scaling the xOverhead by using the number of symbols ($N^{sh}_{symb}(i)$) in the $i^{th}$ symbol set.

In case that it is considered as an overhead value per RE, $N^{PRB}_{oh}(i)=f(xOverhead*(N^{RB}_{SC}*N^{sh}_{symb}(i)))$ may be determined. This may be obtained by scaling the xOverhead by using the number of REs ($N^{RB}_{SC}*N^{sh}_{symb}(i))$) in the $i^{th}$ symbol set.

In case that it is considered as an overhead value per RE excluding a DMRS, $N^{PRB}_{oh}(i)=f(xOverhead*(N^{RB}_{SC}*N^{sh}_{symb}(i)-N^{PRB}_{DMRS}(i)))$ may be determined. This may be obtained by scaling xOverhead by using the number of REs ($N^{RB}_{SC}*N^{sh}_{symb}(i)-N^{PRB}_{DMRS}(i))$), excluding a DMRS, in the $i^{th}$ symbol set.

2) Overhead per symbol set: The UE may consider a value (xOverhead) that the base station configures for the UE as an overhead value of a symbol set in which a PUSCH is transmitted.

In this instance, as $N^{PRB}_{oh}(i)$, the overhead value of the symbol set may be used. That is, $N^{sh}_{symb}(i)$=xOverhead.

In this instance, $N^{PRB}_{oh}(i)$ may be used by converting the overhead value of the a symbol set into an overhead value of a slot. That is, in case that the $i^{th}$ symbol set includes $N^{sh}_{symb}(i)$ symbols, $N^{PRB}_{oh}(i)=f(xOverhead*N^{slot}_{symb}/N^{sh}_{symb}(i))$ may be determined. Here, $N^{slot}_{symb}$ denotes the number of symbols included in a single slot.

3) Overhead per slot: The UE may consider a value (xOverhead) that the base station configures for the UE as an overhead value of a slot.

In this instance, as $N^{PRB}_{oh}(i)$, an overhead value of a symbol set may be used. That is, $N^{PRB}_{oh}(i)$=xOverhead.

In this instance, $N^{PRB}_{oh}(i)$ may be used by converting the overhead value of the symbol set into an overhead value of a slot. That is, in case that the $i^{th}$ symbol set includes $N^{sh}_{symb}(i)$ symbols, $N^{PRB}_{oh}(i)=f(xOverhead*N^{sh}_{symb}(i)N^{slot}_{symb})$ may be determined.

4) Overhead per PUSCH that transmits a TB: The UE may consider a value (xOverhead) that the base station configures for the UE as an overhead value of a PUSCH that transmits a TB.

On the assumption that all symbol sets include the same number of symbols, an overhead value ($N^{PRB}_{oh}(i)$) of the $i^{th}$ symbol set may be obtained by dividing the value (xOverhead) that the base station configures for the UE by the number of symbol sets. In case that the total number of symbol sets is K, $N^{PRB}_{oh}(i)=f(xOverhead/K)$ is determined.

On the assumption that each symbol set has a different number of symbols, the overhead value ($N^{PRB}_{oh}(i)$) of the $i^{th}$ symbol set may be determined based on the value (xOverhead) that the base station configures for the UE and the ratio of the number of symbols included in the $i^{th}$ symbol set to the total number of symbols. Here, in case $N^{sh}_{symb}(i)$ is the number of symbols included in the $i^{th}$ symbol set, the total number of symbols may be $\Sigma_{n=1}^{K}N^{sh}_{symb}(n)$. Therefore, it may be determined as $N^{PRB}_{oh}(i)=f(xOverhead*(N^{sh}_{symb}(i))/(\Sigma_{n=1}^{K}N^{sh}_{symb}(n)))$.

The UE may consider a value (xOverhead) that the base station configures for the UE as an overhead value of REs excluding a DMRS of a PUSCH that transmits a TB. The overhead value ($N^{PRB}_{oh}(i)$) of the $i^{th}$ symbol set may be determined based on the value (xOverhead) that the base station configures for the UE and the ratio of the number of REs included in the $i^{th}$ symbol set excluding a DMRS to the total number of REs of all symbol sets excluding a DMRS. The number of REs included in the $i^{th}$ symbol set excluding a DMRS is $N^{RB}_{SC}*N^{sh}_{symb}(i)-N^{PRB}_{DMRS}(i)$, and the total number of REs of all symbol sets excluding a DMRS is $\Sigma_{n=1}^{K}(N_{SC}^{RB}*N_{symb}^{sh}(n)-N_{DMRS}^{PRB}(n))$.

Therefore, it may be determined as $N^{PRB}_{oh}(i)=f(xOverhead*(N_{SC}^{RB}*N_{symb}^{sh}(i)-N_{DMRS}^{PRB}(i))/\Sigma_{n=1}^{K}(N_{SC}^{RB}*N_{symb}^{sh}(n)-N_{DMRS}^{PRB}(n)))$.

5) Overhead of the maximum PUSCH that transmits a TB: The UE may consider a value (xOverhead) that the base station configures for the UE as an overhead value of the maximum PUSCH that transmits a TB.

On the assumption that all symbol sets include the same number of symbols, an overhead value ($N^{PRB}_{oh}(i)$) of the $i^{th}$ symbol set may be obtained by dividing the value (xOverhead) that the base station configures for the UE by the maximum number of symbol sets. Here, the maximum number of symbol sets may be the number of symbols capable of being maximally scheduled when a PUSCH is scheduled. In case that the maximum number of symbol sets is $K_{max}$, it is determined as $N^{PRB}_{oh}(i)=f(xOverhead/K_{max})$.

On the assumption that each symbol set has a different number of symbols, the overhead value ($N^{PRB}_{oh}(i)$) of the $i^{th}$ symbol set may be determined based on the value (xOverhead) that the base station configures for the UE and the ratio of the number of symbols included in the $i^{th}$ symbol set to the maximum number of symbols. Here, the maximum number of symbols may be the number of symbols included in a symbol set and capable of being maximally scheduled when a PUSCH is scheduled. In case that the maximum number of symbols is $N^{sh}_{symb,max}$, it is determined as $N^{PRB}_{oh}(i)=f(xOverhead*N^{sh}_{symb}(i)/N^{sh}_{symb,max})$.

The UE may consider a value (xOverhead) that the base station configures for the UE as an overhead value of REs excluding a DMRS of a PUSCH that transmits a TB. The overhead value ($N^{PRB}_{oh}(i)$) of the $i^{th}$ symbol set may be determined based on the value (xOverhead) that the base station configures for the UE and the ratio of the number of REs included in the $i^{th}$ symbol set excluding a DMRS to the maximum number of REs of all symbol sets excluding a DMRS. The number of REs included in the $i^{th}$ symbol set, excluding a DMRS, may be $N^{RB}SC*N^{sh}_{symb}(i)-N^{PRB}_{DMRS}(i)$. Here, the maximum number of REs of all symbol sets excluding a DMRS may be the number of REs included in a symbol set capable of being maximally scheduled, excluding a DMRS, when a PUSCH is scheduled. In case that the maximum number of REs is $N_{RE,max}$, it is determined as $N^{PRB}_{oh}(i)=f(xOverhead*(N_{SC}^{RB}*N_{symb}^{sh}(i)-N_{DMRS}^{PRB}(i))/N_{RE,max})$.

According to method 3-2, an overhead value based on the number of symbol sets used for PUSCH transmission may be configured for the UE by the base station. In case that the number of symbol sets is K and a configured overhead value is $N_{oh,K}^{PRB}$, it may be given as $N'_{RE}=\Sigma_{i=1}^{K}(N_{SC}^{RB}*N_{symb}^{sh}(i)-N_{DMRS}^{PRB}(i))-N_{oh,K}^{PRB}$. That is, here, each of $N_{oh,1}^{PRB}$, $N_{oh,2}^{PRB}$, . . . , $N_{oh,K}^{PRB}$ may be configured as a separate value by the base station.

According to method 3-3, an overhead value based on the number of symbols per symbol set used for PUSCH transmission may be configured for the UE by the base station. In this instance, the UE may apply a different overhead value for each symbol set. In case that the number of symbol sets is K, the number of symbols in a symbol set is L, and a configured an overhead value of the $i^{th}$ symbol set is $N_{oh,K,L}^{PRB}(i)$, it may be given as $N'_{RE}=\Sigma_{i=1}^{K}(N_{SC}^{RB}*N_{symb}^{sh}(i)-N_{DMRS}^{PRB}(i)-N_{oh,K,L}^{PRB}(i))$. In case that the number of symbols in each symbol set, $N_{oh,K,L}^{PRB}$ may be configured. Therefore, it may be given as $N'_{RE}=\Sigma_{i=1}^{K}(N_{SC}^{RB}*N_{symb}^{sh}(i)-N_{DMRS}^{PRB}(i))-N_{oh,K,L}^{PRB}$. That is, here, each of $N_{oh,1,1}^{PRB}$, $N_{oh,1,2}^{PRB}$, . . . , $N_{oh,K,L}^{PRB}$ may be configured as a separate value by the base station.

According to method 3, in case that the overhead value configured for the UE is a constant value of 0, xOverhead may not be separately configured. In this instance, it may be determined as $N^{PRB}_{oh}(i)=0$.

Although it is described that an overhead value for determining a TBS of a UE is obtained according to method 3, a TBS calculation process to be subsequently performed may be performed according to another method. For example, although an overhead value in $N'_{RE}$ that is the number of REs per PRB is calculated according to method 3, and a subsequent calculation process may be performed according to method 2. That is, in case that method 2 calculates $N'_{RE}=(N^{RB}_{SC}*N^{sh}_{symb}(1)-N^{PRB}_{DMRS}(1))*K-N^{PRB}_{oh}$, $N^{PRB}_{oh}$ may be $\Sigma_{i=1}^{K}N_{oh}^{PRB}(i)$ that is the sum of overhead values of all symbol sets obtained according to method 3, and the rest values may be values obtained by scaling values obtained based on the first symbol set. Therefore, the number of REs per PRB may be calculated as $N'_{RE}=(N^{RB}_{SC}*N^{sh}_{symb}(1)-N^{PRB}_{DMRS}(1))*K-\Sigma_{i=1}^{K}N_{oh}^{PRB}(i)$.

Although method 3 applies an overhead value $N^{PRB}_{oh}(i)$ that is a different overhead value to each symbol set, method 4 may scale and apply a single overhead value. That is, it may be calculated as $N'_{RE}=\Sigma_{i=1}^{K}(N_{SC}^{RB}*N_{symb}^{sh}(i)-N_{DMRS}^{PRB}(i))-N_{oh}^{PRB}$. Here, scaling may be based on K.

According to method 5, an overhead value based on the number of symbol sets used for PUSCH transmission may be configured for the UE by the base station. In case that the number of symbol sets is K and a configured overhead value is $N_{oh,K}^{PRB}$, $$N'_{RE,total}=\Sigma_{i=1}^{K}(N_{SC}^{RB}*N_{symb}^{sh}(i)-N_{DMRS}^{PRB}(i)-N_{oh,K}^{PRB}$$

may be given. For reference, the number of symbol sets may be changed to the number of symbols included in symbol sets and may be applied.

According to a second embodiment, calculation of the number of REs for all PRBs ($N_{RE}=min(156, N'_{RE})*n_{PRB}$) allocated for PUSCH transmission based on $N'_{RE,total}$ may be corrected as follows.

According to a $(2-1)^{th}$ embodiment, calculation may be performed by applying $N'_{RE,total}$ obtained in the first embodiment, before applying $N'_{RE}$. That is, the number of REs for all PRBs allocated for PUSCH transmission may be calculated as $N_{RE}=min(156, N'_{RE,total})*n_{PRB}$.

According to a $(2-2)^{th}$ embodiment, calculation may be performed by scaling the value of $N_{RE}$ obtained in the $(2-1)^{th}$ embodiment. More specifically, calculation may be performed based on an equation of $N_{RE}=min(156, N'_{RE\_total})*n_{PRB}*K$.

Here, K denotes the number of slots to be used for PUSCH transmission in case of repetitive PUSCH transmission type A, and K denotes the number of nominal repetitions to be used for PUSCH transmission in case of repetitive PUSCH transmission type B.

According to the $(2-2)^{th}$ embodiment, $N'_{RE\_total}$ may be determined according to method 0 of the first embodiment, preferably. That is, it may be calculated as $N'_{RE\_total}=N^{RB}_{sc}*N^{sh}_{symb}-N^{PRB}_{DMRS}-N^{PRB}_{oh}$ according to method 0.

For example, referring to FIG. 21, on the assumption that K=2, $N^{PRB}_{oh}=12$, and $N'_{RE\_total}=132$, the UE may calculate $N_{RE}=min(156, N'_{RE\_total})*n_{PRB}*K=min(156, 132)*8*2=2112$.

In the $(2-2)^{th}$ embodiment, in case that method 0 of the first embodiment is used to obtain the value of $N'_{RE\_total}$, the value of $N'_{RE\_total}$ may be 14 (symbols)*12 (subcarriers)=168 in case of a normal CP and the value of $N'_{RE\_total}$ may be less than or equal to 12 (symbols)*12 (subcarriers)=144 in case of an extended CP. However, in the $(2-2)^{th}$ embodiment, in case that method 1 to method 5 of the first embodiment is used to obtain the value of $N'_{RE\_total}$, the value of $N'_{RE\_total}$ may be increased according to K. For example, referring to FIG. 20, the value of $N'_{RE\_total}$ of method 1 may be given as 264. Therefore, although there are a large number of REs that are actually valid (i.e., although $N'_{RE\_total}$ is high), a value greater than 156 may not be obtained as the result of $min(156, N'_{RE\_total})$ in the $(2-1)^{th}$ embodiment or the $(2-2)^{th}$ embodiment. The number of symbols occupies PUSCH transmission is increased. Accordingly, to obtain a higher TBS, 156 that is the maximum number of REs capable of being determined for each PRB may need to be adjusted in case of $N'_{RE\_total}>156$. Hereinafter, disclosed are embodiments associated with a method of adjusting 156 that is the maximum number of REs capable of being determined for each PRB.

According to a third embodiment, the UE may scale (scaling) and apply the maximum number of REs capable of being determined for each PRB. More specifically, in the $(2-1)^{th}$ embodiment or the $(2-2)^{th}$ embodiment, $min(156, N'_{RE\_total})$ may be changed to $min(156*K, N'_{RE,total})$.

Here, K denotes the number of slots to be used for PUSCH transmission in case of repetitive PUSCH transmission type A, and K denotes the number of nominal repetitions to be used for PUSCH transmission in case of repetitive PUSCH transmission type B.

In case that the third embodiment is applied to the $(2-1)^{th}$ embodiment, the number of REs for all PRBs allocated for PUSCH transmission may be given as $N_{RE}=min(156*K, N'_{RE\_total})*n_{PRB}$.

For example, referring to FIG. 20, on the assumption that K=2 and $N^{PRB}_{oh}=12$ in case that method 1 of the first embodiment is applied, $N'_{RE\_total}=(N^{RB}_{SC}*N^{sh}_{symb}-N^{PRB}_{DMRS}-N^{PRB}_{oh})*K=(12*14-24-12)*2=264$ may be calculated. According to the existing scheme, $min(156, N'_{RE,total})=min(156, 264)=156$. However, according to the third embodiment, $min(156*2, N'_{RE,total})=min(312, 264)=264$. Accordingly, the UE may determine a TBS for a larger number of REs.

According to a fourth embodiment, the UE may apply a predetermined value, which is configured or indicated, as the maximum number of REs capable of being determined for each PRB. That is, in the $(2-1)^{th}$ embodiment or the $(2-2)^{th}$ embodiment, $min(156, N'_{RE\_total})$ may be changed to $min(RE_{max}, N'_{RE,total})$, and a predetermined value is given as $RE_{max}$.

For example, the maximum number of REs capable of being determined for each PRB based on the number of PUSCH REs including a DMRS and an overhead RE, may be calculated as $RE_{max}=N^{RB}_{SC}*N^{sh}_{symb}$. Here, $N^{sh}_{symb}$ is a given value in the first embodiment. Referring to FIG. 20, the number of symbols that a PUSCH occupies in the time domain is 28. Therefore, $RE_{max}=N^{RB}SC*N^{sh}_{symb}=12*28=336$, and the number of REs per all PRBs allocated for PUSCH transmission may be calculated using $N_{RE}=min(336, N'_{RE,total})*n_{PRB}$.

As another example, the maximum number of REs capable of being determined for each PRB based on the number of PUSCH REs including a DMRS and an overhead RE, may be calculated as $RE_{max}=N^{RB}_{SC}*N^{sh}_{symb}-X$. Here, $N^{sh}_{symb}$ is a given value in the first embodiment. X may be a value configured by a higher layer or may be a constant value of X=12.

As another example, RE$_{max}$ may be determined based on the following information.

As first information, the UE may apply a value configured by a higher layer as RE$_{max}$ that is the maximum number of REs capable of being determined per PRB. The UE may expect that an appropriate value is to be configured as RE$_{max}$ by the base station, when a TBS for a plurality of slots or a plurality of nominal PUSCHs.

As second information, the UE may apply a value which is indicated by DCI in a PDCCH that schedules a PUSCH as RE$_{max}$ that is the maximum number of REs capable of being determined per PRB. When determining a TBS for a plurality of slots or a plurality of nominal PUSCHs, the UE may expect that an appropriate value is to be indicated as RE$_{max}$ by DCI in a PDCCH that schedules a PUSCH.

In case that a PUSCH and a PUCCH transmitted in a single slot overlap in at least one symbol, the UE may be incapable of transmitting the PUSCH and the PUCCH at the same time. In this instance, the UE may multiplex (multiplexing) a UCI of the PUCCH with the PUSCH and may perform transmission. Here, multiplexing indicates transmitting the UCI via the PUSCH.

To multiplex the UCI with the PUSCH, a resource to be used for UCI transmission needs to be determined among resources for the PUSCH. This is called the number of modulation symbols (the number of REs) for UCI transmission. According to TS 38.212, the UE may determine the number of modulation symbols per layer for HARQ-ACK, CSI part 1, or CSI part 2 transmission, which is to be mapped to a PUSCH, according to the following Equation 7 to Equation 9.

In case that repetitive PUSCH transmission type is not type B and a UL-SCH is included, the number of modulation symbols per layer for HARQ-ACK transmission, which is to be mapped to a PUSCH, may be obtained via Equation 7 below.

$$Q'_{ACK} = \min\left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{SC}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{SC}(l) \right\rceil \right\} \quad \text{[Equation 7]}$$

Here, $O_{ACK}$ denotes the number of HARQ-ACK bits;
$L_{ACK}$ denotes the number of CRC bits of a HARQ-ACK;
$\beta^{PUSCH}_{offset} = \beta^{HARQ-ACK}_{offset}$ denotes an offset value configured or indicated by the base station for determining the number of resources of the PUSCH to which a HARQ-ACK is mapped;
$C_{UL-SCH}$ denotes the number of code blocks (CBs) of a UL-SCH;
$K_r$ denotes an $r^{th}$ CB size of an UL-SCH;
$M^{UCI}_{sc}(l)$ denotes the number of REs to be used for UCI transmission in an $l^{th}$ PUSCH symbol;
$N^{PUSCH}_{symb,all}$ denotes the total number of symbols to be used for PUSCH transmission including a DMRS;
$\alpha$ denotes a scaling value configured by a higher layer;
$l_0$ denotes the index of a first PUSCH symbol that is different from a DMRS, after a first DMRS symbol.

In case that a DMRS is transmitted in the $l^{th}$ symbol, it corresponds to $M^{UCI}_{sc}(l)=0$. Otherwise, it corresponds to $M^{UCI}_{sc}(l)=M^{PUSCH}_{sc}-M^{PT-RS}_{sc}(l)$. Here, $M^{PUSCH}_{sc}$ denotes the number of subcarriers scheduled in a PUSCH in the frequency domain, and $M^{PT-RS}_{sc}(l)$ denotes the number of subcarriers of an $l^{th}$ PUSCH symbol including a PTRS.

The UE may multiplex the UCI with the PUSCH based on $Q'_{ACK}$ modulation symbols (the number of REs) obtained from Equation 7.

In case that the repetitive PUSCH transmission type is different from type B and a UL-SCH is included, the UE may determine the number of modulation symbols per layer for CSI part 1 transmission, which is to be mapped to the PUSCH, according to Equation 8 below.

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{SC}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{SC}(l) \right\rceil - Q'_{ACK} \right\} \quad \text{[Equation 8]}$$

Here,
$O_{CSI-1}$ The number of bits of CSI part 1;
In case of $O_{CSI-1} \leq 360$, $L_{CSI-1}=11$ Otherwise, $L_{CSI-1}$ is the number of CRC bits of CSI part 1.
$\beta^{PUSCH}_{offset} = \beta^{CSI-part1}_{offset}$ is an offset value configured or indicated by a base station in order to determine the number of resources to which CSI part 1 is to be mapped in the PUSCH;
In case that a HARQ-ACK is higher than 2 bits, $C'_{ACK}$ denotes the number of modulation symbols per layer for HARQ-ACK transmission. In case that a HARQ-ACK is lower than 2 bits it is expressed as $$Q'_{ACK} = \sum_{l=0}^{N^{PUSCH}_{symb,all}-1} \overline{M}^{ACK}_{sc,rvd}(l).$$

In this instance, $\overline{M}_{sc,rvd}^{ACK}(l)$ denotes the number of reversed resource elements for potential HARQ-ACK transmission in an OFDM symbol l;

In case that the repetitive PUSCH transmission type is different from type B and a UL-SCH is included, the UE may determine the number of modulation symbols per layer for CSI part 2 transmission, which is to be mapped to the PUSCH, according to Equation 9 below.

$$Q'_{CSI-2} =, \min\left\{ \left\lceil \frac{(O_{CSI-2} + L_{CSI-2}) \cdot \beta^{PUSCH}_{offset} \cdot \sum_{l=0}^{N^{PUSCH}_{symb,all}-1} M^{UCI}_{SC}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{SC}(l) \right\rceil - Q'_{ACK} - Q'_{CSI-1} \right\}$$

$O_{CSI-2}$ denotes the number of bits of CSI part 2;
In case of $O_{CSI-2} \geq 360$, $L_{CSI-2}=11$; Otherwise, $L_{CSI-2}$ is the number of CRC bits of CSI part 2.
$\beta^{PUSCH}_{offset}\beta^{CSI-part2}_{offset}$ is an offset value configured or indicated by the base station in order to determine the number of resources to which CSI part 2 is to be mapped in the PUSCH;
$\beta^{PUSCH}_{offset} = \beta^{CSI-part2}_{offset}$;

$Q'_{CSI-1}$ denotes the number of modulation symbols per layer for CSI part 1 transmitted in the PUSCH Via the above-mentioned Equation 7 to Equation 9, the UE may determine the number of modulation symbols ($Q'_{ACK}$) for HARQ-ACK transmission in the PUSCH, the number of modulation symbols ($Q'_{CSI-1}$) for CSI part 1 transmission, and the number of modulation symbols ($Q'_{CSI-2}$) for CSI part 2 transmission. Based on the equations, the following are recognized.

The equation for determining the number of modulation symbols is provided in the form of min{X,Y}. That is, the number of modulation symbols is less than X and Y.

Here, X determines the number of modulation symbols needed for transmitting UCI in a PUSCH. For example, the number of modulation symbols needed for transmitting a HARQ-ACK may be determined as $$\left\lceil \frac{(0_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil.$$

The number of modulation symbols is determined based on $\beta_{offset}^{PUSCH}$. That is, as $\beta_{offset}^{PUSCH}$ is high, a larger number of modulation symbols may be needed for UCI transmission.

Here, Y determines the maximum number of modulation symbols needed for transmitting UCI in a PUSCH. The maximum number of modulation symbols may be adjusted based on an α value. That is, the base station configures an appropriate α value, and may determine the maximum number of modulation symbols for transmitting UCI in the PUSCH and the minimum number of modulation symbols for transmitting a UL-SCH in the PUSCH.

For example, when a HARQ-ACK is transmitted in a PUSCH, the maximum number of modulation symbols for HARQ-ACK transmission is $\lceil \alpha \cdot \Sigma_{l=l_0}^{N_{symb,all}^{PUCSH}-1} M_{SC}^{UCI}(l) \rceil$. Here, $\Sigma_{l=l_0}^{N_{symb,all}^{PUCSH}-1} M_{SC}^{UCI}(l)$ denotes the number of REs to which the HARQ-ACK is to be mapped in the PUSCH. For reference, the HARQ-ACK is mapped after a first DM-RS of the PUSCH, and thus it is expressed as $l=l_0$.

When CSI part 1 is transmitted in a PUSCH, the maximum number of modulation symbols for transmitting CSI part 1 is $\lceil \alpha \cdot \Sigma_{l=0}^{N_{symb,all}^{PUCSH}-1} M_{SC}^{UCI}(l) \rceil = Q'_{ACK}$. Here, $\Sigma_{l=1}^{N_{symb,all}^{PUCSH}-1} M_{SC}^{UCI}(l)$ denotes the number of REs to which the CSI part 1 is to be mapped in the PUSCH. For reference, CSI part 1 is mapped from a first symbol of the PUSCH, it is expressed as l=0. According to α configured by the base station, $\lceil \alpha \cdot \Sigma_{l=0}^{N_{symb,all}^{PUCSH}-1} M_{SC}^{UCI}(l) \rceil$ REs may be used for CSI part 1. However, modulation symbols ($Q'_{ACK}$) of the HARQ-ACK are mapped to some of the REs, and thus the number of modulation symbols ($Q'_{ACK}$) of the HARQ-ACK needs to be excluded.

When CSI part 2 is transmitted in a PUSCH, the maximum number of modulation symbols for transmitting CSI part 2 is $\lceil \alpha \cdot \Sigma_{l=0}^{N_{symb,all}^{PUCSH}-1} M_{SC}^{UCI}(l) \rceil - Q'_{ACK} - Q'_{CSI-1}$. Here, $\Sigma_{l=0}^{N_{symb,all}^{PUCSH}-1} M_{SC}^{UCI}(l)$ denotes the number of REs to which the CSI part 2 is to be mapped in the PUSCH. For reference, CSI part 2 is mapped from a first symbol of the PUSCH, it is expressed as l=0. According to α configured by the base station, $\lceil \alpha \cdot \Sigma_{l=0}^{N_{symb,all}^{PUCSH}-1} M_{SC}^{UCI}(l) \rceil$ REs may be used for CSI part 2. However, modulation symbols ($Q'_{ACK}$) of the HARQ-ACK and modulation symbols ($Q'_{CSI-1}$) of CSI part 1 are mapped to some of the REs, and thus the number of modulation symbols ($Q'_{ACK}$) of the HARQ-ACK and the number of modulation symbols ($Q'_{CSI-1}$) of the CSI part 1 need to be excluded.

Equation 7 to Equation 9 may be applicable when a PUSCH transmits a TB in a single slot. That is, parameters of Equation 7 to Equation 9 may be values defined in a single slot. For example, $N^{PUSCH}_{symb,al}$ denotes the total number of symbols used for PUSCH transmission in a single slot. $C_{UL-SCH}$ denotes the number of CBs included in a UL-SCH of a PUSCH transmitted in the single slot.

In addition, the equation may be applicable in case that a PUSCH is repeatedly transmitted in a plurality of slots (repetitive PUSCH transmission type A). In this instance, the parameters of Equation 7 to Equation 9 may be values defined in a slot in which overlap with a PUCCH occurs. For example, $N^{PUSCH}_{symb,all}$ denotes the total number of symbols used for PUSCH transmission in a slot in which overlap with a PUCCH occurs, $C_{UL-SCH}$ denotes the number of CBs included in a UL-SCH of a PUSCH transmitted in a slot in which overlap with a PUCCH occurs.

As another example, the UE may perform single UCI multiplexing in one transmission occasion. In this instance, Equation 7 to Equation 9 may be applicable when a PUSCH transmits a TB in one transmission occasion. That is, parameters of Equation 7 to Equation 9 may be values defined in one transmission occasion. For example, $N^{PUSCH}_{symb,all}$ denotes the total number of symbols used for PUSCH transmission in one transmission occasion. $C_{UL-SCH}$ denotes the number of CBs included in a UL-SCH of a PUSCH transmitted in one transmission occasion.

In addition, the equation may be applicable when a PUSCH is repeatedly transmitted in multiple transmission occasions. In this instance, the parameters of Equation 7 to Equation 9 may be values defined in a transmission occasion in which overlap with a PUCCH occurs. For example, $N^{PUSCH}_{symb,all}$ denotes the total number of symbols used for PUSCH transmission in a transmission occasion in which overlap with a PUCCH occurs. $C_{UL-SCH}$ denotes the number of CBs included in a UL-SCH of a PUSCH transmitted in a transmission occasion in which overlap with a PUCCH occurs.

For reference, in the disclosure, a transmission occasion may be the same as a symbol set that has been described above. That is, a symbol set of repetitive PUSCH transmission type A is a PUSCH transmitted in a single slot, and a symbol set of repetitive PUSCH transmission type B is a PUSCH transmitted via a single nominal repetition.

<In Case of Transmission of a TB Via a Plurality of Slots, a Method of Multiplexing a PUSCH and a PUCCH>

Figure 22:
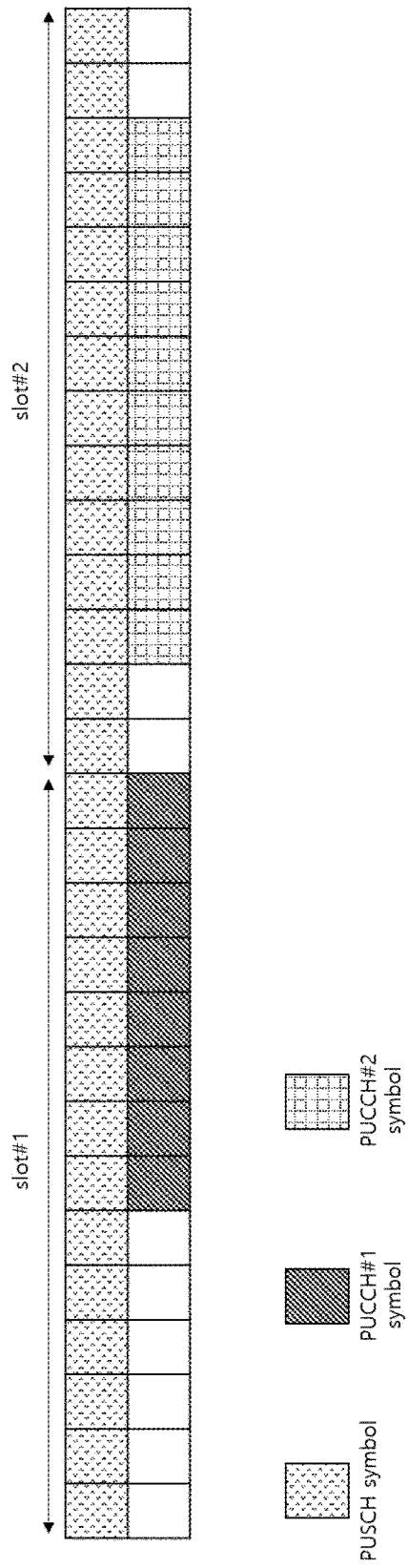
FIGS. 22 and 23 are diagrams illustrating examples of a collision between a plurality of PUCCHs and a PUSCH of which a TBS is determined based on a plurality of slots or a plurality of nominal PUSCHs.
Figure 23:
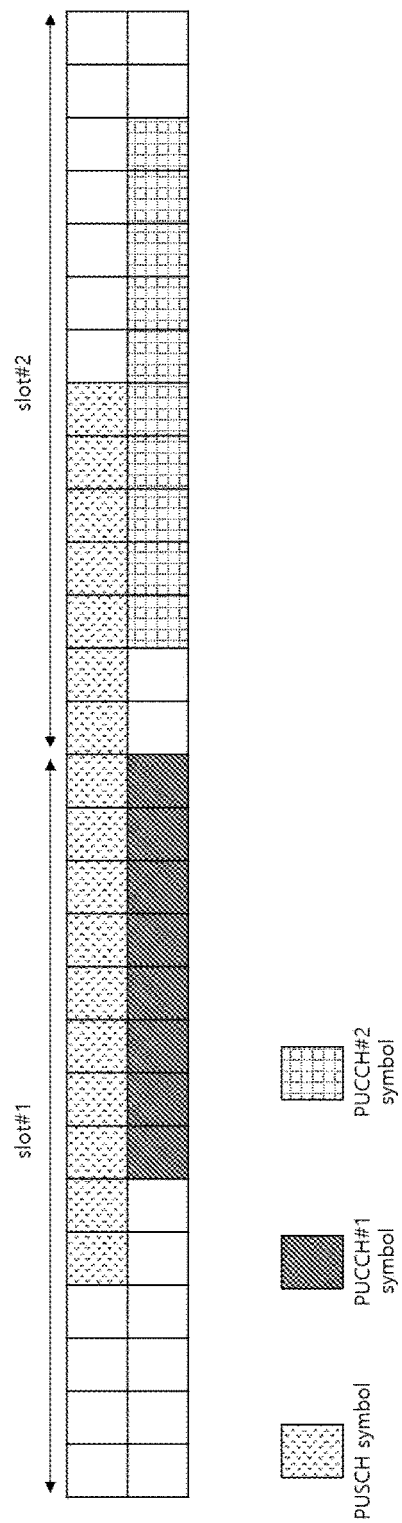

FIGS. 22 and 23 are diagrams illustrating examples of a collision between a plurality of PUCCHs and a PUSCH of which a TBS is determined based on a plurality of slots or a plurality of nominal PUSCHs.

Referring to FIGS. 22 and 23, in case that a TB of a PUSCH is transmitted in a plurality of slots, each slot in which the TB is transmitted and a slot for PUCCH transmission may overlap. In this instance, the PUSCH and the PUCCH may be multiplexed and transmitted. In this instance, the PUSCH may be transmitted according to repetitive transmission type A or repetitive transmission type B according to the above-described embodiment. That is, a TBS of the PUSCH may be determined based on a plurality of symbol sets.

Hereinafter, unless otherwise mentioned, a description is provided with reference to repetitive PUSCH transmission type A. However, the following embodiments may be also applicable to repetitive PUSCH transmission type B as well as repetitive PUSCH transmission type A.

Specifically, in case that a TB is transmitted via a PUSCH, the TB may be transmitted in a single slot. However, in case that the size of a TB is large, the TB may be transmitted in a plurality of slots. In this instance, a single TB may be configured with at least one code block, and may be transmitted in a plurality of slots repeatedly.

In this instance, each slot in which a single TB is transmitted and a slot for transmitting UCI of each PUCCH may overlap. In this instance, a PUSCH for transmission of a TB in each slot and UCI of a PUCCH for UCI transmission that is multiplexed with the PUSCH may be transmitted. That is, in case that the size of a TB is large, the TB may be transmitted via a plurality of slots, and UCI of the PUCCH may be transmitted for each slot. In this instance, a symbol to which a TB is mapped and a symbol to which UCI of the PUCCH may overlap in each slot, and a UE may multiplex the UCI of the PUCCH with the PUSCH in each slot and may transmit the same to a base station.

For example, as illustrated in FIGS. 21 and 22, the UE may determine a TBS for a single PUSCH based on symbol sets of two slots (slot #1, slot #2). The UE may receive, from the base station, an indication or configuration of transmission of different PUCCHs in symbol sets of the two determined slots. That is, the indication or configuration shows transmission of a first PUCCH (PUCCH #1) in a first slot (slot #1) and transmission of a second PUCCH (PUCCH #2) in a second slot (slot #2). Through the above, following problems may occur.

First, in case that a PUSCH resource collides with a plurality of PUCCH resources, the UE may selects only one of the plurality of PUCCH resources and map UCI of the corresponding PUCCH to the PUSCH resource.

In this instance, a single resource for transmitting the UCI of the PUCCH may be selected via one of the following methods.

one PUCCH may be a PUCCH including UCI having the highest priority among the plurality of PUCCHs. For example, priorities may be given in order of HARQ-ACK>CSI part I>CSI part 2. In case that a first PUCCH includes a HARQ-ACK and a second PUCCH includes CSI part 1 or CSI part 2, the UE may select the first PUCCH, may map the UCI (i.e., HARQ-ACK) of the corresponding PUCCH to a PUSCH resource, and may transmit the same.

Alternatively, one PUCCH may be determined according to a signal or a channel that schedules a PUCCH. For example, in case that a first PUCCH is scheduled via DCI and a second PUCCH is scheduled via an RRC signal or a signal from a higher layer, the UE may select a PUCCH scheduled via the DCI. The UCI of the corresponding PUCCH may be mapped to a PUSCH resource and may be transmitted. This is because the UCI transmitted by the PUCCH that is scheduled via the DCI may be considered more important.

Alternatively, one PUCCH may be determined in chronological order of symbols or slots that schedule PUCCHs. For example, a PUCCH that is earlier than the other may be selected between the first PUCCH and the second PUCCH. This is because that transmitting the first PUCCH of which quick transmission is indicated may be considered important. As another example, a PUCCH that is later than the other may be selected between the first PUCCH and the second PUCCH. This is because that the last PUCCH provides the longest processing time, and thus the UCI of the PUCCH may be transmitted via a PUSCH.

Alternatively, one PUCCH may be determined based on a resource that a PUCCH occupies. For example, one PUCCH may be a PUCCH resource including a small amount of resource. The corresponding resource may include the number of symbols in the time domain, the number of PRBs in the frequency domain, or the number of REs in the time/frequency domain. For example, the UE may select a PUCCH resource having a small number of REs and may use a larger amount of resource for data transmission via a PUSCH.

Alternatively, one PUCCH may be a PUCCH resource including a large amount of resource. The corresponding resource may include the number of symbols in the time domain, the number of PRBs in the frequency domain, or the number of REs in the time/frequency domain. For example, in case that a large number of REs are allocated to a PUCCH resource, the main purpose may be coverage extension or reliable UCI transmission. Accordingly, transmission may be preferably performed via a PUSCH.

Alternatively, a single PUCCH may be a resource indicated or configured to multiplex (multiplexing) UCI with a PUSCH. For example, in order to select a PUCCH resource flexibly depending on a channel condition, the UE may receive, from the base station, an indication of a predetermined PUCCH resource that is to perform UCI multiplexing with a PUSCH among the plurality of PUCCH resources that experiences a collision.

In the above embodiment, the number of modulation symbols (the number of REs) for UCI transmission may be determined based on the length of UCI of the selected PUCCH and a resource that a PUSCH occupies in a slot of the selected PUCCH.

However, the method of selecting one PUCCH may be incapable of multiplexing UCIs of a plurality of PUCCH resources separately with the PUSCH. In this instance, in case that UCI of a PUCCH that is not multiplexed with the PUSCH and is not transmitted is a HARQ-ACK, the latency of the corresponding HARQ-ACK may be increased, which is a drawback. Preferably, in an NR system, the reliability of a PUCCH is considered more important than the reliability of a PUSCH, and thus PUCCH transmission may be preferably performed. However, a predetermined PUCCH may not be transmitted in the above-described situation, which is a drawback. Accordingly, there is a desire for a solution to overcome the same.

According to an embodiment of the disclosure, the UE may select one of a plurality of slots in which a PUSCH is transmitted, and may collect UCIs of PUCCHs that overlap the PUSCH and perform multiplexing in the selected slot.

Here, one slot may be determined as follows. To secure time for operating a UCI by using a PUSCH, the UE may multiplex the UCI in the last slot of the slots in which the PUSCH is transmitted. In this instance, a UCI is always multiplexed with the last slot of the PUSCH and the PUSCH is not multiplexed in the remaining slots. Therefore, when transmitting a PUSCH in the last slot, the UE may transmit the PUSCH in consideration of the UCI. However, according to the scheme, a UCI is transmitted in a slot that is later than a slot in which transmission of the PUCCH is indicated, and thus latency may additionally occur. As another example, to secure time for operating a UCI by using a PUSCH, the UE may multiplex the UCI in the last slot of the slots in which overlap with a PUCCH occurs among the slots in which the PUSCH is transmitted. That is, the UCI is transmitted in the last slot in which overlap with the PUCCH occurs, and thus latency may be reduced. However, UCI may need to be multiplexed in the middle of transmission of the PUSCH.

In the above embodiment, the number of modulation symbols (the number of REs) for UCI transmission may be determined based on the length of collected UCIs of overlapping PUCCHs and a resource occupied by a PUSCH in a slot in which the UCI is to be multiplexed. That is, $O_{ACK}$ in Equation 7 denotes the number of bits of a HARQ-ACK among the collected UCIs. $O_{CSI-1}$ in Equation 8 denotes the number of bits of CSI part 1 among the collected UCIs. $O_{CSI-2}$ in Equation 9 denotes the number of bits of CSI part 2 among the collected UCIs.

According to an embodiment of the disclosure, the UE may multiplex the UCI of a PUCCH that overlaps with a PUSCH in each slot in which overlap with a PUCCH occurs among a plurality of slots in which the PUSCH is transmitted.

Specifically, in case that a TBS that is the size of a TB is determined based on a plurality of slots and UCIs of different PUCCHs are transmitted in respective slots of the PUSCH that transmits the TB, the PUSCH and the PUCCHs may be multiplexed and transmitted in respective slots. In this instance, the size (the number of symbols or bits) of each parameter of a UCI to be multiplexed may be calculated in each slot.

However, the size of each parameter of a UCI to be multiplexed in each slot may be calculated based on a TBS. However, the TBS has been determined based on a plurality of slots, and thus the TBS needs to be scaled based on each slot in order to calculate the size of each parameter of a UCI to be multiplexed. Alternatively, the size of each parameter of the UCI may be determined based on a TBS that is not scaled.

For example, as illustrated in FIG. 22, in case that the UE transmits a PUSCH in a first slot (slot #1) and a second slot (slot #2), a first PUCCH (PICCH #1) may overlap in the first slot and the second PUCCH (PUCCH #2) may overlap in the second slot. Here, a first UCI of the first PUCCH may be multiplexed with the PUSCH in the first slot, and a second UCI of the second PUCCH may be multiplexed with the PUSCH in the second slot.

In this instance, the number of modulation symbols (the number of REs) that the UCI of a PUCCH occupies in each slot in which a PUCCH is multiplexed may need to be determined. In order to multiplex the first UCI in the first slot (slot #1), $Q'_{ACK}(1)$ modulation symbols in the first slot may be needed. In addition, in order to multiplex the second UCI in the second slot (slot #2), $Q'_{ACK}(2)$ modulation symbols in the second slot may be needed.

With reference to Equation 7 to Equation 9, the number of bits of a TB(UL-SCH) included in the first slot may need to be determined in order to obtain $Q'_{ACK}(1)$ modulation symbols of the first slot. The number of bits of a TB(UL-SCH) included in the second slot may need to be determined in order to obtain $Q'_{ACK}(2)$ modulation symbols of the second slot. In the disclosure, a method of obtaining $Q'_{ACK}(1)$ or $Q'_{ACK}(2)$ is disclosed.

In the embodiment, a UE may arrange (map) a single TB in a symbol set of a plurality of slots. Accordingly, a part of a single TB may be included in a single slot. Furthermore, in case that a single TB includes one or more CBs, a single CB may be arranged in (mapped to) a symbol set of a plurality of slots. Accordingly, it is difficult to determine the number of CBs in a slot in which the UE desires to perform multiplexing of a UCI.

To overcome the above-described problems, various embodiments of the disclosure are disclosed.

First Embodiment: Calculates the Number of Modulation Symbols by Scaling a TBS

According to the first embodiment, in case that a single TB is transmitted in a plurality of slots, that is, a single slot includes a part of the TB, the UE may determine the number of modulation symbols by adjusting (or scaling), based on a single slot, a TBS of the TB mapped to the plurality of slots. That is, the UE may scale the TBS based on the case of transmitting the TB in a single slot, and may calculate the number of modulation symbols of a UCI of a PUCCH to be multiplexed with a PUSCH.

In other words, the UE may scale the sum of CB sizes ($K_r$) of a UL-SCH that is the TB, and may calculate the number of modulation symbols (the number of REs) for transmitting a UCI of each PUCCH. That is, in case that there are N PUCCHs that collide with a PUSCH, $Q'_{ACK}$ of each PUCCH is $Q'_{ACK}(1)$, $Q'_{ACK}(2)$, ..., $Q'_{ACK}(N)$, $Q'_{CSI-1}$ is $Q'_{CSI-1}(1)$, $Q'_{CSI-1}(2)$, ..., $Q'_{CSI-1}(N)$, and $Q'_{CSI-2}$ is $Q'_{CSI-2}(1)$, $Q'_{CSI-2}(2)$, ..., $Q'_{CSI-2}(N)$. In this instance, a scaling value $P(1)$, $P(2)$, ... $P(N)$ may be determined based on the following information. Generally, the number of modulation symbols according to the disclosure may be obtained according to Equation 10 to Equation 12 below.

Equation 10 is an example of the number of modulation symbols of a HARQ-ACK/NACK of a UCI.

$$Q'_{ACK}(i) = \min\left\{ \left\lceil \frac{\left(O_{ACK}(i) + L_{ACK}(i) \cdot \beta^{PUSCH}_{offset}\right) \cdot \sum_{l=0}^{N^{PUSCH}_{symb,all(i)}-1} M^{UCI}_{sc}(i,l)}{P(i) \cdot \sum_{r=0}^{C_{UL-SCH}-1} K_r} \right\rceil, \left\lceil \alpha \cdot \sum_{l=l_0(i)}^{N^{PUSCH}_{symb,all(i)}-1} M^{UCI}_{sc}(i,l) \right\rceil \right\}$$ [Equation 10]

In Equation 10, each parameter may be as follows.

I denotes an index of a slot in which a HARQ-ACK is to be multiplexed;

$O_{ACK}(i)$ denotes the number of HARQ-ACK bits in slot i;

$L_{ACK}(i)$ denotes the number of CRC bits in slot i;

$M_{SC}^{UCI}(i,l)$ denotes the number of REs to be used for UCI transmission in an $l^{th}$ PUSCH symbol of slot i;

$N_{symb,all}^{PUSCH}$ denotes the total number of symbols used for PUSCH transmission including a DMRS of slot i;

$l_0(i)$ denotes the index of a first PUSCH symbol that is different from a DMRS, after a first DMRS symbol of slot i.

Equation 11 is an example of the number of modulation symbols of CSI part 1 of a UCI.

$$Q'_{CSI-1}(i) = \min\left\{\left\lceil\frac{(O_{CSI-1}(i) + L_{CSI-1}(i)) \cdot \beta_{offset}^{PUSCH} \cdot \sum_{l=0}^{N_{symb,all}^{PUSCH}(i)-1} M_{sc}^{UCI}(i,l)}{P(i) \cdot \sum_{r=0}^{C_{UL-SCH}-1} K_r}\right\rceil, \left\lceil\alpha \cdot \sum_{l=0}^{N_{symb,all}^{PUSCH}(i)-1} M_{sc}^{UCI}(i,l)\right\rceil - Q'_{ACK}(i)\right\}$$ [Equation 11]

In Equation 11, each parameter may be as follows.

$O_{SCI-1}(i)$ denotes the number of bits of CSI part 1 of slot i;

In case of $O_{CSI-1}(i) \geq 360$, $L_{CSI-1}(i)=11$; Otherwise, $L_{CSI-1}(i)$ is the number of CRC bits of CSI part 1 of slot i.

Equation 12 is an example of the number of modulation symbols of CSI part 2 of a UCI.

$$Q'_{CSI-2}(i) = \min\left\{\left\lceil\frac{(O_{CSI-2}(i) + L_{CSI-2}(i)) \cdot \beta_{offset}^{PUSCH} \cdot \sum_{l=0}^{N_{symb,all}^{PUSCH}(i)-1} M_{sc}^{UCI}(i,l)}{P(i) \cdot \sum_{r=0}^{C_{UL-SCH}-1} K_r}\right\rceil, \left\lceil\alpha \cdot \sum_{l=0}^{N_{symb,all}^{PUSCH}(i)-1} M_{sc}^{UCI}(i,l)\right\rceil - Q'_{ACK}(i) - Q'_{CSI-1}(i)\right\}$$ [Equation 12]

In Equation 12, each parameter may be as follows.

$O_{CSI-2}(i)$ denotes the number of bits of CSI part 2 of slot i;

In case of; Otherwise, $O_{CSI-2}(i) \geq 360$, $L_{CSI-2}(i)=11$; Otherwise, $L_{CSI-2}(i)$ is the number of CRC bits of CSI part 2 of slot i;

Comparing Equations 10 to 12 and Equations 7 to 9, the UE may determine the number of bits of a UL-SCH(TB) of a PUSCH in an $i^{th}$ slot as $P(i) \cdot \sum_{r=0}^{C_{UL-SCH}-1} K_r$. A PUSCH of which the number of bits of the UL-SCH(TB) is $\sum_{r=0}^{C_{UL-SCH}-1} K_r$ is transmitted in K slots, and thus the number of bits of the UL-SCH(TB) transmitted in a single slot may not be $\sum_{r=0}^{C_{UL-SCH}-1} K_r$ and may be a smaller value than that.

In this instance, a method of determining P(i) that is a scaling value of a TBS is described with reference to Equations 10 to Equation 12.

According to method 0, P(i)=1. That is, although a PUSCH in a single slot includes a part of the UL-SCH (TB), it is regarded as if the whole UL-SCH(TB) would be transmitted. According to method 0, a size larger than the size of the UL-SCH(TB) that is actually transmitted in a single slot is considered, and thus a small number of modulation symbols may be used for UCI transmission. Accordingly, this may affect the reliability of a UCI.

According to method 1, a UE may scale (scaling) the number of bits of the whole UL-SCH (TB) based on a value (K) which is a reference used when the UE determines a TBS. Here, K denotes the number of slots to be used for PUSCH transmission in case of repetitive PUSCH transmission type A, and K denotes the number of nominal repetitions to be used for PUSCH transmission in case of repetitive PUSCH transmission type B. A scaling value based on K may be determined to be P(i)=1/K. A PUSCH of which the number of bits of a UL-SCH(TB) is $\sum_{r=0}^{C_{UL-SCH}-1} K_r$ is transmitted in K slots, and thus the number of bits of the UL-SCH(TB) transmitted in a single slot may be 1/k of the number of bits of the whole UL-SCH(TB) on average.

According to method 1-1, a value (K') that is a reference used when the UE determines a TBS may be the number of predetermined slot sets. Here, the predetermined slot set may include a slot in which a collision occurs, and consecutive slots of the corresponding slot in time domain. That is, a slot in which a PUCCH and a PUSCH collide and K' consecutive slots of the corresponding slot in the time domain may be included. Here, K' consecutive slots in the time domain may include slots in which PUSCH transmission is valid. A scaling value based on K' may be determined as P(i)= 1/K'. A PUSCH of which the number of bits of a UL-SCH(TB) is $\sum_{r=0}^{C_{UL-SCH}-1} K_r$ is transmitted in K' slots, and thus the number of bits of the UL-SCH(TB) transmitted in a single slot may be 1/K' of the number of bits of the whole UL-SCH(TB) on average.

According to method 2, the number of bits of the whole UL-SCH(TB) may be scaled based on a PUCCH resource that collides with a PUSCH in each slot. More specifically, the number of bits of the whole UL-SCH (TB) may be scaled based on the ratio of a PUCCH resource that collides with a PUSCH in each slot. A PUCCH resource that collides with a PUSCH may include the number of symbols in the time domain, the number of subcarriers in the frequency domain, or the number of REs. For example, referring to FIG. 23, the number of symbols of PUCCH #1 that collides with a PUSCH is N1=8, and the number of symbols of PUCCH #2 that collides a PUSCH is N2=5. In this instance, a scaling value may be P(1)=N1/(N1+N2) and P(2)=N2/(N1+N2).

According to method 3, the number of bits of the whole UL-SCH(TB) may be scaled based on a PUCCH resource. More specifically, the number of bits of the whole UL-SCH(TB) may be scaled based on the ratio of a PUCCH resource. A PUCCH resource may include the number of symbols in the time domain, the number of subcarriers in the frequency domain, or the number of REs. For example, referring to FIG. 23, in case that repetitive PUSCH transmission type is not type B and the UE is based on the number of symbols of each PUCCH, the number of symbols of PUCCH #1 is N1=8, and the number of symbols of PUCCH #2 that collides a PUSCH is N2=10. In this instance, a scaling value may be P(1)=N1/(N1+N2) and P(2)=N2/(N1+N2).

According to method 4, the number of bits of the whole UL-SCH(TB) may be scaled based on a PUSCH resource of each slot. More specifically, the number of bits of the whole UL-SCH(TB) may be scaled based on the ratio of a PUSCH resource. A PUSCH resource may include the number of symbols in the time domain, the number of subcarriers in the frequency domain, or the number of REs. For example, referring to FIG. 23, the number of symbols of a PUSCH in slot #1 is $N_{symb,all}^{PUSCH}(1)=10$, and the number of symbols of a PUSCH in slot #2 is $N_{symb,all}^{PUSCH}(2)=7$. In this instance, a scaling value may be and $P(1)=N_{symb,all}^{PUSCH}(1)/(N_{symb,all}^{PUSCH}(1)+N_{symb,all}^{PUSCH}(2))$ and $P(2)=N_{symb,all}^{PUSCH}(2)/(N_{symb,all}^{PUSCH}(1)+N_{symb,all}^{PUSCH}(2))$. That is, generally, $P(i)=N_{symb,all}^{PUSCH}(i)/(N_{symb,all}^{PUSCH}(1)+N_{symb,all}^{PUSCH}(2)+\ldots+N_{symb,all}^{PUSCH}(N))$.

According to method 5, the number of bits of the whole UL-SCH(TB) may be scaled based on a PUSCH resource excluding a DM-RS symbol of each slot. More specifically, the number of bits of the whole UL-SCH(TB) may be scaled based on the ratio of a PUSCH resource excluding a DM-RS symbol. A PUSCH resource excluding a DM-RS symbol may include the number of symbols in the time domain, the number of subcarriers in the frequency domain, or the number of REs. For example, the number of symbols of a PUSCH excluding a DM-RS symbol in slot #1 is N1, and the number of symbols of a PUSCH excluding a DM-RS symbol in slot #2 is N2. In this instance, a scaling value may be P(1)=N1/(N1+N2) and P(2)=N2/(N1+N2).

According to method 6, the number of bits of the whole UL-SCH(TB) may be scaled based on a PUSCH resource excluding an RE used for a PTRS and a DM-RS symbol of each slot. More specifically, the number of bits of the whole UL-SCH(TB) may be scaled based on the ratio of a PUSCH resource excluding an RE used for a PTRS and a DM-RS symbol. A PUSCH resource excluding an RE used for a PTRS and a DM-RS symbol may include the number of symbols in the time domain, the number of subcarriers in the frequency domain, or the number of REs. For example, the number of REs of a PUSCH excluding an RE used for a PTRS and a DM-RS symbol in slot #1 is N1, and the number of REs of a PUSCH excluding an RE used for a PTRS and a DM-RS symbol in slot #2 is N2. In this instance, a scaling value may be P(1)=N1/(N1+N2) and P(2)=N2/(N1+N2). For reference, the number of REs of a PUSCH excluding an RE used for a PTRS and a DM-RS in slot #1 may be determined as $\Sigma_{l=0}^{N_{symb,all}^{PUSCH}(i)-1} M_{SC}^{UCI}(i,l)$.

According to method 7, the scaling value may be a configured or indicated value.

Second Embodiment: Calculates the Number of Modulation Symbols Based on a Resource in which a PUSCH is Transmitted According to the second embodiment, a UE may determine the number of modulation symbols for UCI transmission based on a resource in which the whole PUSCH is transmitted. More specifically, the number of modulation symbols for UCI transmission in an $i^{th}$ slot may be obtained according to Equations 13 to 15.

Equation 13 is an example of the number of modulation symbols of a HARQ-ACK/NACK of a UCI.

[Equation 13]

$$Q'_{ACK}(i) = \min\left\{\left\lceil\frac{\left(O_{ACK}(i) + L_{ACK}(i) \cdot \beta_{offset}^{PUSCH}(i) \cdot \sum_{n=0}^{K-1}\sum_{l=0}^{N_{symb,all}^{PUSCH}(n)-1} M_{sc}^{UCI}(n,l)\right)}{\sum_{r=0}^{C_{UL-SCH}-1} K_r}\right\rceil, \left\lceil\alpha \cdot \sum_{l=l_0(i)}^{N_{symb,all}^{PUSCH}(i)-1} M_{sc}^{UCI}(i,l)\right\rceil\right\}$$

Equation 14 is an example of the number of modulation symbols of CSI part 1 of a UCI.

[Equation 14]

$$Q'_{CSI-1}(i) = \min\left\{\left\lceil\frac{(O_{CSI-1}(i) + L_{CSI-1}(i)) \cdot \beta_{offset}^{PUSCH} \cdot \sum_{n=0}^{K-1}\sum_{l=0}^{N_{symb,all}^{PUSCH}(n)-1} M_{sc}^{UCI}(n,l)}{P(i) \cdot \sum_{r=0}^{C_{UL-SCH}-1} K_r}\right\rceil, \left\lceil\alpha \cdot \sum_{l=0}^{N_{symb,all}^{PUSCH}(i)-1} M_{sc}^{UCI}(i,l)\right\rceil - Q'_{ACK}(i)\right\}$$

Equation 15 is an example of the number of modulation symbols of part 2 of a UCI.

[Equation 15]

$$Q'_{CSI-2}(i) = \min\left\{ \left\lceil \frac{\left(O_{CSI-2}(i) + L_{CSI-2}(i)\right) \cdot \beta^{PUSCH}_{offset} \cdot \sum_{n=0}^{K-1} \sum_{l=0}^{N^{PUSCH}_{symb,all}(n)-1} M^{UCI}_{SC}(n,l)}{P(i) \cdot \sum_{r=0}^{C_{UL-SCH}-1} K_r} \right\rceil, \left\lceil \alpha \cdot \sum_{l=0}^{N^{PUSCH}_{symb,all}(i)-1} M^{UCI}_{sc}(i,l) \right\rceil - Q'_{ACK}(i) - Q'_{CSI-1}(i) \right\}$$

That is, although Equations 10 to 12 determine $Q'_{ACK}(i)$, $Q'_{CSI-1}(i)$, and $Q'_{CSI-2}(i)$ based on $\sum_{l=0}^{N^{PUSCH}_{symb,all}(i)-1} M_{SC}^{UCI}(i,l)$ that is the number of resources in an $i^{th}$ slot, Equations 13 to 15 determine $Q'_{ACK}(i)$ based on $\sum_{n=0}^{K-1} \sum_{l=0}^{N^{PUSCH}_{symb,all}(n)-1} M_{SC}^{UCI}(n,l)$ that is the number of resources in which the whole PUSCH is transmitted. Therefore, no separate scaling of TBS is needed.

According to a $(2\text{-}1)^{th}$ embodiment, a UE may determine the number of modulation symbols for UCI transmission based on a PUSCH resource of a predetermined slot set. Here, the predetermined slot set may include a slot in which a PUCCH and a PUSCH collide, and consecutive slots of the corresponding slot in the time domain. Here, the consecutive slots in the time domain may include slots in which PUSCH transmission is valid. Specifically, a slot in which a PUCCH and a PUSCH collide and consecutive slots of the corresponding slot in the time domain, where PUSCH transmission is valid, may be included. More specifically, the number of modulation symbols for UCI transmission in an $i^{th}$ slot may be obtained according to Equations 16 to 18.

Equation 16 is an example of the number of modulation symbols of a HARQ-ACK/NACK of a UCI.

[Equation 16]

$$Q'_{ACK}(i) = \min\left\{ \left\lceil \frac{\left(O_{ACK}(i) + L_{ACK}(i) \cdot \beta^{PUSCH}_{offset}(i) \cdot \sum_{n=i_0}^{K'-1} \sum_{l=0}^{N^{PUSCH}_{symb,all}(n)-1} M^{UCI}_{sc}(n,l)\right)}{\sum_{r=0}^{C_{UL-SCH}-1} K_r} \right\rceil, \left\lceil \alpha \cdot \sum_{l=i_0(i)}^{N^{PUSCH}_{symb,all}(i)-1} M^{UCI}_{sc}(i,l) \right\rceil \right\}$$

Equation 17 is an example of the number of modulation symbols of CSI part 1 of a UCI.

[Equation 17]

$$Q'_{CSI-1}(i) = \min\left\{ \left\lceil \frac{\left(O_{CSI-1}(i) + L_{CSI-1}(i)\right) \cdot \beta^{PUSCH}_{offset} \cdot \sum_{n=i_0}^{K'-1} \sum_{l=0}^{N^{PUSCH}_{symb,all}(n)-1} M^{UCI}_{sc}(i,l)}{\sum_{r=0}^{C_{UL-SCH}-1} K_r} \right\rceil, \left\lceil \alpha \cdot \sum_{l=0}^{N^{PUSCH}_{symb,all}(i)-1} M^{UCI}_{sc}(i,l) \right\rceil - Q'_{ACK}(i) \right\}$$

Equation 18 is an example of the number of modulation symbols of part 2 of a UCI.

[Equation 18]

$$Q'_{CSI-2}(i) =$$

$$\min\left\{\left\lceil\frac{(O_{CSI-2}(i) + L_{CSI-2}(i)) \cdot \beta_{offset}^{PUSCH} \cdot \sum_{n=i_0}^{K'-1} \sum_{l=0}^{N_{symb,all}^{PUSCH}(n)-1} M_{sc}^{UCI}(n,l)}{\sum_{r=0}^{C_{UL-SCH}-1} K_r}\right\rceil, \left\lceil\alpha \cdot \sum_{l=0}^{N_{symb,all(i)}^{PUSCH}-1} M_{sc}^{UCI}(i,l)\right\rceil - Q'_{ACK}(i) - Q'_{CSI-1}(i)\right\}$$

Although Equations 13 to 15 determine $Q'_{ACK}(i)$, $Q'_{CSI-1}(i)$, and $Q'_{CSI-2}(i)$ based on $\sum_{n=0}^{K'-1}\sum_{l=0}^{N_{symb}^{PUSCH}(n)-1} M_{SC}^{UCI}(n,l)$ that is the total number of PUSCH resources allocated as K symbol sets, Equations 16 to 18 may determine $Q'_{ACK}(i)$, $Q'_{CSI-1}(i)$, and $Q'_{CSI-2}(i)$ based on $\sum_{n=i_0}^{K'-1}\sum_{l=0}^{N_{symb}^{PUSCH}(n)-1} M_{SC}^{UCI}(n,l)$ that is the number of consecutive PUSCH resources including a slot in which a collision with a PUCCH occurs. Here, K' is the number of slots of a predetermined slot set including an $i^{th}$ slot, that is, the number of consecutive PUSCH slots in the time domain including the it slot in which a collision with a PUCCH resource occurs. $i_0$ denotes the index of the earliest slot in the time domain in the predetermined slot set including the $i^{th}$ slot, that is, the index of the foremost slot among the consecutive PUSCH slots in the time domain including the $i^{th}$ slot in which a collision with a PUCCH resource occurs.

In the above-described first embodiment and second embodiment, X in min{X,Y} used for obtaining a modulation symbol has been described. Hereinafter, an embodiment associated with Y indicating the maximum number of modulation symbols to be used for a UCI among PUSCH resources is described. Y described in the following embodiment may be used for Y of the first embodiment and the second embodiment.

A base station configures or indicates a for a UE, and thus the maximum number of modulation symbols to be used for a UCI among the PUSCH resources may be adjustable. That is, the base station configures an appropriate value, and may determine the maximum number of modulation symbols for transmitting a UCI in a PUSCH and the minimum number of modulation symbols for transmitting a UL-SCH in the PUSCH. In the above-described first embodiment and second embodiment, a has been applied to a PUSCH resource in each slot.

For example, to determine the number of modulation symbols for transmitting a HARQ-ACK, the maximum number (Y) of modulation symbols to be used for a UCI among PUSCH resources may be as shown in Equation 19.

$$\left\lceil\alpha \cdot \sum_{l=l_0(i)}^{N_{symb,all}^{PUSCH}(i)-1} M_{sc}^{UCI}(i,l)\right\rceil$$ [Equation 19]

Here, $$\sum_{l=l_0(i)}^{N_{symb,all}^{PUSCH}(i)-1} M_{sc}^{UCI}(i,l)$$

is the number of REs to which modulation symbols of a HARQ-ACK are to be allocated among PUSCH resources in slot i. Therefore, as the value determined by Equation 19, a predetermined ratio of the REs to which the modulation symbols of the HARQ-ACK are allocable among PUSCH resources in the slot i may be used for the modulation symbols of the HARQ-ACK. However, in case that a single TB is transmitted in a plurality of slots and a sufficient resource is capable of being used for a UL-SCH in other slots, a sufficient number of REs may be used for the UL-SCH although all resources are used for the modulation symbols of a HARQ-ACK in one slot.

Subsequently, a method of determining the maximum number (Y) of modulation symbols to be used for a UCI among PUSCH resources is described in the disclosure.

Third Embodiment: Calculates the Number of Modulation Symbols in Ascending Order of Slot Indices According to the third embodiment, the maximum number (Y) of modulation symbols to be used for a UCI among PUSCH resources may be determined in ascending order of slot indices. That is, the number of modulation symbols of a UCI may be determined in order of symbols earlier in the time domain. Specifically, in case that there are N PUCCHs that collide with a PUSCH, it is assumed that $Q'_{ACK}$ of each PUCCH is $Q'_{ACK}(1)$, $Q'_{ACK}(2)$, ..., $Q'_{ACK}(N)$, $Q'_{CSI-1}$ is $Q'_{CSI-1}(1)$, $Q'_{CSI-1}(2)$, ..., $Q'_{CSI-1}(N)$, and $Q'_{CSI-2}$ is $Q'_{CSI-2}(1)$, $Q'_{CSI-2}(2)$, ..., $Q'_{CSI-2}(N)$. Here, the indices are arranged in chronological order. A method in which a UE determines the maximum number (Y) of modulation symbols to be used for a UCI among PUSCH resources is provided below. For reference, $Y_{ACK}(i)$ denotes the maximum number of modulation symbols to be used for a HARQ-ACK among PUSCH resources in slot i, $Y_{CSI-1}(i)$ denotes the maximum number of modulation symbols to be used for CSI part 1 among the PUSCH resources in slot i, and $Y_{CSI-2}(i)$ denotes the maximum number of modulation symbols to be used for CSI part 2 among PUSCH resources in slot i.

The maximum number of modulation symbols to be used for the HARQ-ACK, CSI part 1, and CSI part 2 may be determined from the earliest slot (slot index 1) in time. In this instance, the maximum number of modulation symbols may need to satisfy the following two conditions.

A first condition: (a condition of a usable RE of a PUSCH in each slot) a condition that the maximum number be less than the number of REs usable for a UCI among the REs of a PUSCH in each slot. For example, in case of a HARQ-ACK in slot i the number of modulation symbols of the HARQ-ACK needs to be less than $$\sum_{l=l_0(i)}^{N_{symb,all}^{PUSCH}(i)-1} M_{sc}^{UCI}(i,l).$$

In case of CSI part 1 in slot i, the number of modulation symbols of CSI part 1 needs to be less than $$\sum_{l=0}^{N_{symb,all}^{PUSCH}(i)-1} M_{sc}^{UCI}(i,l) - Q'_{ACK}(i).$$

In case of CSI part 2 in slot i, the number of modulation symbols of CSI part 2 needs to be less than $$\sum_{l=0}^{N_{symb,all}^{PUSCH}(i)-1} M_{sc}^{UCI}(i,l) - Q'_{ACK}(i) - Q'_{CSI-1}(i).$$

A second condition: (a condition of a usable RE of a PUSCH in all slots, including an α value) a condition that the number of REs usable for a UCI among REs of a PUSCH in all slots be as much as α of the total number of REs. For example, in case of a HARQ-ACK in slot i, the number of modulation symbols of the HARQ-ACK needs to be less than $$\left[\alpha \sum_{k=0}^{K} \sum_{l=0}^{N_{symb,all}^{PUSCH}(k)-1} M_{sc}^{UCI}(k,l)\right] - \#\_of\_UCI\_REs\_in\_the\_earlier\_slots.$$

Here, #_of_UCI_REs_in_the_earlier_slots is the number of REs used for a UCI till a previous slot (slots 1, 2, . . . , i–1). In case of CSI part 1 in slot i, the number of modulation symbols of CSI part 1 needs to be less than $$\left[\alpha \sum_{k=0}^{K-1} \sum_{l=0}^{N_{symb,all}^{PUSCH}(k)-1} M_{sc}^{UCI}(k,l)\right] -$$
$$\#\_of\_UCI\_REs\_in\_the\_earlier\_slots - Q'_{ACK}(i).$$

When compared to the number of modulation symbols of the HARQ-ACK, the number of modulation symbols may have a value that is the number of modulation symbols of HARQ-ACK in slot i smaller. In case of CSI part 2 in slot i, the number of modulation symbols of CSI part 2 needs to be less than $$\left[\alpha \sum_{k=0}^{K-1} \sum_{l=0}^{N_{symb,all}^{PUSCH}(k)-1} M_{sc}^{UCI}(k,l)\right] -$$
$$\#\_of\_UCI\_REs\_in\_the\_earlier\_slots - Q'_{ACK}(i) - Q'_{CSI-1}(i).$$

When compared to the number of modulation symbols of CSI part 1, the number of modulation symbols may have a value that is $Q'_{CSI-1}(i)$, which is the number of modulation symbols of CSI part 1 in slot i, smaller.

The number (Y) of modulation symbols calculated sequentially according to the conditions is as follows.

Equation 20 below is the number of modulation symbols in slot index 1.

$$Q'_{ACK}(1) \le Y_{ACK}(1) = \min\left\{ \sum_{l=l_0(1)}^{N_{symb,all}^{PUSCH}(1)-1} M_{sc}^{UCI}(1,l), \right.$$
$$\left. \left[\alpha \sum_{k=0}^{K-1} \sum_{l=0}^{N_{symb,all}^{PUSCH}(k)-1} M_{sc}^{UCI}(k,l)\right] \right\},$$

[Equation 20]

$$Q'_{CSI-1}(1) \le Y_{CSI-1}(1) =$$
$$\min\left\{ \begin{array}{l} \sum_{l=0}^{N_{symb,all}^{PUSCH}(1)-1} M_{sc}^{UCI}(1,l) - Q'_{ACK}(1), \\ \left[\alpha \sum_{k=0}^{K-1} \sum_{l=0}^{N_{symb,all}^{PUSCH}(k)-1} M_{sc}^{UCI}(k,l)\right] - Q'_{ACK}(1) \end{array} \right\},$$

$$Q'_{CSI-2}(1) \le Y_{CSI-2}(1) =$$
$$\min\left\{ \begin{array}{l} \sum_{l=0}^{N_{symb,all}^{PUSCH}(1)-1} M_{sc}^{UCI}(1,l) - Q'_{ACK}(1) - Q'_{CSI}(1), \\ \left[\alpha \sum_{k=0}^{K-1} \sum_{l=0}^{N_{symb,all}^{PUSCH}(k)-1} M_{sc}^{UCI}(k,l)\right] - Q'_{ACK}(1) - Q'_{CSI-1}(1) \end{array} \right\}$$

Equation 21 below is the number of modulation symbols in slot index 2.

$$Q'_{ACK}(2) \le Y_{ACK}(2) = \min\left\{ \sum_{l=l_0(2)}^{N_{symb,all}^{PUSCH}(2)-1} M_{sc}^{UCI}(2,l), \right.$$
$$\left. \left[\alpha \sum_{k=0}^{K-1} \sum_{l=0}^{N_{symb,all}^{PUSCH}(k)-1} M_{sc}^{UCI}(k,l)\right] - Q'_{tot}(1) \right\}$$

[Equation 21]

$$Q'_{CSI-1}(2) \le Y_{CSI-1}(2) =$$
$$\min\left\{ \begin{array}{l} \sum_{l=0}^{N_{symb,all}^{PUSCH}(2)-1} M_{sc}^{UCI}(2,l) - Q'_{ACK}(2), \\ \left[\alpha \sum_{k=0}^{K-1} \sum_{l=0}^{N_{symb,all}^{PUSCH}(k)-1} M_{sc}^{UCI}(k,l)\right] - Q'_{tot}(1) - Q'_{ACK}(2) \end{array} \right\}, \text{ and}$$

$$Q'_{CSI-2}(2) \le Y_{CSI-2}(2) =$$
$$\min\left\{ \begin{array}{l} \sum_{l=0}^{N_{symb,all}^{PUSCH}(2)-1} M_{sc}^{UCI}(2,l) - Q'_{ACK}(2) - Q'_{CSI-1}(2), \\ \left[\alpha \sum_{k=0}^{K-1} \sum_{l=0}^{N_{symb,all}^{PUSCH}(k)-1} M_{sc}^{UCI}(k,l)\right] - Q'_{tot}(1) - Q'_{ACK}(2) - Q'_{CSI-1}(2) \end{array} \right\}$$

Equation 22 below is the number of modulation symbols in slot index i.

$$Q'_{ACK}(i) \le Y_{ACK}(i) = \min$$

[Equation 22]

$$\left\{ \sum_{l=l_0(i)}^{N_{symb,all}^{PUSCH}(i)-1} M_{sc}^{UCI}(i,l), \left[\alpha \sum_{k=0}^{K-1} \sum_{l=0}^{N_{symb,all}^{PUSCH}(k)-1} M_{sc}^{UCI}(k,l)\right] - \sum_{j=1}^{i-1} Q'_{tot}(j) \right\}$$

-continued $$Q'_{CSI-1}(i) \le Y_{CSI-1}(i) =$$

$$\min\left\{\begin{array}{l}\sum_{l=0}^{N_{symb,all}^{PUSCH}(i)-1} M_{sc}^{UCI}(i,l) - Q'_{ACK}(i), \\ \left[\alpha \sum_{k=0}^{K-1} \sum_{l=0}^{N_{symb,all}^{PUSCH}(k)-1} M_{sc}^{UCI}(k,l)\right] - \sum_{j=1}^{i-1} Q'_{tot}(j) - Q'_{ACK}(i)\end{array}\right\}, \text{ and}$$

$$Q'_{CSI-2}(i) \le Y_{CSI-2}(i) =$$

$$\min\left\{\begin{array}{l}\sum_{l=0}^{N_{symb,all}^{PUSCH}(i)-1} M_{sc}^{UCI}(i,l) - Q'_{ACK}(i) - Q'_{CSI-1}(i), \\ \left[\alpha \sum_{k=0}^{K-1} \sum_{l=0}^{N_{symb,all}^{PUSCH}(k)-1} M_{sc}^{UCI}(k,l)\right] - \sum_{j=1}^{i-1} Q'_{tot}(j) - Q'_{ACK}(i) - Q'_{CSI-1}(i)\end{array}\right\}.$$

Here, $Q'_{tot}(i) = Q'_{ACK}(i) + Q'_{CSI-1}(i) + Q'_{CSI-2}(i)$.

According to a $(3-1)^{th}$ embodiment, a method in which a UE determines the maximum number (Y) of modulation symbols to be used for a UCI among PUSCH resources is provided below.

The number of modulation symbols for transmitting a UCI may be determined in ascending order (i.e., in chronological order) of indices of slots in a predetermined slot set. Here, the predetermined slot set may include a slot including a PUSCH that collides with a PUCCH and consecutive slots of the corresponding slot in the time domain. Here, the consecutive slots in the time domain may include slots in which PUSCH transmission is valid. The maximum number of modulation symbols to be used for a HARQ-ACK, CSI part 1, and CSI part 2 may be determined from the earliest slot (slot index $i_0$) in time. In this instance, the maximum number of modulation symbols may need to satisfy the following two conditions.

A first condition: (a condition of a usable RE of a PUSCH in each slot) a condition that the maximum number be less than the number of REs usable for a UCI among the REs of a PUSCH in each slot. For example, in case of a HARQ-ACK in slot i, the number of modulation symbols of the HARQ-ACK needs to be less than $$\sum_{l=l_0(i)}^{N_{symb,all}^{PUSCH}(i)-1} M_{sc}^{UCI}(i,l).$$

In case of CSI part 1 in slot i, the number of modulation symbols of CSI part 1 needs to be less than $$\sum_{l=0}^{N_{symb,all}^{PUSCH}(i)-1} M_{sc}^{UCI}(i,l) - Q'_{ACK}(i).$$

In case of CSI part 2 in slot i, the number of modulation symbols of CSI part 2 needs to be less than $$\sum_{l=0}^{N_{symb,all}^{PUSCH}(i)-1} M_{sc}^{UCI}(i,l) - Q'_{ACK}(i) - Q'_{CSI-1}(i).$$

A second condition: (a condition of a usable RE of a PUSCH in a predetermined slot set, including an α value) a condition that the number of REs usable for a UCI among the REs of a PUSCH in the predetermined slot set be as much as a of the number of REs in the predetermined slot set. For example, in case of a HARQ-ACK in slot i, the number of modulation symbols of the HARQ-ACK needs to be less than $$\left[\alpha \sum_{k=i_0}^{K'-1} \sum_{l=0}^{N_{symb,all}^{PUSCH}(k)-1} M_{sc}^{UCI}(k,l)\right] -$$

\#\_of\_UCI\_REs\_in\_the\_earlier\_slots.

Here, \#\_of\_UCI\_REs\_in\_the\_earlier\_slots is the number of REs used for a UCI till a previous slot (slots $i_0$, $i_0+1$, ..., $i-1$). K' is the number of slots of a predetermined slot set including an $i^{th}$ slot, that is, the number of consecutive PUSCH slots in the time domain including a slot in which a collision with a PUCCH resource occurs. $i_0$ denotes the index of the earliest slot in the time domain in the predetermined slot set including the $i^{th}$ slot, that is, the index of the foremost slot among the consecutive PUSCH slots in the time domain including a slot in which a collision with a PUCCH resource occurs. In case of CSI part 1 in slot i, the number of modulation symbols of CSI part 1 needs to be less than $$\left[\alpha \sum_{k=i_0}^{K'-1} \sum_{l=0}^{N_{symb,all}^{PUSCH}(k)-1} M_{sc}^{UCI}(k,l)\right] -$$

\#\_of\_UCI\_REs\_in\_the\_earlier\_slots $- Q'_{ACK}(i)$.

When compared to the number of modulation symbols of the HARQ-ACK, the number of modulation symbols may have a value that is $Q'_{ACK}(i)$, which is the number of HARQ-ACK modulation symbols in slot i, smaller. In case of CSI part 2 in slot i, the number of modulation symbols of CSI part 2 needs to be less than $$\left[\alpha \sum_{k=i_0}^{K'-1} \sum_{l=0}^{N_{symb,all}^{PUSCH}(k)-1} M_{sc}^{UCI}(k,l)\right] =$$

\#\_of\_UCI\_REs\_in\_the\_earlier\_slots $- Q'_{ACK}(i) - Q'_{CSI-1}(i)$.

When compared to the number of modulation symbols of CSI part 1, the number of modulation symbols may have a value that is $Q'_{CSI-1}(i)$, which is the number of CSI part 1 modulation symbols in slot i, smaller.

The number (Y) of modulation symbols calculated sequentially according to the conditions is as follows.

Equation 23 below is the number of modulation symbols in slot index $i_0$.

$$Q'_{ACK}(i_0) \le Y_{ACK}(i_0) = \min\left\{ \begin{array}{l} \sum_{l=l_0(i_0)}^{N_{symb,all}^{PUSCH}(i_0)-1} M_{sc}^{UCI}(i_0, l), \\ \left[\alpha \sum_{k=i_0}^{K'-1} \sum_{l=0}^{N_{symb,all}^{PUSCH}(k)-1} M_{sc}^{UCI}(k, l)\right] \end{array} \right\},$$ [Equation 23]

$$Q'_{CSI-1}(i_0) \le Y_{CSI-1}(i_0) = \min\left\{ \begin{array}{l} \sum_{l=0}^{N_{symb,all}^{PUSCH}(i_0)-1} M_{sc}^{UCI}(i_0, l) - Q'_{ACK}(i_0), \\ \left[\alpha \sum_{k=i_0}^{K'-1} \sum_{l=0}^{N_{symb,all}^{PUSCH}(k)-1} M_{sc}^{UCI}(k, l)\right] - Q'_{ACK}(i_0) \end{array} \right\}, \text{ and}$$

$$Q'_{CSI-2}(i_0) \le Y_{CSI-2}(i_0) = \min\left\{ \begin{array}{l} \sum_{l=0}^{N_{symb,all}^{PUSCH}(i_0)-1} M_{sc}^{UCI}(i_0, l) - Q'_{ACK}(i_0) - Q'_{CSI-1}(i_0), \\ \left[\alpha \sum_{k=0}^{K'-1} \sum_{l=0}^{N_{symb,all}^{PUSCH}(k)-1} M_{sc}^{UCI}(k, l)\right] - Q'_{ACK}(i_0) - Q'_{CSI-1}(i_0) \end{array} \right\}$$

Equation 24 below is the number of modulation symbols in slot index $i_0+1$.

[Equation 24]

$$Q'_{ACK}(i_0 + 1) \le Y_{ACK}(i_0 + 1) =$$
$$\min\left\{ \begin{array}{l} \sum_{l=l_0(i_0+1)}^{N_{symb,all}^{PUSCH}(i_0+1)-1} M_{sc}^{UCI}(i_0 + 1, l), \\ \left[\alpha \sum_{k=i_0}^{K'-1} \sum_{l=0}^{N_{symb,all}^{PUSCH}(k)-1} M_{sc}^{UCI}(k, l)\right] - Q'_{tot}(i_0) \end{array} \right\},$$

$$Q'_{CSI-1}(i_0 + 1) \le Y_{CSI-1}(i_0 + 1) =$$
$$\min\left\{ \begin{array}{l} \sum_{l=0}^{N_{symb,all}^{PUSCH}(i_0+1)-1} M_{sc}^{UCI}(i_0 + 1, l) - Q'_{ACK}(i_0 + 1), \\ \left[\alpha \sum_{k=i_0}^{K'-1} \sum_{l=0}^{N_{symb,all}^{PUSCH}(k)-1} M_{sc}^{UCI}(k, l)\right] - Q'_{tot}(i_0) - Q'_{ACK}(i_0 + 1) \end{array} \right\}, \text{ and}$$

$$Q'_{CSI-2}(i_0 + 1) \le Y_{CSI-2}(i_0 + 1) =$$
$$\min\left\{ \begin{array}{l} \sum_{l=0}^{N_{symb,all}^{PUSCH}(i_0+1)-1} M_{sc}^{UCI}(i_0 + 1, l) - Q'_{ACK}(i_0 + 1) - Q'_{CSI-1}(i_0 + 1), \\ \left[\alpha \sum_{k=0}^{K'-1} \sum_{l=0}^{N_{symb,all}^{PUSCH}(k)-1} M_{sc}^{UCI}(k, l)\right] - Q'_{tot}(i_0) - Q'_{ACK}(i_0 + 1) - Q'_{CSI-1}(i_0 + 1) \end{array} \right\}$$

Equation 25 below is the number of modulation symbols in slot index i.

[Equation 25]

$$Q'_{ACK}(i) \le Y_{ACK}(i) =$$
$$\min\left\{ \begin{array}{l} \sum_{l=l_0(i)}^{N_{symb,all}^{PUSCH}(i)-1} M_{sc}^{UCI}(i, l), \\ \left[\alpha \sum_{k=i_0}^{K'-1} \sum_{l=0}^{N_{symb,all}^{PUSCH}(k)-1} M_{sc}^{UCI}(k, l)\right] - \sum_{j=i_0}^{i-1} Q'_{tot}(j) \end{array} \right\}$$

$$Q'_{CSI-1}(i) \le Y_{CSI-1}(i) =$$
$$\min\left\{ \begin{array}{l} \sum_{l=0}^{N_{symb,all}^{PUSCH}(i)-1} M_{sc}^{UCI}(i, l) - Q'_{ACK}(i), \\ \left[\alpha \sum_{k=i_0}^{K'-1} \sum_{l=0}^{N_{symb,all}^{PUSCH}(k)-1} M_{sc}^{UCI}(k, l)\right] - \sum_{j=i_0}^{i-1} Q'_{tot}(j) - Q'_{ACK}(i) \end{array} \right\}, \text{ and}$$

$$Q'_{CSI-2}(i) \le Y_{CSI-2}(i) =$$
$$\min\left\{ \begin{array}{l} \sum_{l=0}^{N_{symb,all}^{PUSCH}(i)-1} M_{sc}^{UCI}(i, l) - Q'_{ACK}(i) - Q'_{CSI-1}(i), \\ \left[\alpha \sum_{k=i_0}^{K'-1} \sum_{l=0}^{N_{symb,all}^{PUSCH}(k)-1} M_{sc}^{UCI}(k, l)\right] - \sum_{j=i_0}^{i-1} Q'_{tot}(j) - Q'_{ACK}(i) - Q'_{CSI-1}(i) \end{array} \right\}.$$

Here, $Q'_{tot}(i) = Q'_{ACK}(i) + C'_{CSI-1}(i) + Q'_{CSI-2}(i)$.

According to the third embodiment, the UE determines the number of modulation symbols to be used for a UCI in chronological order. However, in this instance, CSI part 1 or CSI part 2 in a slot that comes earlier may be preferably assigned with the number of modulation symbols than a HARQ-ACK in a slot that comes later. Accordingly, REs that needs to be allocated to a HARQ-ACK that is relatively more important may happen to be insufficient. A method to solve the drawback is disclosed.

Fourth Embodiment: Calculates the Number of Modulation Symbols Based on the Type of UCI According to the fourth embodiment, the number of modulation symbols of each parameter of a UCI to be multiplexed with a PUSCH may be calculated according to the type of UCI.

Specifically, in case that a TB is transmitted via a plurality of slots and a TBS exceeds a single slot, and a symbol in which a part of the TB and a symbol in which a UCI of a PUCCH overlap in each slot, the UCI of the PUCCH and a PUSCH may be multiplexed and transmitted. In this instance, the number of modulation symbols of each parameter of the UCI may be determined based on the type of UCI. Here, the number of modulation symbols used for transmitting a HARQ-ACK is calculated earlier than the number of modulation symbols used for transmitting CSI part 1 or CSI part 2. The number of modulation symbols used for transmitting CSI part 1 is calculated earlier than the number of modulation symbols used for transmitting CSI part 2. For a single UCI type, the number of modulation symbols for transmitting a UCI may be determined in ascending order (i.e., in chronological order) of slot indices.

More specifically, in case that there are N PUCCHs that collide with a PUSCH, $Q'_{ACK}$ of each PUCCH is $Q'_{ACK}(1)$, $Q'_{ACK}(2), \ldots, Q'_{ACK}(N)$, $Q'_{CSI-1}$ is $Q'_{CSI-1}(1)$, $Q'_{CSI-1}(2), \ldots, Q'_{CSI-1}(N)$, and $Q'_{CSI-2}$ is $Q'_{CSI-2}(1)$, $Q'_{CSI-2}(2), \ldots, Q'_{CSI-2}(N)$. Here, the indices are arranged in chronological order. A method in which a UE determines the maximum number (Y) of modulation symbols to be used for a UCI among PUSCH resources is provided below. For reference, $Y_{ACK}(i)$ denotes the maximum number of modulation symbols to be used for a HARQ-ACK among PUSCH resources in slot i, $Y_{CSI-1}(i)$ denotes the maximum number of modulation symbols to be used for CSI part 1 among the PUSCH resources in slot i, and $Y_{CSI-2}(i)$ denotes the maximum number of modulation symbols to be used for CSI part 2 among PUSCH resources in slot i.

Depending on the type of UCI, the maximum number of modulation symbols to be used for a HARQ-ACK, CSI part 1, and CSI part 2 may be determined. In this instance, the maximum number of modulation symbols may need to satisfy the following two conditions.

A first condition: (a condition of a usable RE of a PUSCH in each slot) a condition that the maximum number be less than the number of REs usable for a UCI among the REs of a PUSCH in each slot. For example, in case of a HARQ-ACK in slot i the number of modulation symbols of the HARQ-ACK needs to be less than $$\sum_{l=l_0(i)}^{N_{symb,all}^{PUSCH}(i)-1} M_{SC}^{UCI}(i, l).$$

In case of CSI part 1 in slot i, the number of modulation symbols of CSI part 2 needs to be less than $$\sum_{l=0}^{N_{symb,all}^{PUSCH}(i)-1} M_{SC}^{UCI}(i, l) - Q'_{ACK}(i).$$

In case of CSI part 2 in slot i, the number of modulation symbols of CSI part 2 needs to be less than $$\sum_{l=0}^{N_{symb,all}^{PUSCH}(i)-1} M_{SC}^{UCI}(i, l) - Q'_{ACK}(i) - Q'_{CSI-1}(i).$$

A second condition: (a condition of a usable RE of a PUSCH in all slots, including an α value) a condition that the number of REs useable for a UCI be as much as α of the number of REs of a PUSCH in all slots. For example, in case of a HARQ-ACK in slot i, the number of modulation symbols of the HARQ-ACK needs to be less than $$\left[ \alpha \sum_{k=0}^{K} \sum_{l=0}^{N_{symb,all}^{PUSCH}(k)-1} M_{SC}^{UCI}(k, l) \right] -$$

$\sharp\_of\_HARQ\_ACK\_REs\_in\_the\_earlier\_slots.$

Here, #_of_HARQ_ACK_REs_in_the_earlier_slots is the number of modulation symbols used for a HARQ-ACK till a previous slot (slots 1, 2, . . . , i−1). In case of CSI part 1 in slot i, the number of modulation symbols of CSI part 1 needs to be less than $$\left[ \alpha \sum_{k=0}^{K-1} \sum_{l=0}^{N_{symb,all}^{PUSCH}(k)-1} M_{SC}^{UCI}(k, l) \right] -$$

$\sharp\_of\_HARQ\_ACK\_REs\_in\_the\_slots -$ $\sharp\_of\_CSI\_part1\_REs\_in\_the\_earlier\_slots.$ Here, #_of_HARQ_ACK_REs_in_the_slots is the number of modulation symbols for HARQ-ACK transmission in all slots, and #_of_CSI_part1_REs_in_the_earlier_slots is the number of modulation symbols used for CSI part 1 till a previous slot (slots 1, 2, . . . , i−1). In case of CSI part 2 in slot i, the number of modulation symbols of CSI part 2 needs to be less than $$\left[ \alpha \sum_{k=0}^{K-1} \sum_{l=0}^{N_{symball}^{PUSCH}(k)-1} M_{SC}^{UCI}(k, l) \right] -$$

$\sharp\_of\_HARQ\_ACK\_REs\_in\_the\_slots -$ $\#\_of\_CSI\_part1\_REs\_in\_the\_slots - \#\_of\_CSI\_part2\_REs\_in\_the\_slots.$ Here, #_of_CSI_part1_REs_in_the_slots is the number of modulation symbols for CSI part 2 transmission in all slots, and #_of_CSI_part2_REs_in_the_earlier_slots is the number of modulation symbols used for CSI part 2 till a previous slot (slots 1, 2, . . . , i−1).

The number (Y) of modulation symbols of each parameter of a UCI calculated sequentially according to the conditions is as follows.

Equation 26 below shows the number of modulation symbols of a HARQ-ACK based on a UCI index.

$$Q'_{ACK}(1) \le Y_{ACK}(1) = \min\left\{ \sum_{l=l_0(1)}^{N_{symb,all}^{PUSCH}(1)-1} M_{SC}^{UCI}(1, l), \right. \quad \text{[Equation 26]}$$

$$\left. \left[ \alpha \sum_{k=0}^{K-1} \sum_{l=0}^{N_{symb,all}^{PUSCH}(k)-1} M_{SC}^{UCI}(k, l) \right] \right\},$$

$$Q'_{ACK}(2) \le Y_{ACK}(2) + \min\left\{ \sum_{l=l_0}^{N_{symb,all}^{PUSCH}(2)-1} M_{SC}^{UCI}(2, l), \right.$$

$$\left. \left[ \alpha \sum_{k=0}^{K-1} \sum_{l=0}^{N_{symb,all}^{PUSCH}(k)-1} M_{SC}^{UCI}(k, l) \right] - Q'_{ACK}(1) \right\},$$

-continued
$$Q'_{ACK}(i) \le Y_{ACK}(i) = \min\left\{\sum_{l=l_0(i)}^{N^{PUSCH}_{symb,all}(i)-1} M^{UCI}_{SC}(i, l),\right.$$
$$\left.\left[\alpha \sum_{k=0}^{K-1} \sum_{l=0}^{N^{PUSCH}_{symb,all}(k)-1} M^{UCI}_{SC}(k, l)\right] - \sum_{j=1}^{i-1} Q'_{ACK}(j)\right\}$$

Equation 27 below shows the number of modulation symbols of CSI part 1 based on a UCI index.

[Equation 27]

$$Q'_{CSI-1}(1) \le Y_{CSI-1}(1) =$$
$$\min\left\{\begin{array}{l}\sum_{l=0}^{N^{PUSCH}_{symb,all}(1)-1} M^{UCI}_{SC}(1, l) - Q'_{ACK}(1), \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot}\end{array}\right\}, \text{ and}$$

$$Q'_{CSI-1}(2) \le Y_{CSI-1}(2) =$$
$$\min\left\{\begin{array}{l}\sum_{l=0}^{N^{PUSCH}_{symb,all}(2)-1} M^{UCI}_{SC}(2, l) - Q'_{ACK}(2), \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot} - Q'_{CSI-1}(1)\end{array}\right\}$$

$$Q'_{CSI-1}(i) \le Y_{CSI-1}(i) =$$
$$\min\left\{\begin{array}{l}\sum_{l=0}^{N^{PUSCH}_{symb,all}(i)-1} M^{UCI}_{SC}(i, l) - Q'_{ACK}(i), \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot} - \sum_{j=1}^{i-1} Q'_{CSI-1}(j)\end{array}\right\}$$

Equation 28 below shows the number of modulation symbols of CSI part 2 based on a UCI index.

[Equation 28]

$$Q'_{CSI-2}(1) \le Y_{CSI-2}(1) =$$
$$\min\left\{\begin{array}{l}\sum_{l=0}^{N^{PUSCH}_{symb,all}(1)-1} M^{UCI}_{SC}(1, l) - Q'_{ACK}(1) - Q'_{CSI-1}, \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot} - Q'_{CSI-1-tot}\end{array}\right\}, \text{ and}$$

$$Q'_{CSI-2}(2) \le Y_{CSI-2}(2) =$$
$$\min\left\{\begin{array}{l}\sum_{l=0}^{N^{PUSCH}_{symb,all}(2)-1} M^{UCI}_{SC}(2, l) - Q'_{ACK}(2) - Q'_{CSI-1}(2), \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot} - Q'_{CSI-1-tot} - Q'_{CSI-2}(1)\end{array}\right\}$$

$$Q'_{CSI-2}(i) \le Y_{CSI-2}(i) =$$
$$\min\left\{\begin{array}{l}\sum_{l=0}^{N^{PUSCH}_{symb,all}(i)-1} M^{UCI}_{SC}(i, l) - Q'_{ACK}(i) - Q'_{CSI-1}(i), \\ \left[\alpha \sum_{k=0}^{K-1} \sum_{l=0}^{N^{PUSCH}_{symb,all}(k)-1} M^{UCI}_{SC}(k, l)\right] - Q'_{ACK-tot} - Q'_{CSI-1-tot} - Q'_{CSI-2}(j)\end{array}\right\}$$

Equations 26 to 28, $Q'_{ACK-tot}=Q'_{ACK}(1)+Q'_{ACK}(2)+ \ldots Q'_{ACK}(N)$ and $Q'_{CSI-1-tot}=Q'_{CSI-1}(1)+Q'_{CSI-1}(2)+ \ldots +Q'_{CSI-1}(N)$.

According to a (4-1)$^{th}$ embodiment, depending on the type of UCI, a UE may determine the number of modulation symbols used for transmitting a UCI.

For a single UCI type, the number of modulation symbols for transmitting a UCI may be determined in ascending order (i.e., in chronological order) of indices of slots in a predetermined slot set. Here, the predetermined slot set may include a slot including a PUSCH that collides with a PUCCH and consecutive slots of the corresponding slot in the time domain. In addition, the consecutive slots in the time domain may include slots in which PUSCH transmission is valid. Depending on the type of UCI, the UE may determine the maximum number of modulation symbols to be used for a HARQ-ACK, CSI part 1, and CSI part 2. In this instance, the maximum number of modulation symbols may need to satisfy the following two conditions.

A first condition: (a condition of a usable RE of a PUSCH in each slot) a condition that the maximum number be less than the number of REs usable for a UCI among the REs of a PUSCH in each slot. For example, in case of a HARQ-ACK in slot i, the number of modulation symbols of the HARQ-ACK needs to be less than $$\sum_{l=l_0}^{N^{PUSCH}_{symb,all}(i)-1} M^{UCI}_{SC}(i, l).$$

In case of CSI part 1 in slot i, the number of modulation symbols of CSI part 1 needs to be less than $$\sum_{l=l_0}^{N^{PUSCH}_{symb,all}(i)-1} M^{UCI}_{SC}(i, l) - Q'_{ACK}(i).$$

In case of CSI part 2 in slot i, the number of modulation symbols of CSI part 2 needs to be less than $$\sum_{l=0}^{N^{PUSCH}_{symb,all}(i)-1} M^{UCI}_{SC}(i, l) - Q'_{ACK}(i) - Q'_{CSI-1}(i).$$

A second condition: (a condition of a usable RE of a PUSCH in a predetermined slot set, including a value a) a condition that the number of REs usable for a UCI among the REs of a PUSCH in the predetermined slot set be as much as a of the number of REs in the predetermined slot set. For example, in case of a HARQ-ACK in slot i, the number of modulation symbols of the HARQ-ACK needs to be less than $$\left[\alpha \sum_{k=i_0}^{K'-1} \sum_{l=0}^{N^{PUSCH}_{symb,all}(k)-1} M^{UCI}_{SC}(k, l)\right] -$$

\#\_of\_HARQ\_ACK\_REs\_in\_the\_earlier\_slots.

Here #_of_HARQ_ACK_REs_in_the_earlier_slots is the number of modulation symbols used for the HARQ-ACK till a previous slot (slots $i_0, i_0+1, \ldots, i-1$). K' is the number of slots of a predetermined slot set including an $i^{th}$ slot, that is, the number of consecutive PUSCH slots in the time domain including a slot in which a collision with a PUCCH resource occurs. $i_0$ denotes the index of the earliest slot in the time domain in the predetermined slot set including the $i^{th}$ slot, that is, the index of the foremost slot among the consecutive PUSCH slots in the time domain including a slot in which a collision with a PUCCH resource occurs. In case of CSI part 1 in slot i, the number of modulation symbols of CSI part 1 needs to be less than $$\left[\alpha \sum_{k=i_0}^{K'-1} \sum_{l=0}^{N_{symb,all}^{PUSCH}(k)-1} M_{sc}^{UCI}(k, l)\right] -$$
$$\#\_of\_HARQ\_ACK\_REs\_in\_the\_slots -$$
$$\#\_of\_CSI\_part1\_REs\_in\_the\_earlier\_slots.$$

Here, #_of_HARQ_ACK_REs_in_the_slots is the number of modulation symbols for HARQ-ACK transmission in all slots in the predetermined slot set, and #_of_CSI_part1_REs_in_the_earlier_slots is the number of modulation symbols used for CSI part 1 till a previous slot (slots $i_0, i_0+1, \ldots, i-1$). In case of CSI part 2 in slot i, the number of modulation symbols of CSI part 2 needs to be less than $$\left[\alpha \sum_{k=i_0}^{K'-1} \sum_{l=0}^{N_{symb,all}^{PUSCH}(k)-1} M_{sc}^{UCI}(k, l)\right] -$$
$$\#\_of\_HARQ\_ACK\_REs\_in\_the\_slots -$$
$$\#\_of\_CSI\_part1\_REs\_in\_the\_earlier\_slots -$$
$$\#\_of\_CSI\_part2\_REs\_in\_the\_earlier\_slots.$$

Here, #_of_CSI_part1_RFs_in_the_slots is the number of modulation symbols for CSI part 2 transmission in all slots in the predetermined slot set, and #_of_part2_REs_in_the_earlier_slots is the number of modulation symbols used for CSI part 2 till a previous slot (slots $i_0, i_0+1, \ldots, i-1$).

The number (Y) of modulation symbols of each parameter of a UCI calculated sequentially according to the conditions is as follows.

Equation 29 below shows the number of modulation symbols of a HARQ-ACK based on a UCI index.

[Equation 29]

$$Q'_{ACK}(i_0) \leq Y_{ACK}(i_0) =$$
$$\min\left\{\begin{array}{l}\sum_{l=l_0(i_0)}^{N_{symb,all}^{PUSCH}(i_0)-1} M_{SC}^{UCI}(i_0, l), \\ \left[\alpha \sum_{k=i_0}^{K'-1} \sum_{l=0}^{N_{symb,all}^{PUSCH}(k)-1} M_{SC}^{UCI}(k, l)\right]\end{array}\right\},$$

$$Q'_{ACK}(i_0 + 1) \leq Y_{ACK}(i_0 + 1) =$$
$$\min\left\{\begin{array}{l}\sum_{l=l_0(i_0+1)}^{N_{symb,all}^{PUSCH}(i_0+1)-1} M_{SC}^{UCI}(i_0 + 1, l), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK}(i_0)\end{array}\right\},$$

$$Q'_{ACK}(i) \leq Y_{ACK}(i) =$$
$$\min\left\{\begin{array}{l}\sum_{l=l_0(i)}^{N_{symb,all}^{PUSCH}(i)-1} M_{SC}^{UCI}(i, l), \\ \left[\alpha \sum_{k=i_0}^{K'-1} \sum_{l=0}^{N_{symb,all}^{PUSCH}(k)-1} M_{SC}^{UCI}(k, l)\right] - \sum_{j=i_0}^{i-1} Q'_{ACK}(j)\end{array}\right\}$$

Equation 30 below shows the number of modulation symbols of CSI part 1 based on a UCI index.

[Equation 30]

$$Q'_{CSI-1}(i_0) \leq Y_{CSI-1}(i_0) =$$
$$\min\left\{\begin{array}{l}\sum_{l=l_0(i_0)}^{N_{symb,all}^{PUSCH}(i_0)-1} M_{SC}^{UCI}(i_0, l) - Q'_{ACK}(i_0), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK-tot}\end{array}\right\}, \text{ and}$$

$$Q'_{CSI-1}(i_0 + 1) \leq Y_{CSI-1}(i_0 + 1) =$$
$$\min\left\{\begin{array}{l}\sum_{l=0}^{N_{symb,all}^{PUSCH}(i_0+1)-1} M_{SC}^{UCI}(i_0 + 1, l) - Q'_{ACK}(i_0 + 1), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK-tot} - Q'_{CSI-1}(i_0)\end{array}\right\}$$

$$Q'_{CSI-1}(i) \leq Y_{CSI-1}(i) =$$
$$\min\left\{\begin{array}{l}\sum_{l=0}^{N_{symb,all}^{PUSCH}(i)-1} M_{SC}^{UCI}(i, l) - Q'_{ACK}(i), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK-tot} - \sum_{j=i_0}^{i-1} Q'_{CSI-1}(j)\end{array}\right\}$$

Equation 31 below shows the number of modulation symbols of CSI part 2 based on a UCI index.

[Equation 31]

$$Q'_{CSI-2}(i_0) \leq Y_{CSI-2}(i_0) =$$
$$\min\left\{\begin{array}{l}\sum_{l=0}^{N_{symb,all}^{PUSCH}(i_0)-1} M_{SC}^{UCI}(i_0, l) - Q'_{ACK}(i_0) - Q'_{CSI-1}(i_0), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK-tot} - Q'_{CSI-1-tot}\end{array}\right\}, \text{ and}$$

$$Q'_{CSI-2}(i_0 + 1) \leq Y_{CSI-2}(i_0 + 1) =$$
$$\min\left\{\begin{array}{l}\sum_{l=0}^{N_{symb,all}^{PUSCH}(i_0)-1} M_{SC}^{UCI}(i_0 + 1, l) - Q'_{ACK}(i_0 + 1) - Q'_{CSI-1}(i_0 + 1), \\ \left[\alpha \sum_{k=i_0}^{K'-1} \sum_{l=0}^{N_{symb,all}^{PUSCH}(k)-1} M_{SC}^{UCI}(k, l)\right] - Q'_{ACK-tot} - Q'_{CSI-1-tot} - Q'_{CSI-2}(i_0)\end{array}\right\}$$

-continued $$Q'_{CSI-2}(i) \leq Y_{CSI-2}(i) =$$

$$\min\left\{\begin{array}{c}\sum_{l=0}^{N_{symb,all}^{PUSCH}(i)-1} M_{SC}^{UCI}(i,l) - Q'_{ACK}(i) - Q'_{CSI-1}(i), \\ \left[\alpha \sum_{k=i_0}^{K'-1} \sum_{l=0}^{N_{symb,all}^{PUSCH}(k)-1} M_{SC}^{UCI}(k,l)\right] - Q'_{ACK-tot} - Q'_{CSI-1-tot} - \sum_{j=i_0}^{i-1} Q'_{CSI-2}(j)\end{array}\right\}$$

In Equations 29 to 31, $Q'_{ACK-tot}=Q'_{ACK}(1)+Q'_{ACK}(2)+\ldots+Q'_{ACK}(N)$ and $Q'_{CSI-1-tot}=Q'_{CSI-1}(1)+Q'_{CSI-1}(2)+\ldots+Q'_{CSI-1}(N)$.

Figure 24:
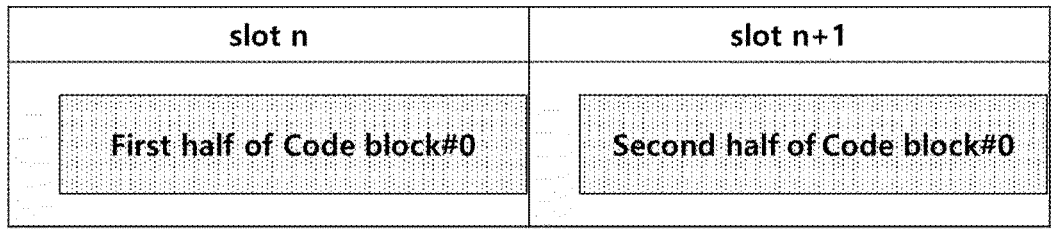
FIG. 24 is a diagram illustrating an example of a method of determining transmission power of a PUSCH of which a TBS is determined based on a plurality of slots or a plurality of nominal PUSCHs.

FIG. 24 is a diagram illustrating an example of a method of determining transmission power of a PUSCH of which a TBS is determined based on a plurality of slots or a plurality of nominal PUSCHs.

Referring to FIG. 24, in case that a TBS is greater than a single slot, a UE may determine, based on a scaled TBS, transmission power of a PUSCH in each slot in which a TB is transmitted.

First, according to 7.1.1 of TS38.213, the transmit power of a PUSCH may be determined as follows.

In case that the UE transmits a PUSCH in an active UL BWP 'b' of a carrier 'f' of a serving cell 'c' by using a parameter set configuration having an index of 'j' and a PUSCH power control adjustment state having an index of 'l', the UE may calculate PUSCH transmission power $P_{PUSCH,b,f,c}(i,j,q_d,l)$ in a PUSCH transmission occasion 'i' according to Equation 32 provided below.

$$P_{PUSCHb,f,c}(i,j,q_d,l) = \min\left\{\begin{array}{l}P_{CMAX,f,x}(i), \\ P_{O\_PUSCHb,f,c(j)} + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\end{array}\right\}$$

[dBm]

Here, a problem that the disclosure desires to overcome is about a method of determining $\Delta_{TF,b,f,c}(i)$. $\Delta_{TF,b,f,c}(i)$ may be calculated according to Equation 33 below.

$$\Delta_{TF,b,f,c}(i) = 10 \log_{10}((2^{BPRE \cdot K_s} - 1) \cdot \beta_{offset}^{PUSCH}) \quad \text{[Equation 33]}$$

In Equation 33, i is a transmission occasion index of a PUSCH and may be determined according to 7 of TS38.213, as shown below.

A PUSCH/PUCCH/SRS/PRACH transmission point 'i' may be defined by a slot index $n_{s,f}^\mu$ in a frame having a system frame number of SFN, a first symbol 'S' in a slot, and the number 'L' of consecutive symbols. In case of PUSCH transmission having repetition type B, an PUSCH transmission occasion is a nominal repetition.

That is, in case of repetitive PUSCH transmission type A, a transmission occasion is a slot. In case of repetitive PUSCH transmission type B, a transmission occasion is a nominal repetition.

For reference, in the disclosure, a transmission occasion may be the same as a symbol set that has been described above. That is, a symbol set of repetitive PUSCH transmission type A is a PUSCH transmitted in a single slot, and a symbol set of repetitive PUSCH transmission type B is a PUSCH transmitted via a single nominal repetition.

In Equation 33, Ks may be configured as one of 1.25 or 0. In case that a PUSCH includes a UL-SCH, $\beta_{offset}^{PUSCH}=1$. A BPRE may be calculated according to Equation 34 below.

$$BPRE = \sum_{r=0}^{C-1} K_r / N_{RE} \quad \text{[Equation 34]}$$

In Equation 34, C denotes the number of code blocks that a PUSCH transmits, and Kr denotes the size (the number of bits) of code block r. $N_{RE}$ is the number of REs that a PUSCH occupies and may be obtained according to Equation 35 below.

$$N_{RE} = M_{RB,b,f,c}^{PUSCH}(i) \sum_{j=0}^{N_{symb,v,f,c}^{PUSCH}(i)-1} N_{sc,data}^{RB}(i,j) \quad \text{[Equation 35]}$$

$N_{symb,b,f,c}^{PUSCH}(i)$ in Equation 35 is the number of symbols occupied by a PUSCH corresponding to an $i^{th}$ transmission occasion of active UL BWP b of carrier f of cell c. $N_{sc,data}^{RB}(i,j)$ denotes the number of subcarriers excluding a DMRS or a phase tracking reference signal (PTRS) in symbol j. $M_{RB,b,f,c}^{PUSCH}(i)$ is the number of PRBs occupied by a PUSCH corresponding to an $i^{th}$ transmission occasion of active UL BWP b of carrier f of cell c.

In Equation 34, a BPRE and $N_{RE}$ are determined based on an $i^{th}$ transmission occasion, but $$\sum_{r=0}^{C-1} K_r$$

is determined based on a single TB. Here, a TBS may be determined based on a plurality of transmission occasions (or a plurality of symbol sets). In this instance, in case that the same code block is transmitted in a plurality of transmission occasions, a problem may occur in calculation of a BPRE. That is, in a predetermined transmission occasion, although a part of the code block is included, a BPRE may be calculated based on the whole code block size $$\sum_{r=0}^{C-1} K_r$$

according to the above equation.

In this instance, a BPRE and an $N_{RE}$ for calculating transmission power $P_{PUSCH,b,f,c}(i,j,q_d,l)$ may be determined based on an $i^{th}$ transmission occasion, and $$\sum_{r=0}^{C-1} K_r$$

is determined based on a single TB. Here, a TBS may be determined based on a plurality of transmission occasions (or a plurality of symbol sets). In this instance, in case that the same code block is transmitted in a plurality of transmission occasions, a problem may occur in calculation of a BPRE.

That is, in a predetermined transmission occasion, although a part of the code block is included, a BPRE may be calculated based on the whole code block size $$\sum_{r=0}^{C-1} K_r$$

according to the above equation.

For example, as illustrated in FIG. 24, the UE may receive an indication indicating PUSCH transmission of which a TBS is determined based on single code block #0 with respect to two slots, that is, slot n and slot n+1, according to repetitive transmission type A. Here, a first symbol set to which PUSCH transmission is allocated in slot n is a first transmission occasion, and a second symbol set to which PUSCH transmission is allocated in slot n+1 is a second transmission occasion. In this instance, transmission power or a BPRE may be determined for each transmission occasion.

However, as illustrated in FIG. 24, although a half of code block #0 is included in each of a first transmission occasion (a first symbol set) and a second transmission occasion (a second symbol set), an actually calculated BPRE may be determined based on the whole size of the code block #0. That is, the whole code block size ($K_0$, since only code block #0 is transmitted in FIG. 24) may be applied to each transmission occasion such as $BPRE=K_0/N_{RE}$ in a first transmission occasion (a first symbol set) and $BPRE=K_0/N_{RE}$ in a second transmission occasion (a second symbol set). $K_0$ is the size of a code block for two transmission occasions, and thus the equation may be difficult to determine transmission power based on an accurate code block size. Therefore, in case that a single code block is transmitted via a plurality of transmission occasions, there is a desire for a method of calculating a BPRE of each transmission power.

First Embodiment: Calculates a BPRE of Transmission Power by Scaling a TBS to a TBS of Each Transmission Occasion According to the first embodiment, a BPRE of each transmission occasion may be obtained by scaling a code block size to a code block size of each transmission occasion. A UE may calculate BPRE(i) in a transmission occasion i by scaling $\sum_{r=0}^{C-1} K_r/N_{RE}$ or $\sum_{r=0}^{C-1} K_r$.

That is, $BPRE(i)=P(i) \cdot \sum_{r=0}^{C-1} K_r/N_{RE}(i)$. Here, $N_{RE}(i)$ is the number of PUSCH REs excluding a PTRS and a DMRS of transmission occasion i, and P(i) is a scaling value for transmission occasion i. That is, in case that a TB is transmitted via a plurality of slots and a TBS is greater than a single slot, a part of the TB may be transmitted in a single slot. In this instance, transmission power for PUSCH transmission in a single slot needs to be determined for each slot, and thus transmission power for PUSCH transmission may be determined based on a slot unit. In this instance, since the TBS is greater than a single slot, and thus the value of the TBS needs to be scaled based on a single slot in order to determine transmission power of a PUSCH. Therefore, in case that the size of a TBS is greater than or equal to a single slot, the TBS may be adjusted via scaling that increases or decreases the TBS on the assumption that a single TB is transmitted in a single slot, and PUSCH transmission power for each slot may be determined based on the adjusted TBS.

In this instance, a scaling value P(i) for scaling may be determined via the following methods.

Firstly, P(i)=1. That is, although a PUSCH in a single slot includes a part of a TB, it is regarded as if the whole TB would be transmitted in the corresponding slot. According to the first method, the size of a code block is regarded to have a size larger than the size of a code block that is actually transmitted in a single transmission occasion, and thus a BPRE may be determined as a larger value. Therefore, greater transmission power may be determined for transmission occasion i.

Secondly, P(i) may be determined based on the number of transmission occasions in which a single TB is transmitted. Specifically, in case that the same code block occupies M transmission occasions for PUSCH transmission, P(i)=1/M. That is, the size of code block corresponding to transmission occasion i may be obtained as $\sum_{r=0}^{C-1} K_r/M$, and thus $$BPRE(i) = \frac{\sum_{r=0}^{C-1} K_r}{M \cdot N_{RE}(i)}.$$

For example, as illustrated in FIG. 24, the UE may receive an indication indicating PUSCH transmission of which a TBS is determined based on single code block #0 with respect to two slots that is, slot n and slot n+1. Here, a first symbol set to which PUSCH transmission is allocated in slot n is a first transmission occasion, and a second symbol set to which PUSCH transmission is allocated in slot n+1 is a second transmission occasion. In this instance, a half of code block #0 may be included in each of the first transmission occasion (the first symbol set) and the second transmission occasion (the second symbol set). According to the second method, P(1)=P(2)=½, and thus the size of a code block of the first transmission occasion or the second transmission occasion may be obtained as $K_0/2$. Therefore, $$BPRE(1) = \frac{K_0}{2 \cdot N_{RE}(1)}, BPRE(2) = \frac{K_0}{2 \cdot N_{RE}(2)}.$$

Figure 25:
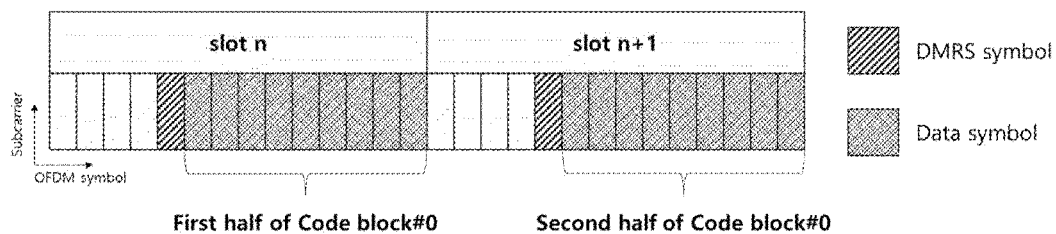
FIG. 25 is a diagram illustrating an example of a method of determining PUSCH transmission power according to an embodiment of the disclosure.

FIG. 25 is a diagram illustrating an example of a method of determining PUSCH transmission power according to an embodiment of the disclosure.

Referring to FIG. 25, thirdly, P(i) may be determined based on the number of symbols of a PUSCH, unlike the above-described first method and second method.

Specifically, $$P(i) = \frac{N_{symb,b,f,c}^{PUSCH,CB\#r}(i)}{N_{symb}^{PUSCH,CB\#r}}$$

may be obtained in transmission occasion i. Here, $N_{symb,b,f,c}^{PUSCH,CB\ \#r}(i)$ denotes the number of PUSCH symbols capable of transmitting an $r^{th}$ code block in an $i^{th}$ transmission occasion of active UL BWP b of carrier f of cell c, and $N_{symb}^{PUSCH,CB\ \#r}$ denotes the total number of PUSCH symbols capable of transmitting an $r^{th}$ code block. Therefore, $$BPRE(i) = \sum\nolimits_{r=0}^{C-1}\left(K_r * \frac{N_{symb,b,f,c}^{PUSCH,CB\#r}(i)}{N_{symb}^{PUSCH,CB\#r}}\right)\bigg/N_{RE}(i)$$

may be obtained.

For example, as illustrated in FIG. 25, the UE may receive an indication indicating PUSCH transmission of which a TBS is determined based on single code block #0 with respect to two slots that is, slot n and slot n+1. Here, a first symbol set to which PUSCH transmission is allocated in slot n is a first transmission occasion, and a second symbol set to which PUSCH transmission is allocated in slot n+1 is a second transmission occasion. In this instance, a half of code block #0 may be included in each of the first transmission occasion (the first symbol set) and the second transmission occasion (the second symbol set).

In this instance, according to the third method, $$P(1) = P(2) = \frac{9}{18} = \frac{1}{2},$$

and thus the size of a code block of the first transmission occasion or the second transmission occasion may be obtained as $K_0/2$. Therefore, $$BPRE(1) = \frac{K_0}{2 \cdot N_{RE}(1)}, BPRE(2) = \frac{K_0}{2 \cdot N_{RE}(2)}.$$

Figure 26:
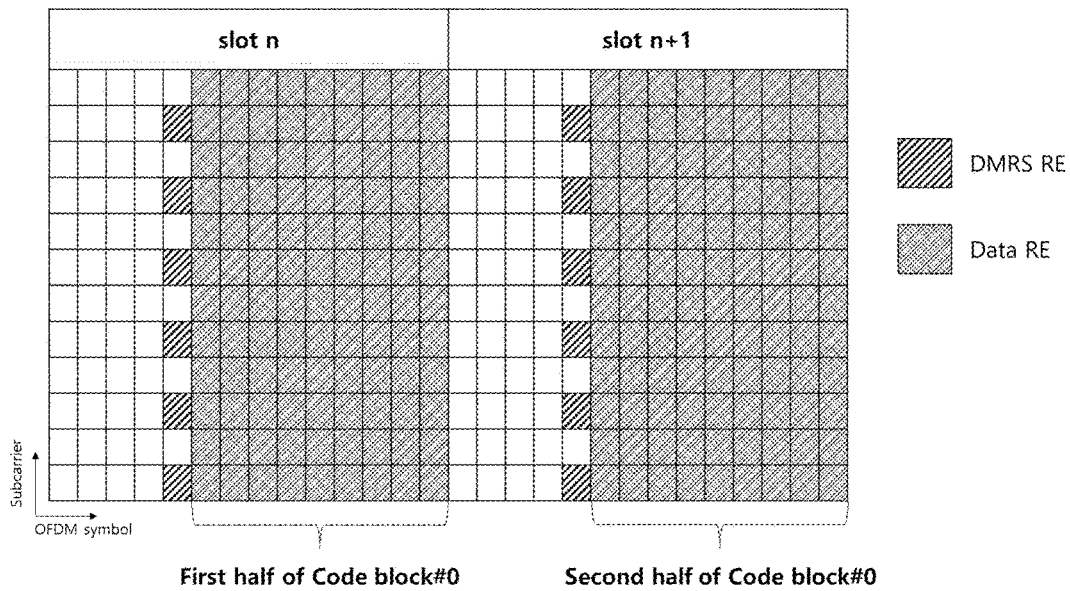
FIG. 26 is a diagram illustrating another example of a method of determining PUSCH transmission power according to an embodiment of the disclosure.

FIG. 26 is a diagram illustrating another example of a method of determining PUSCH transmission power according to an embodiment of the disclosure.

Referring to FIG. 26, fourthly, P(i) may be determined based on the number of PUSCH REs of a transmission occasion in which a single TB is transmitted, unlike the above-described first to third methods.

Specifically, it may be $$P(i) = \frac{N_{RE}^{CB\#r}(i)}{N_{RE}^{CB\#r}}$$

in transmission occasion i. Here, $N_{RE}^{CB\ \#r}(i)$ denotes the number of PUSCH REs capable of transmitting an $r^{th}$ code block in transmission occasion i, and RE denotes the total number of PUSCH REs capable of transmitting an $r^{th}$ code block. Therefore, $$BPRE(i) = \sum\nolimits_{r=0}^{C-1}\left(K_r \cdot \frac{N_{RE}^{CB\#r}(i)}{N_{RE}^{CB\#r}}\right)\bigg/N_{RE}(i)$$

may be obtained. For example, as illustrated in FIG. 26, the UE may receive an indication indicating PUSCH transmission of which a TBS is determined based on single code block #0 with respect to two slots that is, slot n and slot n+1.

Here, a first symbol set to which PUSCH transmission is allocated in slot n is a first transmission occasion, and a second symbol set to which PUSCH transmission is allocated in slot n+1 is a second transmission occasion. In this instance, a half of code block #0 may be included in each of the first transmission occasion (the first symbol set) and the second transmission occasion (the second symbol set).

According to the fourth method, $$P(1) = P(2) = \frac{108}{216} = \frac{1}{2},$$

and thus the size of a code block of the first transmission occasion or the second transmission occasion may be obtained as $K_0/2$. Therefore, $$BPRE(1) = \frac{K_0}{2 \cdot N_{RE}(1)}, BPRE(2) = \frac{K_0}{2 \cdot N_{RE}(2)}.$$

Fifthly, the scaling value may be a value configured or indicated by the base station.

Second Embodiment: Calculates a BPRE of Transmission Power Based on a Code Block Included in a Transmission Occasion According to the second embodiment, a BPRE of transmission occasion i may be determined based on a code block included in the transmission occasion. That is, in case that the index of a code block included in transmission occasion i is $\{r_j\}$ and the number of code blocks is $C_i$, it may be $BPRE(i) = \sum_{j=0}^{C_i-1} K_{r_j}/N_{RE}(i)$. Here, $N_{RE}(i)$ denotes the number of PUSCH REs excluding a PTRS and a DMRS in transmission occasion i. A code block included in transmission occasion i and the number of code blocks may be determined based on the following methods.

As a first method, in case that at least a part of a code block is included in transmission occasion i, it is determined that the corresponding code block is included in the transmission occasion.

As a second method, only in case that the whole of a single code block is included in transmission occasion i, it is determined that the corresponding code block is included in the corresponding transmission occasion.

According to a $(2-1)^{th}$ embodiment, a BPRE of transmission occasion i may be determined based on the number of PUSCH symbols and a code block included in the transmission occasion. That is, in case that the index of a code block included in transmission occasion i is $\{r_j\}$ and the number of code blocks is $C_i$, it may be obtained $$BPRE(i) = \sum\nolimits_{j=0}^{C_i-1} K_{r_j} * \frac{N_{symb,b,f,c}^{PUSCH,CB}(i)}{N_{symb}^{PUSCH,CB}}\bigg/N_{RE}(i).$$

Here, $N_{symb,b,f,c}^{PUSCH,CB}(i)$ denotes the number of PUSCH symbols capable of transmitting a code block in an $i^{th}$ transmission occasion of active UL BWP b of carrier f of cell c, and $N_{symb}^{PUSCH,CB}$ denotes the total number of PUSCH symbols capable of transmitting a code block.

According to a $(2\text{-}2)^{th}$ embodiment, a BPRE of transmission occasion i may be determined based on the number of PUSCH REs and a code block included in the transmission occasion. That is, in case that the index of a code block included in transmission occasion i is $\{r_j\}$ and the number of code blocks is $C_1$, it may be obtained $$BPRE(i) = \sum_{j=0}^{C_i-1} = K_{r_j} * \frac{N_{RE}^{CB}(i)}{N_{RE}^{CB}} \bigg/ N_{RE}(i).$$

Here, $N_{RE}^{CB}(i)$ denotes the number of PUSCH REs capable of transmitting a code block in transmission occasion i, and $N_{RE}^{CB}$ denotes the total number of PUSCH REs capable of transmitting a code block.

In the first embodiment and the second embodiment, a transmission occasion may be determined based on time domain resource assignment (TDRA) information associated with a time domain resource where a PUSCH is scheduled. For example, in case that repetitive PUSCH transmission type A is indicated, a transmission occasion is slots in which PUSCH transmission is indicated. In case that repetitive PUSCH transmission type B is indicated, a transmission occasion is determined based on slot or nominal repetitions in which PUSCH transmission is indicated.

Alternatively, a transmission occasion may be determined independently from TDRA information associated with a time domain resource in which a PUSCH is scheduled. For example, although repetitive PUSCH transmission type B is indicated, a transmission occasion may be determined based on slots in which PUSCH transmission is indicated.

In the first embodiment and the second embodiment, a single transmission occasion may be determined based on a plurality of slots or nominal repetitions.

<A Method of Determining a Redundancy Version for Repetitive Transmission of a PUSCH of a TB>

The UE may transmit a PUSCH using one of the methods configured for the UE by the base station, such as a dynamic grant (DG)-based scheduling method that schedules transmission of a PUSCH by control information (DCI) transferred via reception of a PDCCH, or a configured grant (CG)-based scheduling method that transmits a PUSCH according to a resource and a transmission method configured in advance by the base station.

That is, the UE may determine a TBS by using a resource scheduled for PUSCH transmission via dynamic grant or a plurality of symbol sets corresponding a resource configured via configured grant, and may transmit a PUSCH. In other words, the UE may determine, based on a plurality of symbol sets, a TBS for a PUSCH configured, by the base station, to use a DG or CG-based transmission scheme.

When determining a plurality of symbol sets for uplink transmission according to the DG or CG-based transmission scheme, the UE may perform determination based on a time domain resource in which uplink transmission is valid. Here, a time domain resource in which uplink transmission is valid may be a time domain resource including a flexible symbol or an uplink symbol configured according to a cell-specific UL/DL configuration or a UE-specific UL/DL configuration configured for the UE by the base station. For example, in case that a plurality of symbol sets for a PUSCH transmission resource is determined according to repetitive PUSCH transmission type A, given that repetitive PUSCH transmission type A is transmission repeated based on a slot unit, a symbol set may be a slot, and the UE may determine a time domain resource for PUSCH transmission based on a slot in which uplink transmission according to repetitive PUSCH transmission type A is valid.

The UE may receive, from the base station, an indication indicating repetitive transmission of a PUSCH, of which a TBS is determined based on a plurality of symbol sets for uplink coverage extension, in a plurality of time domain resources.

Hereinafter, for ease of description, it is assumed that the number of plurality of symbol sets (the number of slots or nominal repetitions) corresponding to one PUSCH transmission between a single PUSCH transmission, of which a TBS is determined based on a plurality of symbol sets, or one or more repetitive PUSCH transmissions is N, and the number of repetitive PUSCH transmissions of which a TBS is determined based on N symbol sets is M.

In case that a PUSCH according to a DG or type 2 CG-based transmission scheme is scheduled for the UE, the UE may receive DCI format 0_1 or 0_2 via a PDCCH that schedules a PUSCH, and may perform repetitive transmission of a PUSCH, of which a TBS is determined based on a plurality of symbol sets, in a plurality of time domain resources corresponding to M resources. Here, the plurality of time domain resources may correspond to the number of the plurality of symbol sets. For example, in case of repetitive PUSCH transmission type A, the plurality of symbol sets may be a plurality of slots. Accordingly, the plurality of time domain resources may correspond to the number of plurality of slots. For the UE, M may be configured by a higher layer or may be received by being included in a TDRA field of DCI. In M slots, the UE may perform repetitive transmission of a PUSCH of which a TBS is determined based on a plurality of symbol sets.

In case that PUSCH according to type 1 CG-based transmission scheme is scheduled for the UE, the UE may perform repetitive transmission of a PUSCH, of which a TBS is determined based on a plurality of symbol sets, in M time domain resources according to the resource and transmission method configured in advance. Here, the plurality of time domain resources may correspond to the number of the plurality of symbol sets. For the UE, M may be configured by a higher layer. In M slots, the UE may perform repetitive transmission of a PUSCH of which a TBS is determined based on a plurality of symbol sets.

In case that CG-based PUSCH transmission performed in a single slot is repeated in an NR system, the UE and the base station may define a point in time that is assumed to be the start of CG-based PUSCH transmission of the UE as follows. One of RV sequences {0, 2, 3, 1}, {0, 3, 0, 3}, or {0, 0, 0, 0} applied to CG-based repetitive PUSCH transmission is configured for the UE, and the UE may use an RV value corresponding to a $\{\mathrm{mod}(n-1, 4)+1\}^{th}$ value in an $n^{th}$ initial transmission occasion (TO). Here, n is an integer greater than 0. In this instance, the UE may determine an initial TO in which repetitive transmission may begin according to the configured RV sequence, as follows.

In case that the RV sequence is configured as {0, 2, 3, 1}, the UE may start repetitive transmission from a first TO corresponding to RV=0 as an initial TO, and the base station attempts to receive CG-based repetitive PUSCH transmission by assuming that repetitive transmission by the UE may begin.

In case that the RV sequence is configured as {0, 3, 0, 3}, the UE may start repetitive transmission from a TO corresponding to RV=0 as an initial TO, and the base station attempts to receive CG-based repetitive PUSCH transmission by assuming that repetitive transmission by the UE may begin.

In case that the RV sequence is configured as {0, 0, 0, 0}, the UE may start repetitive transmission by determining, as an initial TO, all TOs corresponding to RV=0 excluding the last TO, and the base station attempts to receive CG-based repetitive PUSCH transmission by assuming that repetitive transmission by the UE may begin.

In case that CG-based repetitive PUSCH transmission performed in a single slot is applied to the case in which a PUSCH of which a TBS is determined based on a plurality of symbol sets is repeatedly transmitted according to a CG-based transmission scheme, in case in which a slot configured as an initial TO based on RV=0 is not determined as a valid slot (i.e., in case that the slot is determined as an invalid slot for repetitive PUSCH transmission), or in case that repetitive PUSCH transmission is scheduled or configured, a TBS of the PUSCH being determined based on a plurality of symbol sets from a slot different from a slot corresponding to RV=0, there may be a problem in that repetitive transmission of a PUSCH of which a TBS is determined based on all of a plurality of symbol sets is incapable of being performed.

Therefore, in case that, according to a CG-based transmission scheme, the UE repeatedly transmits a PUSCH of which a TBS is determined based on a plurality of symbol sets, the disclosure is to provide a scheme of determining an initial transmission occasion (TO) in which repetitive transmission may begin.

First, provided is a description of a method of determining M TOs in which repetitive transmission is valid in case that an indication is received, the indication indicating that a PUSCH of which a TBS is determined based on N symbols sets needs to be repeatedly transmitted M times according to a CG-based transmission scheme.

The period of a first slot of a first TO in which a PUSCH is repeatedly transmitted and an offset may be configured for the UE by the base station. Based on the period and offset, the UE may determine the first slot of the first TO in which a PUSCH is to be repeatedly transmitted. Here, the period and offset may be given in ms or in units of one or more slots. Subsequent processes may be determined according to the methods described below.

Figure 27:
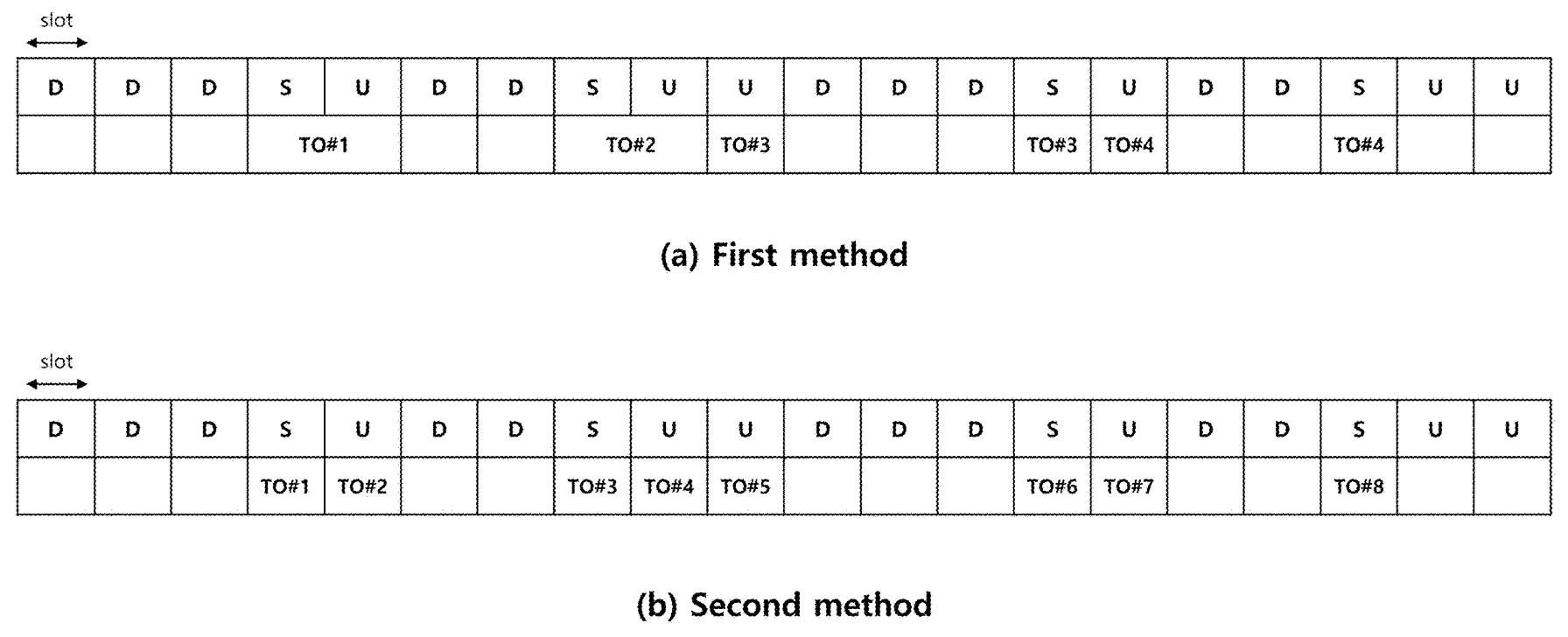

FIG. 27 is a diagram illustrating a method of determining a transmission occasion of a PUSCH of which a TBS is determined based on a plurality of slots or a plurality of nominal PUSCHs according to an embodiment of the disclosure.

Referring to FIG. 27, firstly, a TO may be determined based on N slots in which PUSCH transmission is valid. That is, when determining a TBS based on a plurality of symbol sets N, the UE may determine a TO based on an N-symbol set unit. Therefore, a total of M TOs may be determined.

Specifically, referring to FIG. 27A, repetitive PUSCH transmission type A of the CG-based transmission scheme, N=2, and M=4 are configured for the UE. In FIG. 27A, a slot D is a slot configured with downlink symbols, a slot U is a slot configured with uplink symbols, and a slot S is a slot configured with a downlink symbol, a flexible symbol, and an uplink symbol. The UE may assume that PUSCH transmission is valid in a slot S and a slot U. According to a first method, the UE may determine a TO sequentially with respect to slots corresponding to N=2 from a first slot S in which PUSCH transmission is valid. Here, slots corresponding to N=2 determined as a TO may be contiguous or incontiguous in the time domain. According to the first method, repetitive transmission of a single PUSCH is determined as a single TO and thus, there is no ambiguity between the UE and the base station about whether a PUSCH transmitted in a plurality of slots is repetitive transmission of a single PUSCH or repetitive transmission of different PUSCHs.

Secondly, a TO may be determined based on a slot in which PUSCH transmission is valid. Although the UE determines a TBS based on a plurality of symbol sets N, a TO may be determined based on a slot unit. Therefore, a total of N*M TOs may be determined. For example, as illustrated in FIG. 27B, repetitive PUSCH transmission type A of a CG-based transmission scheme, N=2, and M=4 are configured for the UE. The UE may sequentially determine a TO with respect to slots corresponding to N=2 from a first slot in which PUSCH transmission is valid The UE may sequentially determine a TO with respect to each slot from a first slot S in which PUSCH transmission is valid. According to the second method, a single slot is determined as a single TO, and thus the attribute of an NR that determines a TO based on a slot unit is maintained and backward compatibility may be maintained, which is advantageous.

Subsequently, provided is a description of a method of determining an initial TO in which repetitive PUSCH transmission of a CG-based transmission scheme may start. According to a method of determining M TOs in which repetitive PUSCH transmission is valid, this may be determined as follows.

In case that a TO is determined according to the first method, the UE may receive a configuration of one of RV sequences {0, 2, 3, 1}, {0, 3, 0, 3}, or {0, 0, 0, 0} applied to CG-based repetitive PUSCH transmission, and may use an RV value corresponding to a $\{mod(n-1, 4)+1\}^{th}$ value in an $n^{th}$ TO. Here, n is an integer greater than 0. In this instance, the UE may determine an initial TO in which repetitive transmission may begin according to the configured RV sequence, as follows.

In case that the RV sequence is configured as {0, 2, 3, 1}, a first TO among the M TOs may be determined as an initial TO. This TO may be a TO corresponding to RV=0.

In case that the RV sequence is configured as {0, 3, 0, 3}, a TO corresponding to RV=0 among the M TOs may be determined as an initial TO.

In case that the RV sequence is configured as {0, 0, 0, 0}, all TOs among the M TOs may be determined as an initial TO. In this instance, in case that (the number of a plurality of symbol sets N)*(the number of configured repetitive transmissions M) is greater than or equal to 8, repetitive transmission may not start in the last symbol set of the last TO.

In case that a TO is determined according to the second method, the UE may receive a configuration of one of RV sequences {0, 2, 3, 1}, {0, 3, 0, 3}, or {0, 0, 0, 0} applied to CG-based repetitive PUSCH transmission, and may use an RV value corresponding to a $\{mod(ceil(n/N)-1, 4)+1\}^{th}$ value in an $n^{th}$ TO. Here, n is an integer greater than 0, and ceil(x) denotes the smallest integer among integers greater than or equal to x. In this instance, the UE may determine an initial TO in which repetitive transmission may begin according to the configured RV sequence, as follows.

In case that the RV sequence is configured as {0, 2, 3, 1}, first N TOs among the N*M TOs may be determined as an initial TO. Here, the first N TOs may be TOs corresponding to RV=0.

In case that the RV sequence is configured as {0, 3, 0, 3}, a TO corresponding to RV=0 among the N*M TOs may be determined as an initial TO.

In case that the RV sequence is configured as {0, 0, 0, 0}, all TOs among the N*M TOs may be determined as an initial TO. In this instance, in case that (the number of a plurality of symbol sets N)*(the number of configured repetitive transmissions M) is greater than or equal to 8, repetitive transmission may not start in the last TO.

Figure 28:
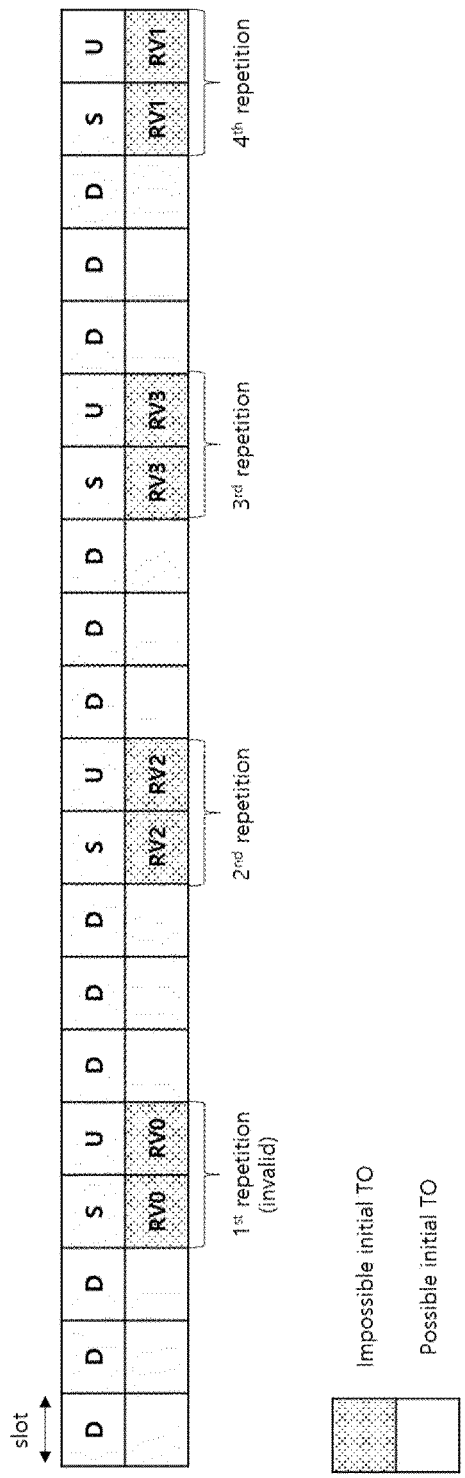
FIG. 28 is a diagram illustrating an example of a method of determining an initial transmission occasion of a PUSCH of which a TBS is determined based on a plurality of slots or a plurality of nominal PUSCHs.

FIG. 28 is a diagram illustrating an example of a method of determining an initial transmission occasion of a PUSCH of which a TBS is determined based on a plurality of slots or a plurality of nominal PUSCHs.

Referring to FIG. 28, in case that a TB is transmitted via a plurality of slots and a PUSCH that transmits a TB is repeatedly transmitted, a UE may transmit a first TB in a slot to which '0' of an RV sequence configured by a base station is allocated.

Specifically, the UE may be configured or indicated such that the UE repeatedly transmits a PUSCH, of which a TBS is determined based on a plurality of symbol sets, in a plurality of time domain resources according to a CG-based transmission scheme. For example, in case that repetitive PUSCH transmission type A is scheduled, the UE may transmit a PUSCH, of which a TBS is determined based on N slots, repeatedly M times. In this instance, the UE may determine an RV value for M repetitive transmissions according to a configured RV sequence.

For example, as illustrated in FIG. 28, repetitive PUSCH transmission type A of a CG-based transmission scheme, N=2, and M=4 are configured for the UE, and an RV sequence of {0, 2, 3, 1} may be configured by the base station. In this instance, PUSCH transmission may be invalid in a TO of two slots corresponding to a first repetitive transmission. That is, first two TOs corresponding to RV=0 may be invalid. Although PUSCH transmission is valid in TOs corresponding to second, third, and fourth repetitive transmissions, RV=0 that is a condition for an initial TO is not satisfied, and thus repetitive transmission may not start. In this instance, PUSCH transmission becomes valid again after 6 slots in which PUSCH transmission is valid, and thus latency may be increased, which is a drawback.

Figure 29:
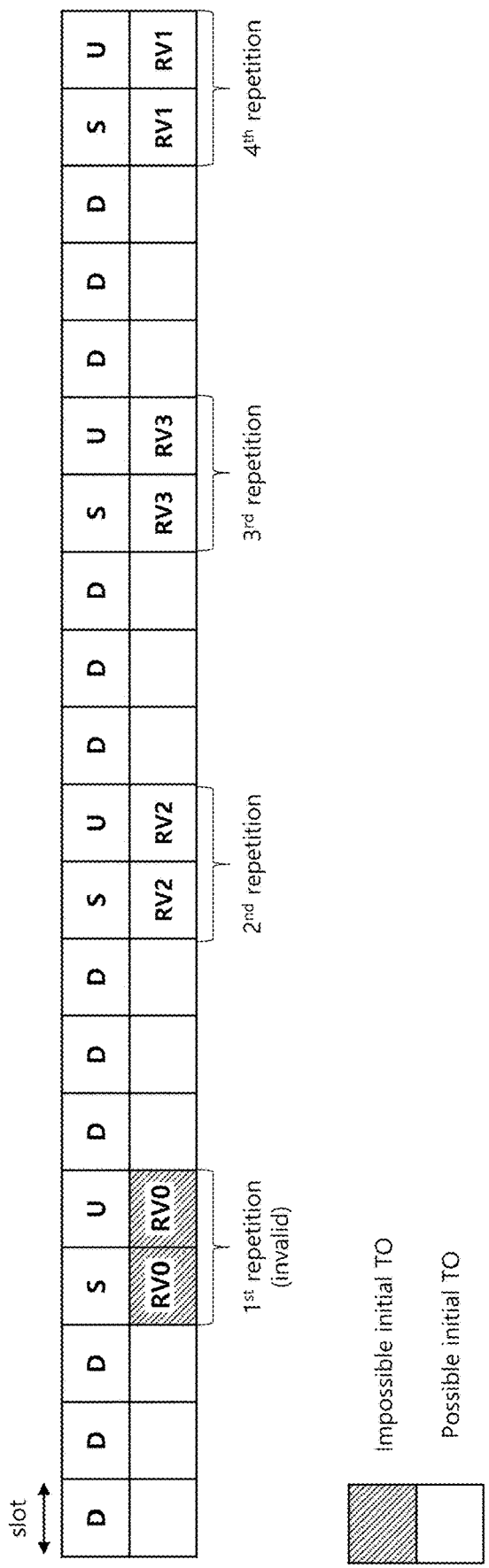
FIG. 29 is a diagram illustrating another example of a method of determining an initial transmission occasion of a PUSCH of which a TBS is determined based on a plurality of slots or a plurality of nominal PUSCHs according to an embodiment of the disclosure.

FIG. 29 is a diagram illustrating another example of a method of determining an initial transmission occasion of a PUSCH of which a TBS is determined based on a plurality of slots or a plurality of nominal PUSCHs according to an embodiment of the disclosure.

Referring to FIG. 29, in case that a TB is transmitted via a plurality of slots, and a PUSCH that transmits a TB is repeatedly transmitted, a UE may start repetitive transmission of a PUSCH of a TB in a corresponding TO even the TO does not correspond to an RV value of '0'.

Specifically, a plurality of symbol sets may be configured via a grant scheme in which the base station configures a plurality of symbol sets for the UE. The UE may determine a TBS based on the plurality of symbol sets allocated or configured, and may perform, based on the determined TBS, repetitive transmission in a plurality of time domain resources via a PUSCH. In this instance, the UE may perform repetitive transmission of a PUSCH based on an RV value configured for each slot, according to an RV sequence configured by the base station.

In this instance, in case that a slot in which an RV value of '0' for starting repetitive PUSCH transmission is configured is invalid, the UE may start repetitive PUSCH transmission in a slot in which an RV value different from '0' is configured. That is, the UE may start repetitive transmission of a PUSCH even in a slot of which an RV value is not configured as '0'.

That is, in case that the UE is configured or indicated such that the UE repeatedly transmits a PUSCH, of which a TBS is determined based on a plurality of symbol sets, in a plurality of time domain resources, the UE may perform configuration so as to perform repetitive PUSCH transmission irrespective of an RV value. In other words, the UE may start repetitive PUSCH transmission in a TO having an RV value different from RV=0. The different RV value may include RV=1, RV=2, and RV=3.

For example, as illustrated in FIG. 29, repetitive PUSCH transmission type A of a CG-based transmission scheme, N=2, and M=4 are configured for the UE. In addition, an RV sequence of {0, 2, 3, 1} is configured by the base station. In case that a TO of two slots corresponding to a first repetitive transmission is invalid for PUSCH transmission, configuration may be performed so that repetitive transmission starts even when a TO corresponding to the remaining repetitive transmission has an RV value different from RV=0. That is, configuration may be performed so that repetitive PUSCH transmission starts in a TO of two slots corresponding to a second repetitive transmission having a value of RV=2, in a TO of two slots corresponding to a third repetitive transmission having a value of RV=3, and in a TO of two slots corresponding to a fourth repetitive transmission having a value of RV=1. That is, unlike the case in which the UE and the base station configure, for the UE, RV=0 as the point in time assumed to be the start of CG-based PUSCH transmission in case that the CG-based PUSCH transmission performed in a single slot is repeated in an NR system, the UE may perform configuration so as to start repetitive PUSCH transmission irrespective of an RV value in case that the UE is configured or indicated such that the UE repeatedly transmits a CG-based PUSCH, of which a TBS is determined based on a plurality of symbol sets, in a plurality of time domain resources.

However, in case that a repetitive transmission starts in a TO having a value different from RV=0 according to the method described in FIG. 29, information bits (systematic bit) of coded bits may not be included in PUSCH transmission or only a part thereof may be included, whereby performance of a PUSCH may deteriorate. Hereinafter, embodiments to overcome the above-described drawback are described.

Figure 30:
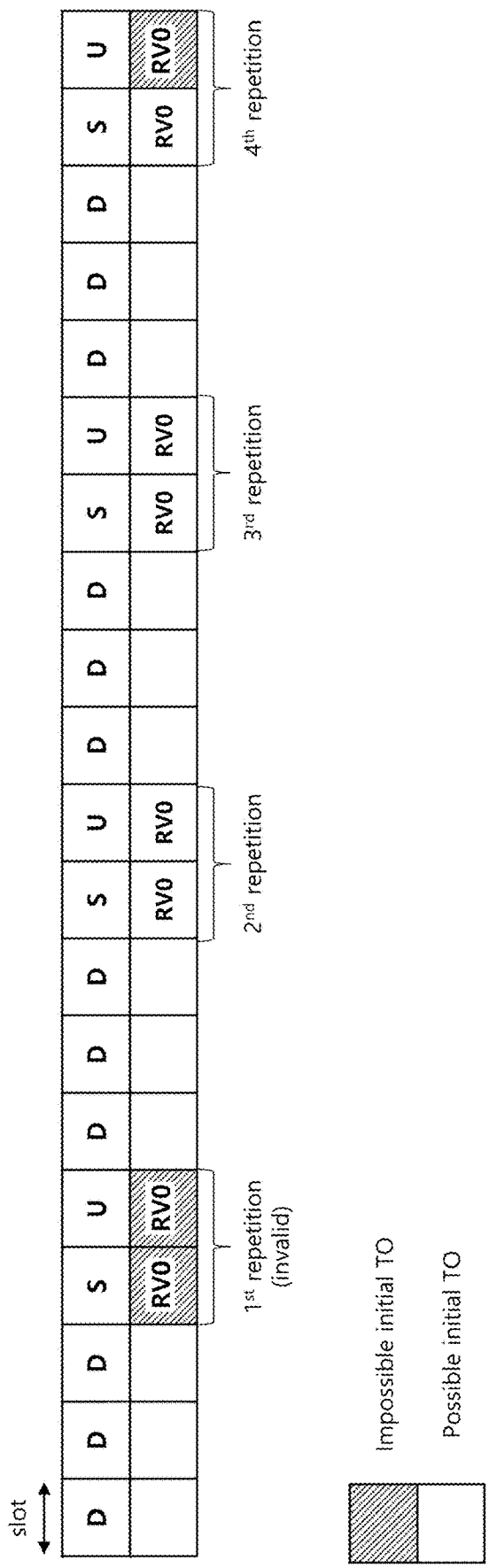
FIG. 30 is a diagram illustrating an example of a method of determining an initial transmission occasion of a PUSCH of which a TBS is determined based on a plurality of slots or a plurality of nominal PUSCHs according to an embodiment of the disclosure.

FIG. 30 is a diagram illustrating an example of a method of determining an initial transmission occasion of a PUSCH of which a TBS is determined based on a plurality of slots or a plurality of nominal PUSCHs according to an embodiment of the disclosure.

Referring to FIG. 30, in case that a TB is transmitted via a plurality of slots and a PUSCH that transmits a TB is repeatedly transmitted, a UE may receive a configuration of an RV sequence configured with only '0' from a base station and may start repetitive transmission of a PUSCH of a TB in a TO corresponding to an RV value of 0'.

Specifically, a plurality of symbol sets may be configured via a grant scheme in which the base station configures a plurality of symbol sets for the UE. The UE may determine a TBS based on the plurality of symbol sets allocated or configured, and may perform, based on the determined TBS, repetitive transmission in a plurality of time domain resources via a PUSCH. In this instance, the UE may perform repetitive transmission of a PUSCH based on an RV value configured for each slot, according to an RV sequence configured by the base station.

In this instance, in case that a slot in which an RV value of '0' for starting repetitive PUSCH transmission is configured is invalid, the UE may be incapable of starting repetitive PUSCH transmission in a slot in which an RV value different from '0' is configured. In this instance, the size of a TB is greater than or equal to a single slot, and thus repetitive transmission of a PUSCH to transmit a TB may begin after a large number of slots elapse. Therefore, latency may occur to start repetitive PUSCH transmission.

Therefore, in this instance, in case that a TBS that is the size of a TB is determine to be greater than a single slot, the base station may configure a predetermined sequence including only a predetermined RV value as an RV sequence for repetitive transmission of a PUSCH for transmitting a TB. In this instance, the predetermined RV value may be an RV value that starts repetitive PUSCH transmission.

For example, the base station may configure, for the UE, {0,0,0,0} as an RV sequence for repetitive PUSCH transmission. Since all RV values is '0' in all slots, although a first slot for PUSCH transmission is invalid, the UE may immediately start repetitive PUSCH transmission in a next valid slot. In this instance, the last TO may not be used for repetitive PUSCH transmission.

Specifically, in case that the UE is configured or indicated such that the UE repeatedly transmits a CG-based PUSCH, of which a TBS is determined based on a plurality of symbol sets, in a plurality of time domain resources, an RV sequence may be always configured as {0, 0, 0, 0} for the UE as an RV sequence for repetitive transmission of a PUSCH of which a TBS is determined based on a plurality of symbol sets. The scheme uses a method same as the case in which the UE and the base station configure, for the UE, RV=0 as the point in time assumed to be the start of CG-based PUSCH transmission in case that the CG-based PUSCH transmission performed in a single slot is repeated in an NR system, and the scheme allows restriction of scheduling by the base station in association with configuration of an RV sequence. That is, the UE may start repetitive PUSCH transmission in a TO corresponding to RV=0 equally in the case of a CG-based PUSCH transmission performed in a single slot and in the case in which a CG-based PUSCH of which a TBS is determined based on a plurality of symbol sets is repeatedly transmitted in a plurality of time domain resources, and thus the RV sequence may be always configured as {0, 0, 0, 0} and repetitive transmission may start in all TOs. For example, referring to FIG. 30, repetitive PUSCH transmission type A of CG-based transmission scheme, N=2, and M=4 are configured for the UE. In this instance, although a TO of two slots corresponding to a first repetitive transmission is invalid for PUSCH transmission, the UE may start repetitive PUSCH transmission since a TO of two slots corresponding to the remaining repetitive transmission has a value of RV=0. In addition, for the UE, an RV sequence is configured as {0, 0, 0, 0} and N*M=8, and thus the UE may not start repetitive transmission in a second slot (slot U) of a TO corresponding to a fourth repetitive transmission according to the method of determining a TO as described with reference to FIGS. 28 and 29.

Figure 31:
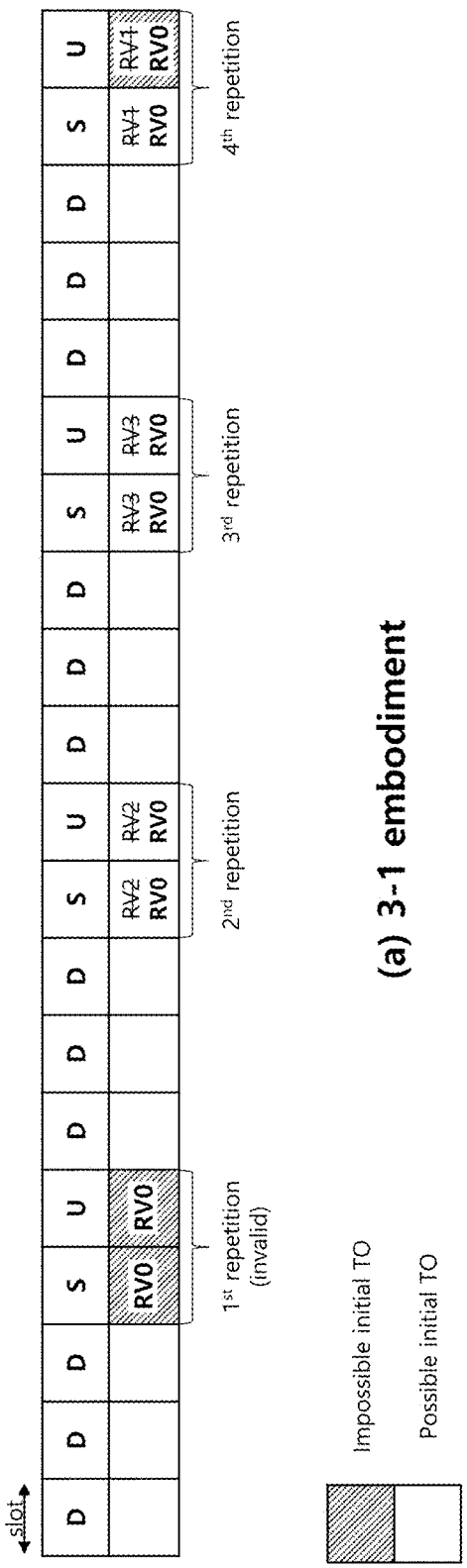
FIG. 31 is a diagram illustrating another example of a method of determining an initial transmission occasion of a PUSCH of which a TBS is determined based on a plurality of slots or a plurality of nominal PUSCHs according to an embodiment of the disclosure.
Figure 31:
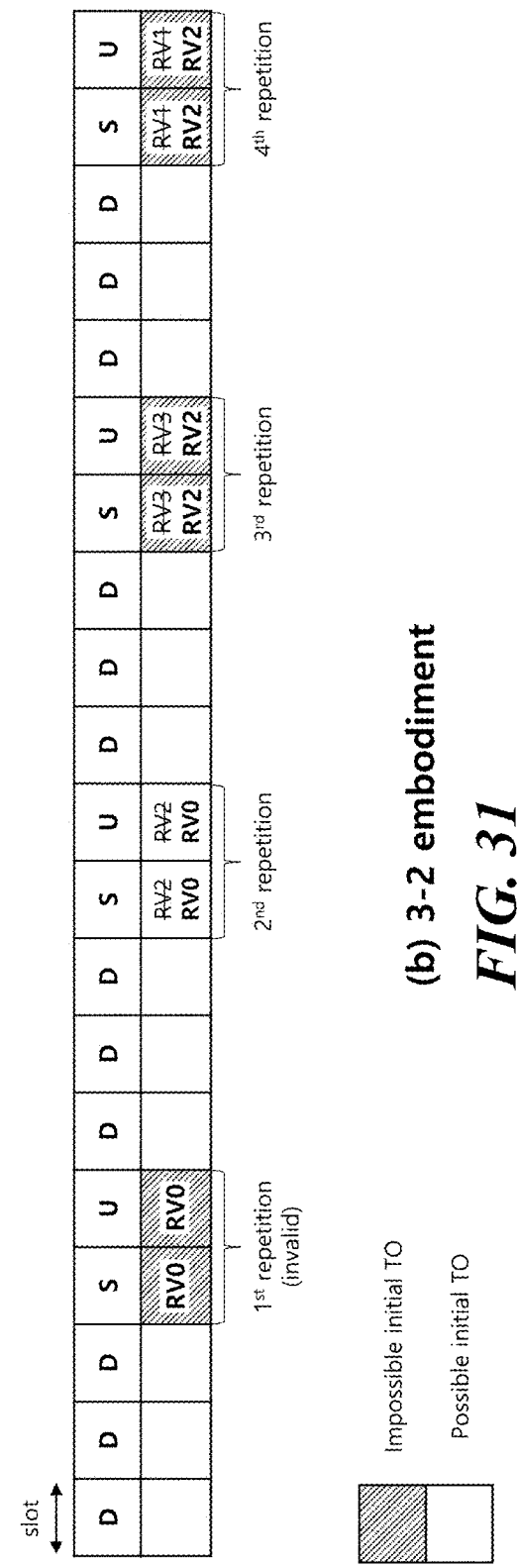

FIG. 31 is a diagram illustrating another example of a method of determining an initial transmission occasion of a PUSCH of which a TBS is determined based on a plurality of slots or a plurality of nominal PUSCHs according to an embodiment of the disclosure.

Referring to FIG. 31, in case that a TB is transmitted via a plurality of slots and a PUSCH that transmits a TB is repeatedly transmitted, a UE may map a value of an RV sequence to a TO from a TO in which repetitive PUSCH transmission is capable of being started.

Specifically, a plurality of symbol sets may be configured via a grant scheme in which the base station configures a plurality of symbol sets for the UE. The UE may determine a TBS based on the plurality of symbol sets allocated or configured, and may perform, based on the determined TBS, repetitive transmission in a plurality of time domain resources via a PUSCH. In this instance, the UE may perform repetitive transmission of a PUSCH based on an RV value configured for each slot, according to an RV sequence configured by the base station.

In this instance, in case that a slot in which an RV value of '0' for starting repetitive PUSCH transmission is configured is invalid, the UE may be incapable of starting repetitive PUSCH transmission in a slot in which an RV value different from '0' is configured. In this instance, the size of a TB is greater than or equal to a single slot, and thus repetitive transmission of a PUSCH to transmit a TB may begin after a large number of slots elapse. Therefore, latency may occur to start repetitive PUSCH transmission.

Therefore, in this instance, the UE may configure RV values of an RV sequence again from a TO of a slot in which repetitive PUSCH transmission is capable of being started after the invalid TO.

Specifically, in case that the UE is configured or indicated such that the UE repeatedly transmits a CG-based PUSCH, of which a TBS is determined based on a plurality of symbol sets, in a plurality of time domain resources, the UE may map a new RV value from a TO in which repetitive PUSCH transmission is capable of being started. Specifically, in case that a TO that has RV=O and corresponds to a first repetitive transmission is invalid, RV=0 is determined for a TO corresponding to a next repetitive transmission and a CG-based PUSCH, of which a TBS is determined based on a plurality of symbol sets, may be repeatedly transmitted in a plurality of time domain resources.

Referring to FIG. 31A, an RV sequence of {0, 0, 0, 0} may be reconfigured and applied from a TO in which repetitive PUSCH transmission is capable of being started. In case that a TO that has RV=0 and corresponds to a first repetitive transmission is invalid, irrespective of an RV sequence configured by the base station, the UE may reconfigure and apply an RV sequence of {0,0, 0, 0} from repetitive transmission of a next valid TO, so as to perform repetitive PUSCH transmission. For example, referring to FIG. 31A, repetitive PUSCH transmission type A of a CG-based transmission scheme, N=2, and M=4 are configured for the UE. In addition, an RV sequence of {0, 2, 3, 1} is configured by the base station. A TO of two slots corresponding to a first repetitive transmission is invalid, and thus an RV sequence of {0, 0, 0, 0} may be applied from a TO corresponding to a second repetitive transmission. In this instance, due to N*M=8, the UE may start repetitive PUSCH transmission in a slot S or a slot U remaining after excluding a second slot (slot U) of a TO corresponding to a fourth repetitive transmission.

Referring to FIG. 31B, mapping is sequentially performed from an RV=0 in an RV sequence configured from a TO in which repetitive PUSCH transmission is capable of being started. In case that a TO that has RV=0 and corresponds to a first repetitive transmission is invalid, a configured RV sequence may be sequentially reconfigured from RV=0 from repetitive transmission of a next valid TO and mapping of each RV value of the RV sequence may be performed. For example, repetitive PUSCH transmission type A of a CG-based transmission scheme, N=2, and M=4 are configured for the UE. In addition, an RV sequence of {0, 2, 3, 1} is configured by the base station. A TO of two slots corresponding to a first repetitive transmission is invalid, and thus a value of RV=0 is sequentially reconfigured from a TO corresponding to a second repetitive transmission and an RV sequence may be mapped. That is, RV=0 is mapped to a TO corresponding to the second repetitive transmission, RV=2 is mapped to a TO corresponding to a third repetitive transmission, and RV=3 is mapped to a TO corresponding to a fourth repetitive transmission, and thus repetitive PUSCH transmission may start in the TO corresponding to the second repetitive transmission.

In addition, the case in which a TO that has RV=0 is invalid may be based on information that the UE and the base station equally assume. In case that an RV sequence and RV values for repetitive PUSCH transmission that the UE may assume is different from those of the base station, the base station may need to perform blind detection of a PUSCH having a value of RV=0 in addition to a PUSCH having an RV value based on an existing RV sequence configuration configured for the UE, every time in order to receive CG-based repetitive PUSCH transmission in a resource in which CG-based repetitive PUSCH transmission is performed.

Figure 32:
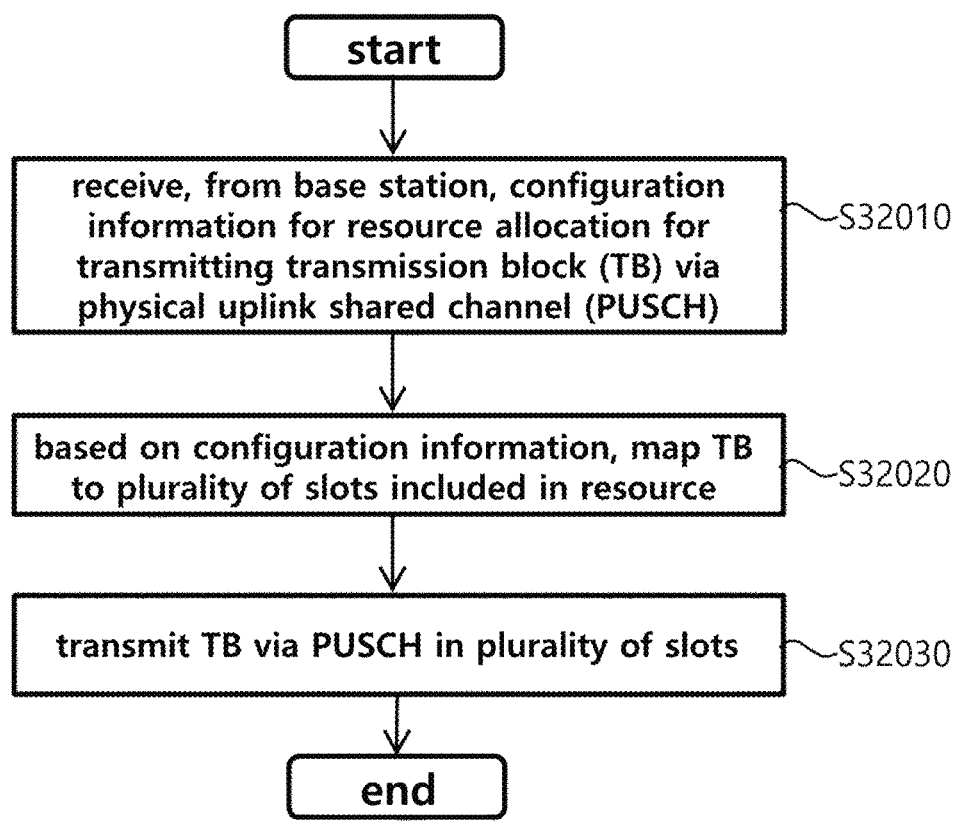
FIG. 32 is a flowchart illustrating an example of operation of a UE according to an embodiment of the disclosure.

FIG. 32 is a flowchart illustrating an example of operation of a UE according to an embodiment of the disclosure.

Referring to FIG. 32, in case that a TB is transmitted via a plurality of slots and a TBS is greater than a single slot, the UE may scale and adjust a TBS or a resource for transmitting a PUSCH in order to determine transmission power of a PUSCH and the number of modulation symbols (or number of bits) of each parameter of a UCI to be multiplexed with the PUSCH.

Specifically, the UE may receive, from the base station, configuration information for resource allocation for transmitting a transport block (TB) via the PUSCH, in operation S32010. In this instance, the UE may be assigned with a resource via dynamic grant or may use a resource configured via a configured grant.

Subsequently, based on the configuration information, the UE may map the TO to a plurality of slots included in the resource, in operation S32020. In this instance, the UE may determine the size of a TB before mapping the TB to the plurality of slots, and the size of the TB may be greater than a single slot.

Subsequently, the UE may transmit the TB via the PUSCH in the plurality of slots in operations S32030.

The PUSCH may be multiplexed with different uplink control information (UCI) in each of the plurality of slots.

In this instance, the number of modulation symbols of each of a plurality of pieces of information (or a plurality of parameters) included in different UCIs may be determined based on the size of the TB scaled based on the plurality of slots or the resource scaled based on the plurality of slots.

That is, the size of the TB may be scaled according to the method described with reference to FIGS. 22 and 23.

In this instance, for the plurality of pieces of information (or a plurality of parameters), the number of modulation symbols may be determined based on the size of the scaled TB sequentially in order of the earliest slot in the time domain among the plurality of slots or the resource scaled based on the plurality of slots.

The plurality of pieces of information (or the plurality of parameters) included in the UCI may include a hybrid automatic repeat request (HARQ)-acknowledgement (ACK)/negative-acknowledgement (NACK), channel state information (CSI) part 1, and CSI part 2.

In this instance, for the plurality of pieces of information (or the plurality of parameters), the number of modulation symbols (or the number of bits) to be multiplexed may be determined in order of priority. For example, the number of modulation symbols for a HARQ-ACK/NACK may be determined as a first priority, and the number of modulation symbol for CSI part 1 may be determined as a second priority, and the number of modulation symbol for CSI part 2 may be determined as a third priority based on the size of a scaled TB or based on a resource scaled based on a plurality of slots.

In case that a TB is configured with one or more code blocks, the number of modulation symbols of each of the plurality of pieces of information (or a plurality of parameters) included in different UCIs may be determined based on a value obtained by scaling the whole size of one or more code blocks based on the plurality of slots or the resource scaled based on the plurality of slots.

Transmission power of a PUSCH may be determined based on a slot unit, based on a value obtained by scaling the whole size of one or more code blocks included in the TB based on the plurality of slots, or based on a resource scaled based on the plurality of slots. That is, in case that a TB is transmitted via a plurality of slots as described with reference to FIGS. 24 to 26, the transmission power for transmission of a PUSCH may be determined based on a TB in each slot.

A PUSCH may be repeatedly transmitted based on the resource allocated based on configured grant (CG) of the configuration information, and a PUSCH may be repeatedly transmitted by using a predetermined redundancy version (RV) sequence configured by the base station for repetitive PUSCH transmission.

In this instance, an RV sequence for repetitive PUSCH transmission and a value of an RV sequence allocated to a TO may be configured according to the methods that have been described with reference to FIGS. 27 to 31.

For example, a predetermined RV sequence for repetitive transmission of a PUSCH is {0,0,0,0}, and the repetitive transmission of a PUSCH may start in a slot in which a value of '0' of the predetermined RV sequence is configured.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment (UE) in a wireless communication system, the UE comprising:
a transceiver;
a processor functionally connected to the transceiver, wherein the processor is configured to:

multiplex uplink control information (UCI) in a physical uplink shared channel (PUSCH) in a plurality of slots, and transmit a transport block (TB) on the plurality of slots via the PUSCH, wherein a number of coded modulation symbols for the UCI transmission in at least one slot of the plurality of slots is determined based on a first scaled value, wherein the first scaled value is determined by scaling a code block size for an uplink shared channel (UL-SCH) of the PUSCH by a first value which is determined based on a number of the plurality of slots.

2. The UE of claim 1, wherein the number of coded modulation symbols (Q) for the UCI transmission is determined based on equation as below, $$Q = \frac{(O+L) \cdot \beta_{offset}^{PUSCH} \cdot \sum_{l=0}^{N_{symb,all}^{PUSCH}-1} M_{sc}^{UCI}(l)}{(1/K) \cdot \sum_{r=0}^{C_{UL-SCH}-1} K_r}$$ [equation]

where O is a number of bits of the UCI, L is a number of cyclic redundancy check (CRC) bits for the UCI, $\beta_{offset}^{PUSCH}$ is an offset value of the PUSCH, $N_{symb,all}^{PUSCH}$ is the total number of symbols used for PUSCH including demodulation reference signal (DMRS), $M_{sc}^{UCI}(l)$ is a number of resource elements (REs) used for transmitting the UCI in symbol l, K is the number of the plurality of slots, $C_{UL-SCH}$ is a number of code blocks for the UL-SCH of the PUSCH, $K_r$ is a r-th code block size for the UL-SCH of the PUSCH.

3. The UE of claim 2, wherein the UCI is at least one of hybrid automatic repeat request (HARQ)-acknowledgement (ACK), channel state information (CSI) part 1, and/or CSI part 2.

4. The UE of claim 3, wherein a number of coded modulation symbols ($Q'_{ACK}$) for the HARQ-ACK transmission is determined based on equation A, wherein a number of coded modulation symbols ($Q'_{CSI-1}$) for the CSI part 1 transmission is determined based on equation B, wherein a number of coded modulation symbols ($Q_{CSI-2}$) for the CSI part 2 transmission is determined based on equation C, $$Q'_{ACK} = \min\left\{\left\lceil\frac{(O_{ACK}+L_{ACK}) \cdot \beta_{offset}^{HARQ-ACK} \cdot \sum_{l=0}^{N_{symb,all}^{PUSCH}-1} M_{sc}^{UCI}(l)}{1/K \cdot \sum_{r=0}^{C_{UL-SCH}-1} K_r}\right\rceil, \left\lceil\alpha \cdot \sum_{l=l_0}^{N_{symb,all}^{PUSCH}-1} M_{sc}^{UCI}(l)\right\rceil\right\}$$ [equation A]

$$Q'_{CSI-1} = \min\left\{\left\lceil\frac{(O_{CSI-1}+L_{CSI-1}) \cdot \beta_{offset}^{CSI-part1} \cdot \sum_{l=0}^{N_{symb,all}^{PUSCH}-1} M_{sc}^{UCI}(l)}{1/K \cdot \sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(i)\right\rceil - Q'_{ACK}\right\}$$ [equation B]

$$Q'_{CSI-2} = \min\left\{\left\lceil\frac{(O_{CSI-2}+L_{CSI-2}) \cdot \beta_{offset}^{CSI-part2} \cdot \sum_{l=0}^{N_{symb,all}^{PUSCH}-1} M_{sc}^{UCI}(l)}{1/K \cdot \sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q'_{ACK} - Q'_{CSI-1}\right\}$$ [equation C]

where $O_{ACK}$ is a number of bits of the HARQ-ACK, $L_{ACK}$ is a number of CRC bits for the HARQ-ACK, $O_{CSI-1}$ is a number of bits of the CSI part 1, $L_{CSI-1}$ is a number of CRC bits for the CSI part 1, $O_{CSI-2}$ is a number of bits of the CSI part2, $L_{CSI-2}$ is a number of CRC bits for the CSI part 2, $\beta_{offset}^{HARQ-ACK}$ is the offset value when the UCI is the HARQ-ACK, $\beta_{offset}^{CSI-part1}$ is the offset value when the UCI is the CSI part 1, $\beta_{offset}^{CSI-part2}$ is the offset value when the UCI is the CSI part 2, α is a scaling value configured by higher layer, $l_0$ is a symbol index of a first symbol that does not carry DMRS of the PUSCH, after the first DMRS symbol, in the PUSCH.

5. The UE of claim 1, wherein a number of bits per resource element (BPRE) of a transmission power of the PUSCH is determined based on a second scaled value, wherein the second scaled value is obtained by scaling a code block size of the TB by the first value.

6. The UE of claim 1, wherein the PUSCH is repeatedly transmitted on resources with a configured grant (CG).

7. The UE of claim 1, wherein an initial transmission occasion of the PUSCH is determined based on a redundancy version (RV) sequence.

8. The UE of claim 7, wherein the RV sequence is {0, 0, 0, 0}.

9. The UE of claim 1, wherein a size of the TB for the PUSCH is determined by scaling a number of resource elements over a number of physical resource blocks allocated for the PUSCH by a K, wherein the K is the number of the plurality of slots.

10. The UE of claim 1, wherein the number of the plurality of slots is indicated by a time domain resource assignment (TDRA) field in a downlink control information (DCI) scheduling the PUSCH.

11. A method used by a user equipment (UE) in a wireless communication system, the method comprising:

multiplexing uplink control information (UCI) in a physical uplink shared channel (PUSCH) in a plurality of slots; and transmitting a transport block (TB) on the plurality of slots via the PUSCH, wherein a number of coded modulation symbols for the UCI transmission in at least one slot of the plurality of slots is determined based on a first scaled value, wherein the first scaled value is determined by scaling a code block size for an uplink shared channel (UL-SCH) of the PUSCH by a first value which is determined based on a number of the plurality of slots.

12. The method of claim 11, wherein the number of coded modulation symbols (Q) for the UCI transmission is determined based on equation as below, $$Q = \frac{(O+L) \cdot \beta_{offset}^{PUSCH} \cdot \sum_{l=0}^{N_{symb,all}^{PUSCH}-1} M_{sc}^{UCI}(l)}{(1/K) \cdot \sum_{r=0}^{C_{ULSCH}-1} K_r} \quad \text{[equation]}$$

where O is a number of bits of the UCI, L is a number of cyclic redundancy check (CRC) bits for the UCI $\beta_{offset}^{PUSCH}$ is an offset value of the PUSCH, $N_{symb,all}^{PUSCH}$ is the total number of symbols used for PUSCH including demodulation reference signal (DMRS), $M_{sc}^{UCI}(l)$ is a number of resource elements (REs) used for transmitting the UCI in symbol l, K is the number of the plurality of slots, $C_{UL-SCH}$ is a number of code blocks for the UL-SCH of the PUSCH, $K_r$ is a r-th code block size for the UL-SCH of the PUSCH.

13. The method of claim 12, wherein the UCI is at least one of hybrid automatic repeat request (HARQ)-acknowledgement (ACK), channel state information (CSI) part 1, and/or CSI part 2.

14. The method of claim 13, wherein a number of coded modulation symbols ($Q'_{ACK}$) for the HARQ-ACK transmission is determined based on equation A, wherein a number of coded modulation symbols ($Q'_{CSI-1}$) for the CSI part 1 transmission is determined based on equation B, wherein a number of coded modulation symbols ($Q_{CSI-2}$) for the CSI part 2 transmission is determined based on equation C, $$Q'_{ACK} = \min\left\{ \left\lceil \frac{(O_{ACK}+L_{ACK}) \cdot \beta_{offset}^{HARQ\text{-}ACK} \cdot \sum_{l=0}^{N_{symb,all}^{PUSCH}-1} M_{sc}^{UCI}(l)}{1/K \cdot \sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\} \quad \text{[equation A]}$$

$$Q'_{CSI-1} = \min\left\{ \left\lceil \frac{(O_{CSI-1}+L_{CSI-1}) \cdot \beta_{offset}^{CSI\text{-}part1} \cdot \sum_{l=0}^{N_{symb,all}^{PUSCH}-1} M_{sc}^{UCI}(l)}{1/K \cdot \sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} \right\} \quad \text{[equation B]}$$

$$Q'_{CSI-2} = \min\left\{ \left\lceil \frac{(O_{CSI-2}+L_{CSI-2}) \cdot \beta_{offset}^{CSI\text{-}part2} \cdot \sum_{l=0}^{N_{symb,all}^{PUSCH}-1} M_{sc}^{UCI}(l)}{1/K \cdot \sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} - Q'_{CSI-1} \right\} \quad \text{[equation C]}$$

where $O_{ACK}$ is a number of bits of the HARQ-ACK, $L_{ACK}$ is a number of CRC bits for the HARQ-ACK, $O_{CSI-1}$ is a number of bits of the CSI part 1, $L_{CSI-1}$ is a number of CRC bits for the CSI part 1, $O_{CSI-2}$ is a number of bits of the CSI part2, $L_{CSI-2}$ is a number of CRC bits for the CSI part 2, $\beta_{offset}^{HARQ\text{-}ACK}$ is the offset value when the UCI is the HARQ-ACK, $\beta_{offset}^{CSI\text{-}part1}$ is the offset value when the UCI is the CSI part 1, $\beta_{offset}^{CSI\text{-}part2}$ is the offset value when the UCI is the CSI part 2, α is a scaling value configured by higher layer, $l_0$ is a symbol index of a first symbol that does not carry DMRS of the PUSCH, after the first DMRS symbol, in the PUSCH.

15. The method of claim 11, wherein a number of bits per resource element (BPRE) of a transmission power of the PUSCH is determined based on a second scaled value, wherein the second scaled value is obtained by scaling a code block size of the TB by the first value.

16. The method of claim 11, wherein the PUSCH is repeatedly transmitted on resources with a configured grant (CG).

17. The method of claim 16, wherein an initial transmission occasion of the PUSCH is determined based on a redundancy version (RV) sequence.

18. The method of claim 17, wherein the RV sequence is {0, 0, 0, 0}.

19. The method of claim 11, wherein a size of the TB for the PUSCH is determined by scaling a number of resource elements over a number of physical resource blocks allocated for the PUSCH by a K, wherein the K is the number of the plurality of slots.

20. The method of claim 11, wherein the number of the plurality of slots is indicated by a time domain resource assignment (TDRA) field in a downlink control information (DCI) scheduling the PUSCH.

21. A base station in a wireless communication system, the base station comprising:

a transceiver; and a processor configured to control the transceiver, wherein the processor is configured to:

receive a transport block (TB) on a plurality of slots via a physical uplink shared channel (PUSCH), wherein uplink control information (UCI) is multiplexed in the PUSCH in the plurality of slots, wherein a number of coded modulation symbols for the UCI transmission in at least one slot of the plurality of slots is determined based on a first scaled value, wherein the first scaled value is determined by scaling a code block size for an uplink shared channel (UL-SCH) of the PUSCH by a first value which is determined based on a number of the plurality of slots.

* * * * *